US011910115B2

(12) United States Patent
Sugawara et al.

(10) Patent No.: US 11,910,115 B2
(45) Date of Patent: Feb. 20, 2024

(54) IMAGING ELEMENT, IMAGING APPARATUS, OPERATION METHOD OF IMAGING ELEMENT, AND PROGRAM

(71) Applicant: FUJIFILM CORPORATION, Tokyo (JP)

(72) Inventors: Kazufumi Sugawara, Saitama (JP); Makoto Kobayashi, Saitama (JP); Tomoyuki Kawai, Saitama (JP); Hitoshi Sakurabu, Saitama (JP); Ryo Hasegawa, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 125 days.

(21) Appl. No.: 17/671,531

(22) Filed: Feb. 14, 2022

(65) Prior Publication Data

US 2022/0174233 A1 Jun. 2, 2022

Related U.S. Application Data

(63) Continuation of application No. PCT/JP2020/026023, filed on Jul. 2, 2020.

(30) Foreign Application Priority Data

Aug. 28, 2019 (JP) .................. 2019-155450

(51) Int. Cl.
*H04N 25/75* (2023.01)
*H04N 25/62* (2023.01)
*H04N 25/615* (2023.01)

(52) U.S. Cl.
CPC ........... *H04N 25/75* (2023.01); *H04N 25/615* (2023.01); *H04N 25/62* (2023.01)

(58) Field of Classification Search
CPC ...... H04N 25/75; H04N 25/615; H04N 25/62; H04N 23/61; H04N 23/6812;
(Continued)

(56) References Cited

U.S. PATENT DOCUMENTS

2010/0039554 A1\* 2/2010 Mizuno .................. H04N 5/772
348/390.1
2018/0286019 A1\* 10/2018 Davis ........................ G06T 5/50
(Continued)

FOREIGN PATENT DOCUMENTS

JP 2006295972 A \* 10/2006 ............. H04N 5/225
JP 2008-72682 A 3/2008
(Continued)

OTHER PUBLICATIONS

International Search Report issued in International Application No. PCT/JP2020/026023 dated Oct. 6, 2020.
(Continued)

*Primary Examiner* — Nhan T Tran
(74) *Attorney, Agent, or Firm* — SOLARIS Intellectual Property Group, PLLC

(57) ABSTRACT

An imaging element incorporates a reading portion, a storage portion, a processing portion, and an output portion. The reading portion reads out image data obtained by imaging from a photoelectric conversion element at a first frame rate. The storage portion stores the image data read out from the photoelectric conversion element. The processing portion processes the image data. The output portion outputs the image data processed by the processing portion at a second frame rate. The processing portion detects first image data indicating a specific image from the image data stored in the storage portion. The output portion outputs second image data based on image data different from the first image data detected by the processing portion in the image data of a
(Continued)

plurality of frames. The second frame rate is a frame rate lower than the first frame rate.

15 Claims, 31 Drawing Sheets

(58) Field of Classification Search
CPC .... H04N 23/743; H04N 25/79; H04N 25/587; H04N 23/682; H04N 25/60
See application file for complete search history.

(56) References Cited

U.S. PATENT DOCUMENTS

| | | |
|---|---|---|
| 2018/0288308 A1 | 10/2018 | Furumochi et al. |
| 2020/0154034 A1* | 5/2020 | Furumochi ............ H04N 23/73 |

FOREIGN PATENT DOCUMENTS

| | | | | |
|---|---|---|---|---|
| JP | 2017-183952 A | | 10/2017 | |
| JP | 2017183952 A | * | 10/2017 | ........... H04N 45/232 |
| JP | 2019-79024 A | | 5/2019 | |
| KR | 20150095165 A | * | 8/2015 | ............ H04N 5/232 |

OTHER PUBLICATIONS

Written Opinion of the ISA issued in International Application No. PCT/JP2020/026023 dated Oct. 6, 2020.
English language translation of the following: Office action dated Apr. 25, 2023 from the JPO in a Japanese patent application No. 2021-542589 corresponding to the instant patent application.

* cited by examiner

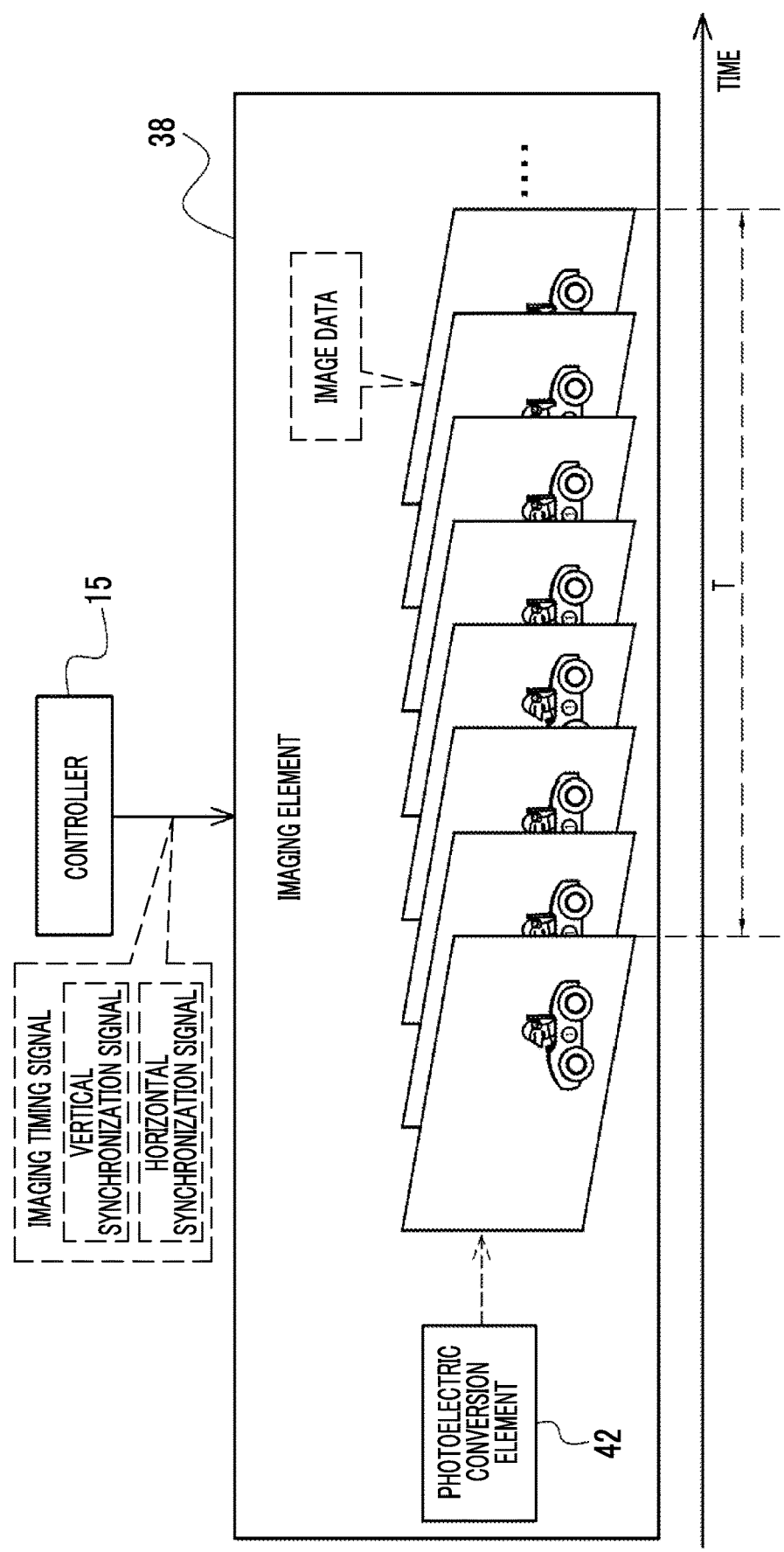

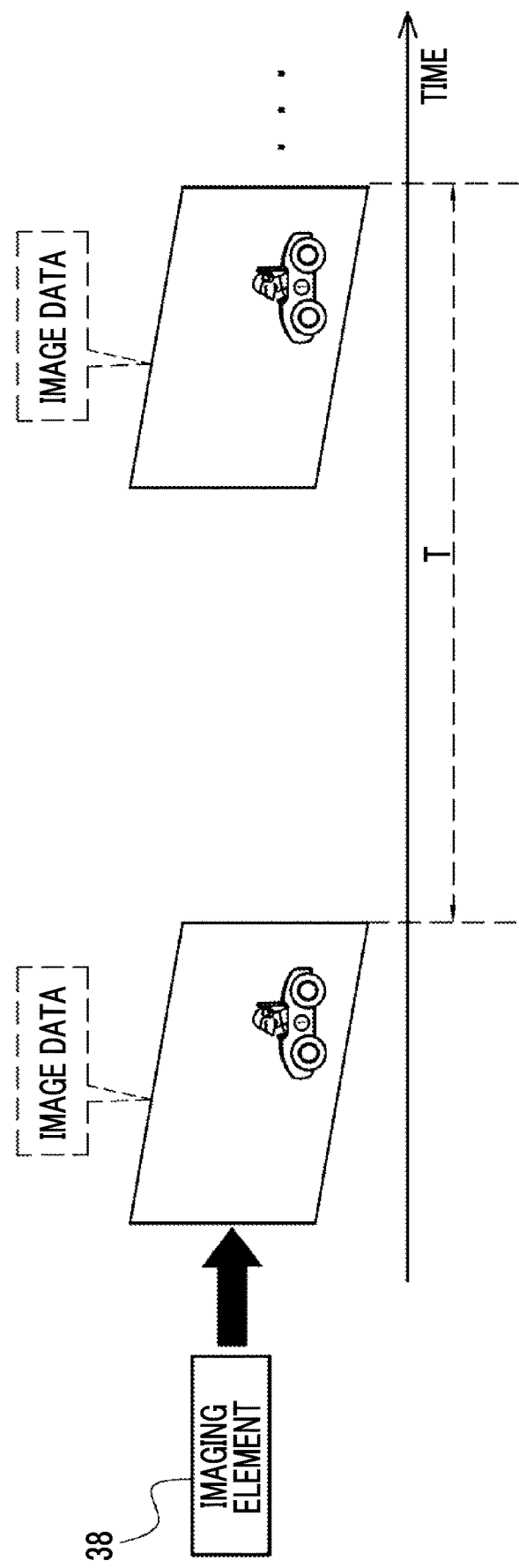

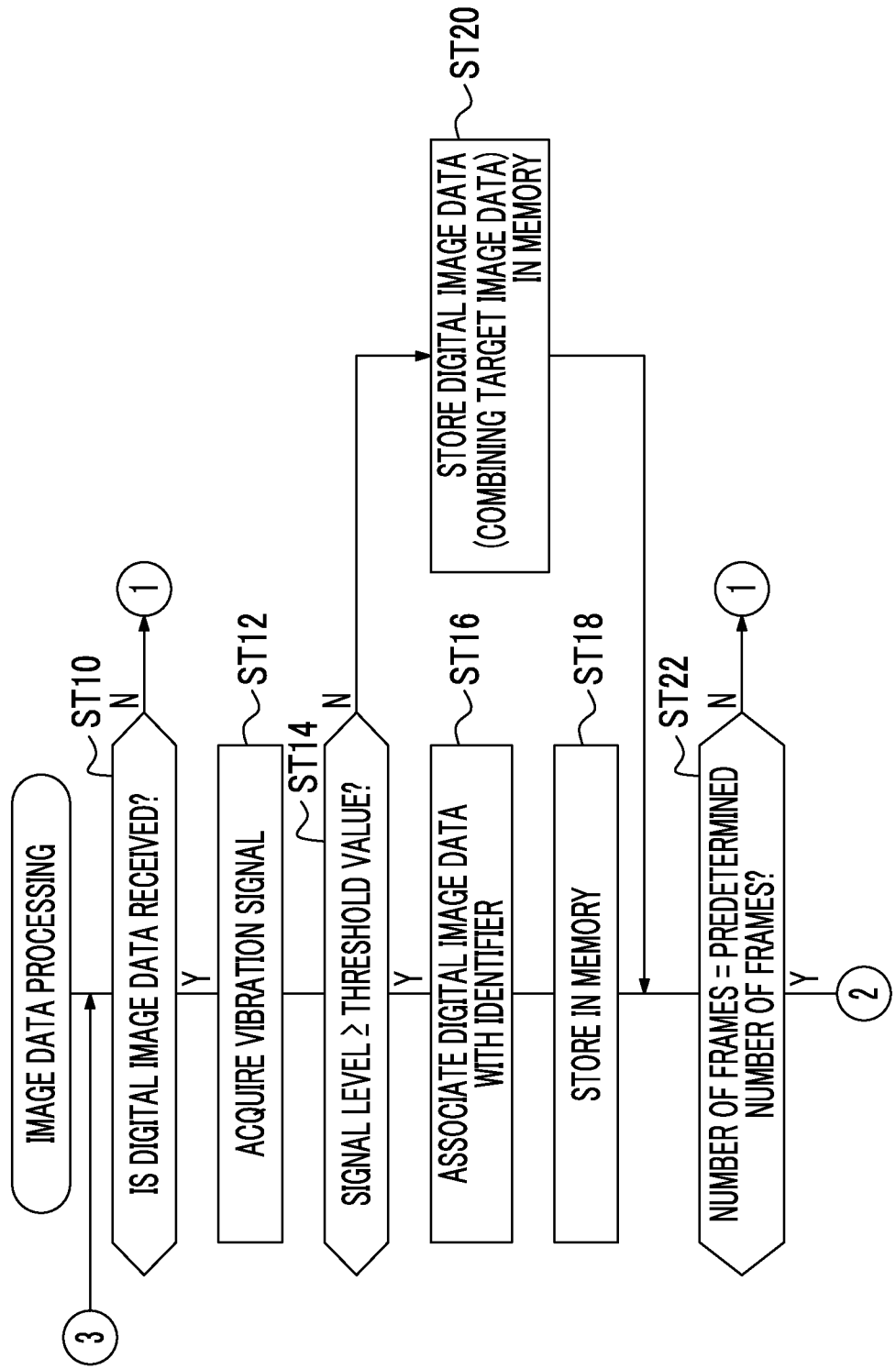

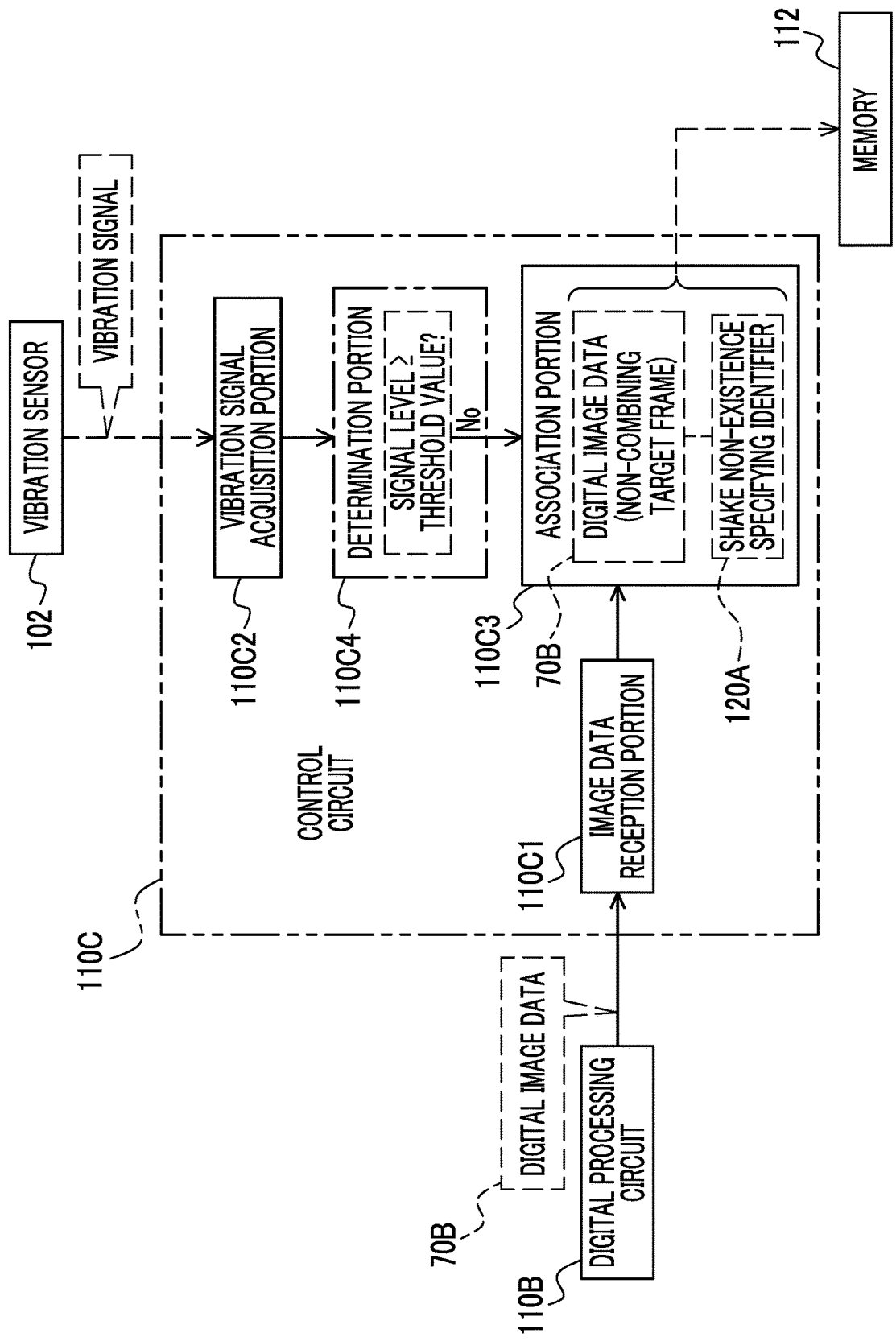

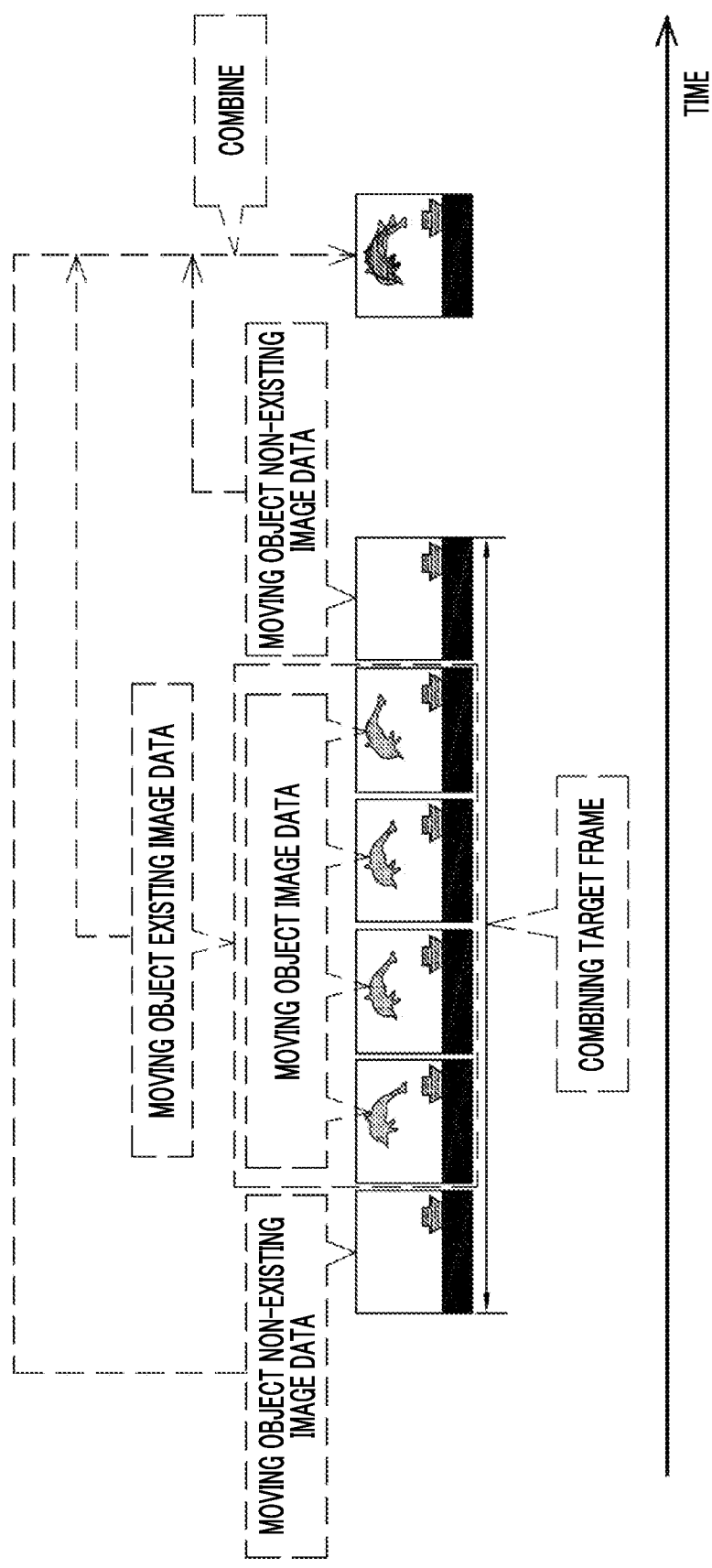

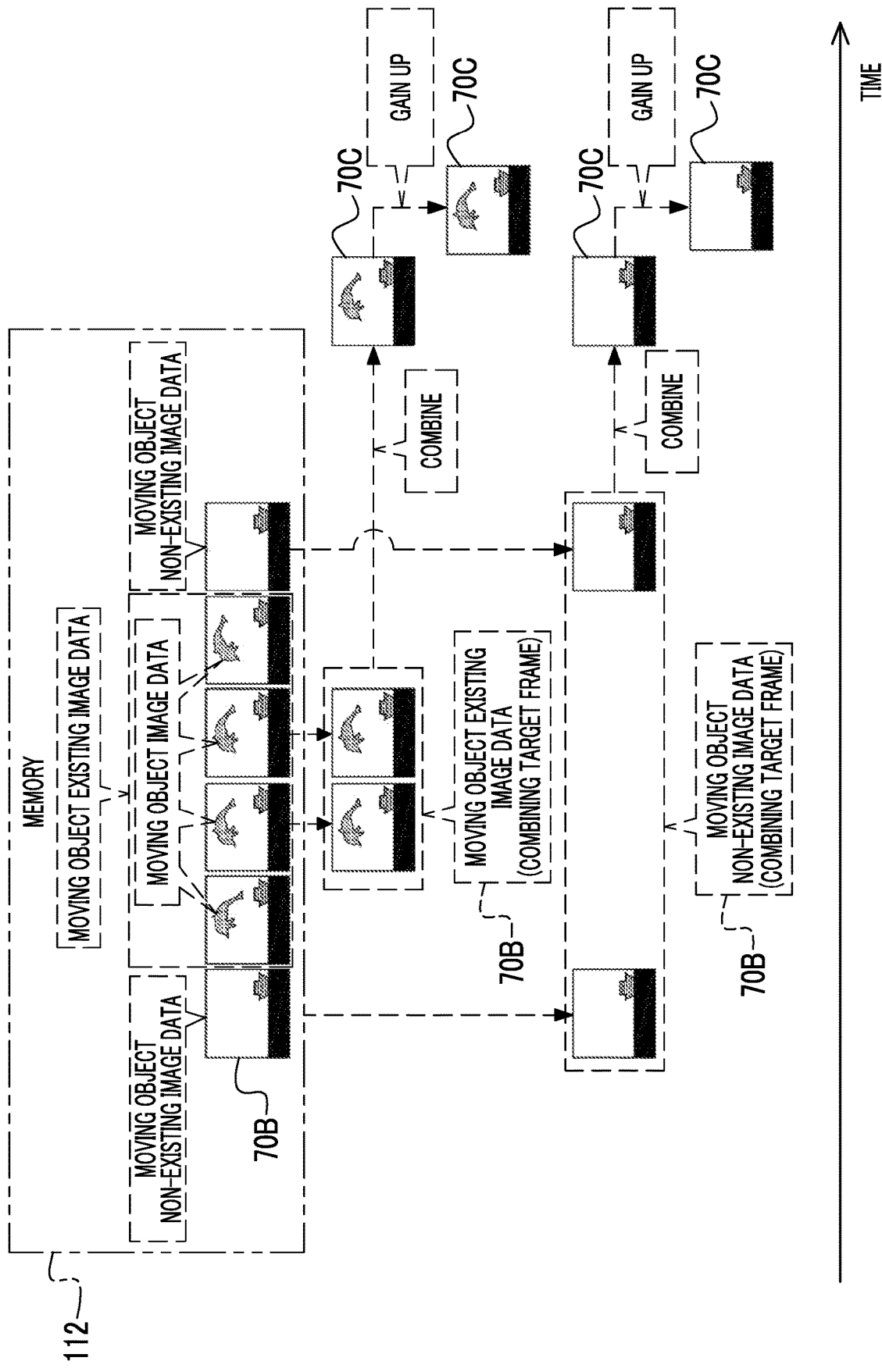

IMAGING ELEMENT, IMAGING APPARATUS, OPERATION METHOD OF IMAGING ELEMENT, AND PROGRAM

CROSS-REFERENCE TO RELATED APPLICATIONS

This application is a continuation application of International Application No. PCT/JP2020/026023, filed Jul. 2, 2020, the disclosure of which is incorporated herein by reference in its entirety. Further, this application claims priority from Japanese Patent Application No. 2019-155450, filed Aug. 28, 2019, the disclosure of which is incorporated herein by reference in its entirety.

BACKGROUND

1. Technical Field

The technology of the present disclosure relates to an imaging element, an imaging apparatus, an operation method of an imaging element, and a program.

2. Description of the Related Art

JP2019-079024A discloses an imaging apparatus that images a subject through an imaging optical system. The imaging apparatus disclosed in JP2019-079024A comprises an imaging element that acquires an image signal from light of which an image is formed by the imaging optical system, a first control unit that controls an exposure parameter of the imaging element, and a second control unit that performs processing of outputting a first image corresponding to a pixel portion having a first number of pixels and a second image corresponding to a pixel portion having a second number of pixels less than the first number of pixels in a pixel portion of the imaging element by switching between the first image and the second image.

In the imaging apparatus disclosed in JP2019-079024A, the second control unit performs a focusing control based on at least one of the first image or the second image, and the first control unit reduces an amount of change in exposure parameter between the first image and the second image to be subsequently acquired, by controlling the exposure parameter for acquiring the first image and the second image. In addition, the imaging apparatus disclosed in JP2019-0079024A further comprises a display unit that displays the first image and the second image on a display portion. The display unit generates a third image by combining the first image with the second image.

SUMMARY

One embodiment according to the technology of the present disclosure provides an imaging element, an imaging apparatus, an operation method of an imaging element, and a program that can suppress output of image data having low image quality, compared to a case where the entire image data obtained by imaging is output.

A first aspect according to the technology of the present disclosure is an imaging element comprising a reading portion that is incorporated in the imaging element and reads out image data obtained by imaging using a photoelectric conversion element from the photoelectric conversion element at a first frame rate, a storage portion that is incorporated in the imaging element and stores the image data read out from the photoelectric conversion element by the reading portion, a processing portion that is incorporated in the imaging element and processes the image data, and an output portion that is incorporated in the imaging element and outputs the image data processed by the processing portion at a second frame rate, in which the processing portion detects first image data indicating a specific image from the image data stored in the storage portion, the output portion outputs second image data based on image data different from the first image data detected by the processing portion in the image data of a plurality of frames, and the second frame rate is a frame rate lower than the first frame rate.

A second aspect according to the technology of the present disclosure is the imaging element according to the first aspect, in which the processing portion combines image data of a plurality of frames different from the first image data in the image data of the plurality of frames, and the output portion outputs combined image data obtained by combining using the processing portion as the second image data.

A third aspect according to the technology of the present disclosure is the imaging element according to the second aspect, in which the processing portion generates the combined image data as the second image data by combining image data of a number of frames that is the image data of the plurality of frames different from the first image data and of which an added exposure amount is greater than or equal to a first predetermined exposure amount in the image data of the plurality of frames.

A fourth aspect according to the technology of the present disclosure is the imaging element according to the third aspect, in which each image indicated by the image data of the plurality of frames set as a combining target of the processing portion includes a specific subject image indicating a specific subject of which a misregistration amount is less than or equal to a predetermined value between frames, and the processing portion extracts specific subject image data of a plurality of frames of the first predetermined exposure amount or greater indicating an image including the specific subject image from the image data of the plurality of frames set as the combining target, and generates the combined image data as the second image data by combining the extracted specific subject image data of the plurality of frames.

A fifth aspect according to the technology of the present disclosure is the imaging element according to any one of the first to fourth aspects, in which the specific image is an image including a noise component.

A sixth aspect according to the technology of the present disclosure is the imaging element according to the fifth aspect, in which the image including the noise component is an image indicated by image data obtained by imaging using the imaging element at a timing at which a vibration exerted on an apparatus including the imaging element is detected by a detection portion capable of detecting the vibration, in the image data stored in the storage portion.

A seventh aspect according to the technology of the present disclosure is the imaging element according to the sixth aspect, in which the detection portion outputs a signal indicating the detected vibration to the processing portion, and the processing portion generates the first image data by associating image data obtained by imaging using the imaging element at a timing at which the signal of which a signal level is greater than or equal to a threshold value is input from the detection portion, with an identifier for specifying the signal level greater than or equal to the threshold value.

An eighth aspect according to the technology of the present disclosure is the imaging element according to the fifth aspect, in which the image including the noise component is an image of a subject including an object of which a movement amount per unit time period is greater than or equal to a predetermined movement amount.

A ninth aspect according to the technology of the present disclosure is the imaging element according to the first aspect, in which in a case where subject image data indicating an image of a subject including an object of which a movement amount per unit time period is greater than or equal to a predetermined movement amount is included in the image data, the processing portion removes the subject image data from the image data, and the output portion outputs, as the second image data, image data based on after-removal image data obtained by removing the subject image data from the image data using the processing portion.

A tenth aspect according to the technology of the present disclosure is the imaging element according to any one of the first to ninth aspects, in which the processing portion generates the second image data of which an exposure amount is greater than or equal to a second predetermined exposure amount, by adjusting a gain of the image data different from the first image data in the image data of the plurality of frames.

An eleventh aspect according to the technology of the present disclosure is the imaging element according to any one of the first to tenth aspects, in which at least the photoelectric conversion element and the storage portion are formed in one chip.

A twelfth aspect according to the technology of the present disclosure is the imaging element according to the eleventh aspect, in which the imaging element is a laminated imaging element in which the photoelectric conversion element is laminated with the storage portion.

A thirteenth aspect according to the technology of the present disclosure is an imaging apparatus comprising the imaging element according to any one of the first to twelfth aspects, and a control device that performs at least one of a control for displaying an image based on the second image data output by the output portion on a display device or a control for storing the second image data output by the output portion in a storage device.

A fourteenth aspect according to the technology of the present disclosure is an operation method of an imaging element incorporating a storage portion, the operation method comprising reading out image data obtained by imaging using a photoelectric conversion element from the photoelectric conversion element at a first frame rate, storing the image data read out from the photoelectric conversion element in the storage portion, processing the image data, outputting the processed image data at a second frame rate, detecting first image data indicating a specific image from the image data stored in the storage portion, and outputting second image data based on image data different from the detected first image data in the image data of a plurality of frames, in which the second frame rate is a frame rate lower than the first frame rate.

A fifteenth aspect according to the technology of the present disclosure is a program causing a computer applied to an imaging element incorporating a storage portion to execute a process comprising reading out image data obtained by imaging using a photoelectric conversion element from the photoelectric conversion element at a first frame rate, storing the image data read out from the photoelectric conversion element in the storage portion, processing the image data, outputting the processed image data at a second frame rate, detecting first image data indicating a specific image from the image data stored in the storage portion, and outputting second image data based on image data different from the detected first image data in the image data of a plurality of frames, in which the second frame rate is a frame rate lower than the first frame rate.

BRIEF DESCRIPTION OF THE DRAWINGS

Exemplary embodiments of the technology of the disclosure will be described in detail based on the following figures, wherein:

FIG. 5A is a conceptual diagram for describing an imaging frame rate of an imaging element included in the imaging apparatus according to the first to fourth embodiments;

FIG. 5B is a conceptual diagram for describing an output frame rate of the imaging element included in the imaging apparatus according to the first to fourth embodiments;

FIG. 13A is a flowchart illustrating an example of a flow of image data processing according to the first embodiment;

FIG. 14A is a block diagram illustrating a modification example of the configuration of the control circuit included in the imaging element according to the first embodiment;

FIG. 23 is a time chart illustrating an example of a process of combining moving object existing image data with moving object non-existing image data;

FIG. 24 is a time chart illustrating an example of a process of combining the moving object existing image data of a third frame and a fourth frame set as a combining target frame and gaining up the combined image data, and an example of a process of combining the moving object non-existing image data of a first frame and a sixth frame set as the combining target frame and gaining up the combined image data in the digital image data of first to sixth frames obtained by imaging using the imaging element according to the fourth embodiment;

DETAILED DESCRIPTION

Hereinafter, an example of embodiments of an imaging apparatus according to the embodiments of the technology of the present disclosure will be described in accordance with the appended drawings.

First, words used in the following description will be described.

The abbreviation CPU stands for "Central Processing Unit". The abbreviation GPU stands for "Graphics Processing Unit". The abbreviation RAM stands for "Random Access Memory". The abbreviation ROM stands for "Read Only Memory". The abbreviation DRAM stands for "Dynamic Random Access Memory". The abbreviation SRAM stands for "Static Random Access Memory". The abbreviation LSI stands for "Large-Scale Integrated circuit". The abbreviation ASIC stands for "Application Specific Integrated Circuit". The abbreviation PLD stands for "Programmable Logic Device". The abbreviation FPGA stands for "Field-Programmable Gate Array". The abbreviation SoC stands for "System-on-a-chip". The abbreviation SSD stands for "Solid State Drive". The abbreviation USB stands for "Universal Serial Bus". The abbreviation HDD stands for "Hard Disk Drive". The abbreviation EEPROM stands for "Electrically Erasable and Programmable Read Only Memory". The abbreviation CCD stands for "Charge Coupled Device". The abbreviation CMOS stands for "Complementary Metal Oxide Semiconductor". The abbreviation EL stands for "Electro-Luminescence". The abbreviation A/D stands for "Analog/Digital". The abbreviation I/F stands for "Interface". The abbreviation UI stands for "User Interface". The abbreviation LVDS stands for "Low Voltage Differential Signaling". The abbreviation PCIe stands for "Peripheral Component Interconnect Express". The abbreviation SATA stands for "Serial Advanced Technology Attachment". The abbreviation SLVS-EC stands for "Scalable Low Signaling with Embedded Clock". The abbreviation MIPI (registered trademark) stands for "Mobile Industry Processor Interface". The abbreviation fps stands for "frame per second". The abbreviation FIFO stands for "First In First Out".

First Embodiment

Figure 1:
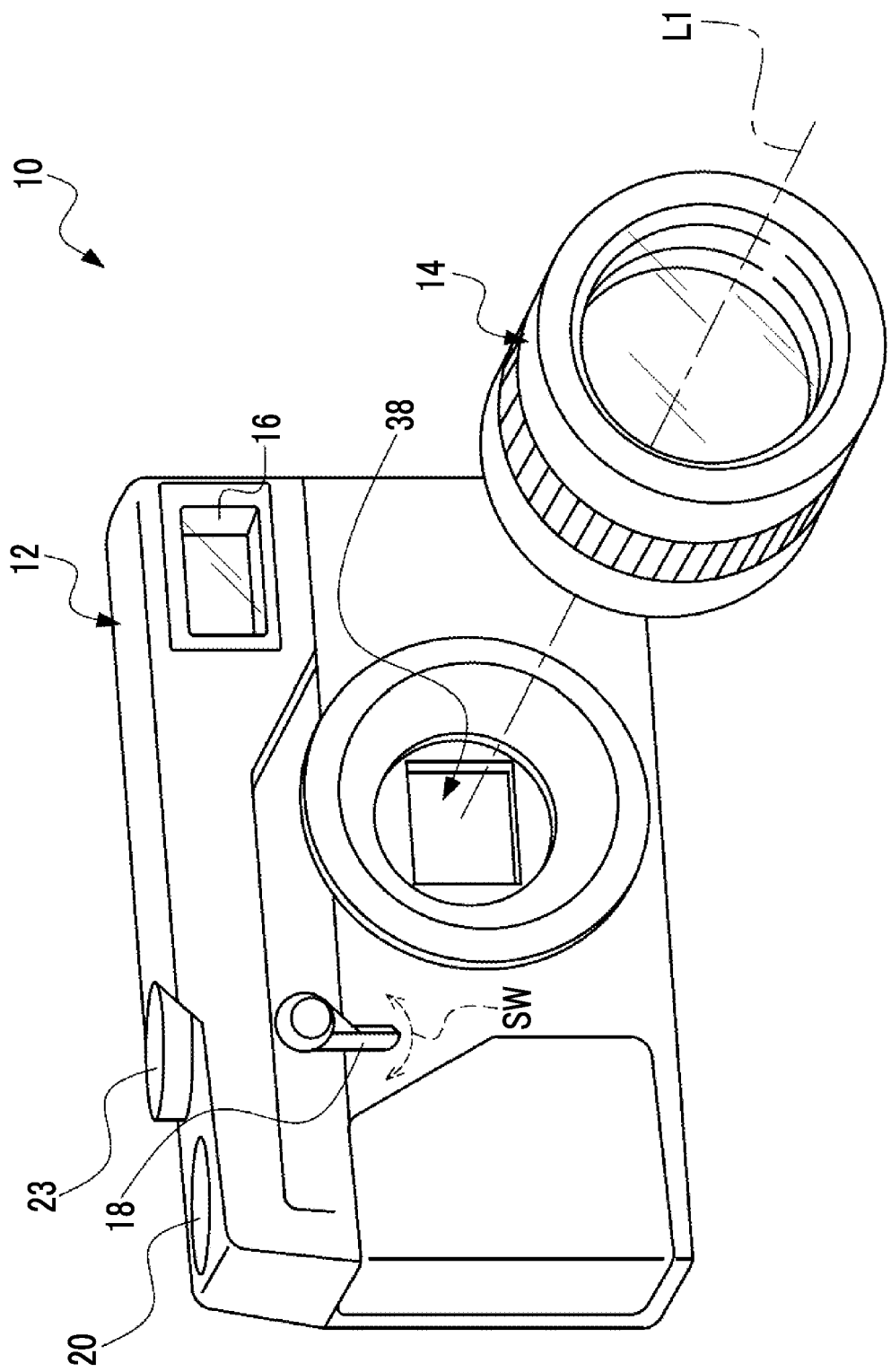
FIG. 1 is a perspective view illustrating an example of an exterior of an imaging apparatus according to first to fourth embodiments.

As illustrated in FIG. 1 as an example, an imaging apparatus 10 is a digital camera of an interchangeable lens type that does not include a reflex mirror. The imaging apparatus 10 comprises an imaging apparatus main body 12 and an interchangeable lens 14 that is interchangeably mounted on the imaging apparatus main body 12. Here, while the digital camera of the interchangeable lens type that does not include the reflex mirror is exemplified as an example of the imaging apparatus 10, the technology of the present disclosure is not limited thereto. The imaging apparatus 10 may be a digital camera of other types such as a fixed lens type.

An imaging element 38 is disposed in the imaging apparatus main body 12. In a case where the interchangeable lens 14 is mounted on the imaging apparatus main body 12, subject light that shows a subject is transmitted through the interchangeable lens 14, and an image of the subject light is formed on the imaging element 38. Image data (for example, refer to FIG. 4 and FIG. 5) that indicates an image of the subject is generated by the imaging element 38.

A hybrid finder (registered trademark) 16 is disposed in the imaging apparatus main body 12. For example, the hybrid finder 16 here refers to a finder in which an optical viewfinder (hereinafter, referred to as the OVF) and an electronic viewfinder (hereinafter, referred to as the EVF) are selectively used. The abbreviation OVF stands for "optical viewfinder". In addition, the abbreviation EVF stands for "electronic viewfinder".

A finder switching lever 18 is disposed on a front surface of the imaging apparatus main body 12. An optical image visible by the OVF and a live view image that is an electronic image visible by the EVF are switched by rotationally moving the finder switching lever 18 in a direction of arrow SW. The "live view image" here refers to a display motion picture image based on the image data obtained by imaging using the imaging element 38. The live view image is generally referred to as a live preview image. A release button 20 and a dial 23 are disposed on an upper surface of the imaging apparatus main body 12. The dial 23 operates in a case of setting an operation mode of an imaging system, an operation mode of a playback system, and the like. Accordingly, an imaging mode and a playback mode are selectively set as an operation mode in the imaging apparatus 10.

The release button 20 functions as an imaging preparation instruction portion and an imaging instruction portion, and a push operation of two stages of an imaging preparation instruction state and an imaging instruction state can be detected. For example, the imaging preparation instruction state refers to a state where a push is performed to an intermediate position (half push position) from a standby position, and the imaging instruction state refers to a state where a push is performed to a final push position (full push position) exceeding the intermediate position. Hereinafter, the "state where a push is performed to the half push position from the standby position" will be referred to as a "half push state", and the "state where a push is performed to the full push position from the standby position" will be referred to as a "full push state".

Figure 2:
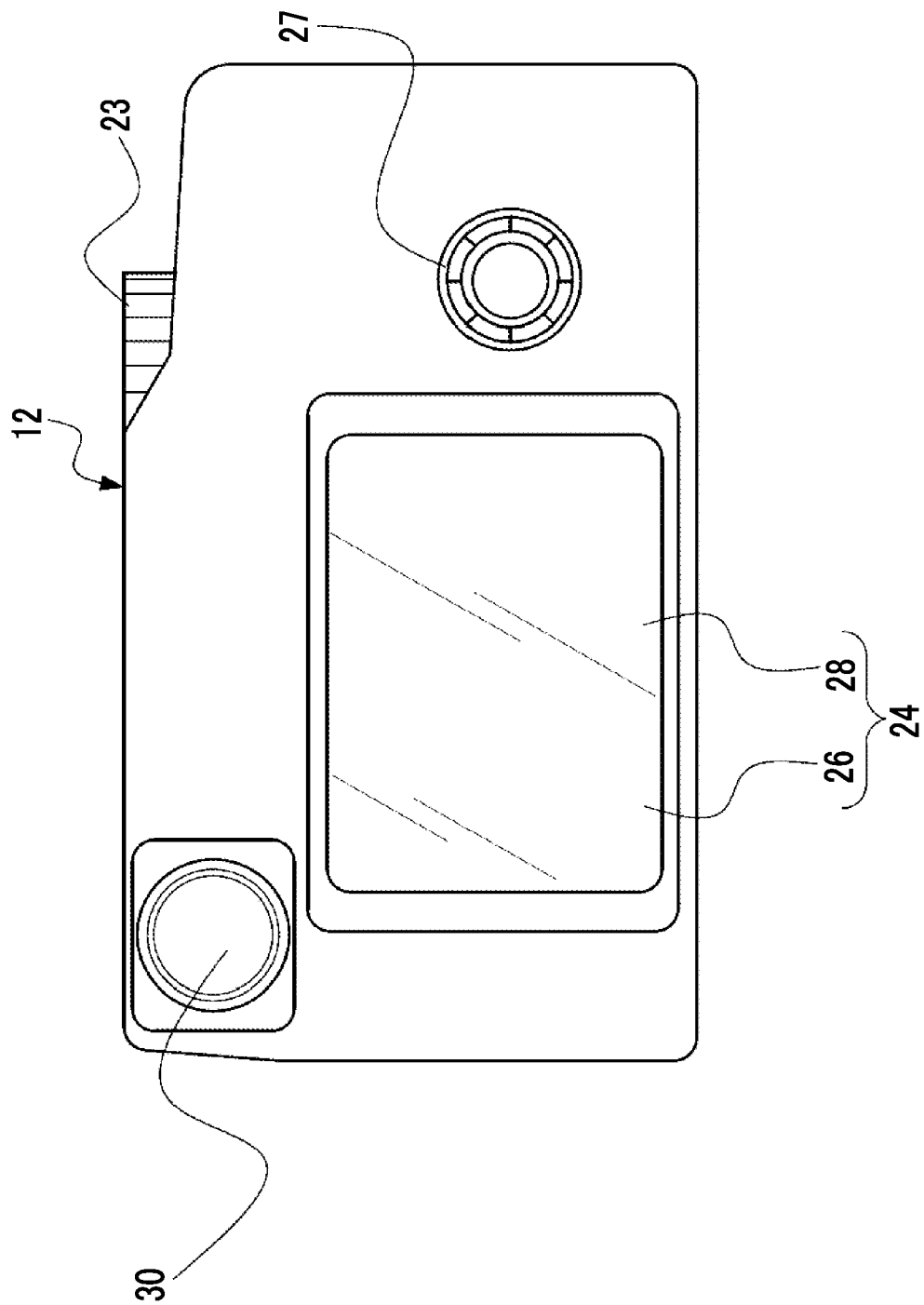
FIG. 2 is a rear view illustrating an example of the exterior on a rear surface side of the imaging apparatus illustrated in FIG. 1.

As illustrated in FIG. 2 as an example, a touch panel display 24, an instruction key 27, and a finder eyepiece portion 30 are disposed on a rear surface of the imaging apparatus main body 12.

Figure 4:
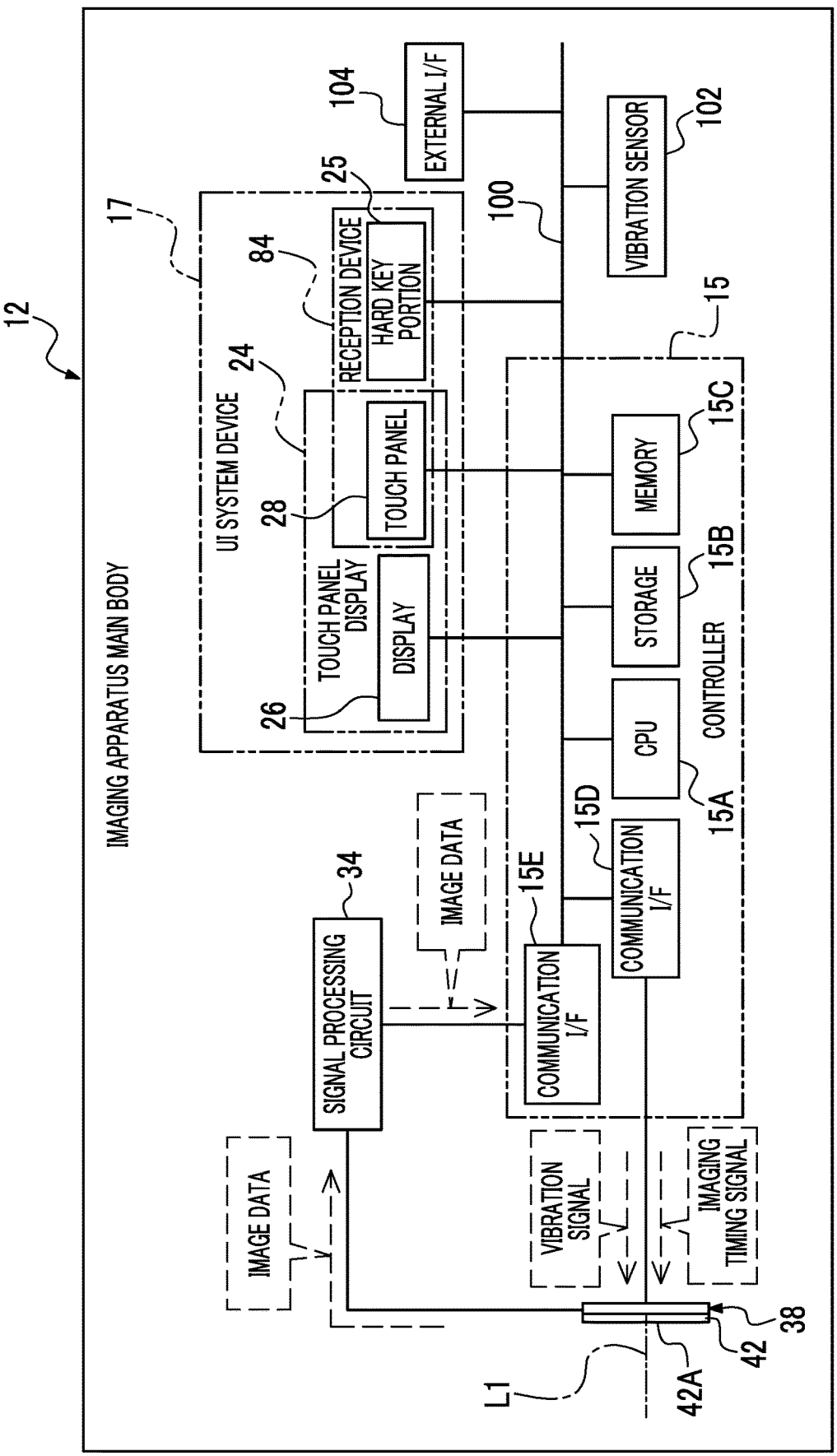
FIG. 4 is a block diagram illustrating an example of a hardware configuration of an electric system of an imaging apparatus main body included in the imaging apparatus according to the first to fourth embodiments.

The touch panel display 24 comprises a display 26 and a touch panel 28 (refer to FIG. 4). An organic EL display is exemplified as an example of the display 26. Instead of the organic EL display, the display 26 may be a display of other types such as a liquid crystal display or an inorganic EL display.

The display 26 and the EVF are an example of a "display device" according to the embodiments of the technology of the present disclosure. Display of the EVF is equivalent to display of the display 26 and thus, will not be described below. However, in the present specification, display on the display 26 can be substituted with display on the EVF.

The display 26 displays images, text information, and the like. The display 26 is used for displaying the live view image obtained by consecutive imaging in a case where the imaging apparatus 10 is in the imaging mode. In addition, the display 26 is used for displaying a still picture image obtained by imaging in a case where an imaging instruction for the still picture image is provided. Furthermore, the display 26 is used for displaying a playback image and displaying a menu screen and the like in a case where the imaging apparatus 10 is in the playback mode.

The touch panel 28 is a transmissive touch panel and is overlaid on a surface of a display region of the display 26. The touch panel 28 receives an instruction from a user by detecting a contact of an instruction object such as a finger or a stylus pen.

Here, while an out-cell touch panel display in which the touch panel 28 is overlaid on the surface of the display region of the display 26 is exemplified as an example of the touch panel display 24, the out-cell touch panel display is merely an example. For example, an on-cell or in-cell touch panel display can also be applied as the touch panel display 24.

The instruction key 27 receives various instructions. For example, the "various instructions" here refer to various instructions such as an instruction to display a menu screen on which various menus can be selected, an instruction to select one or a plurality of menus, an instruction to confirm a selected content, an instruction to delete the selected content, zoom in, zoom out, and frame advance.

Figure 3:
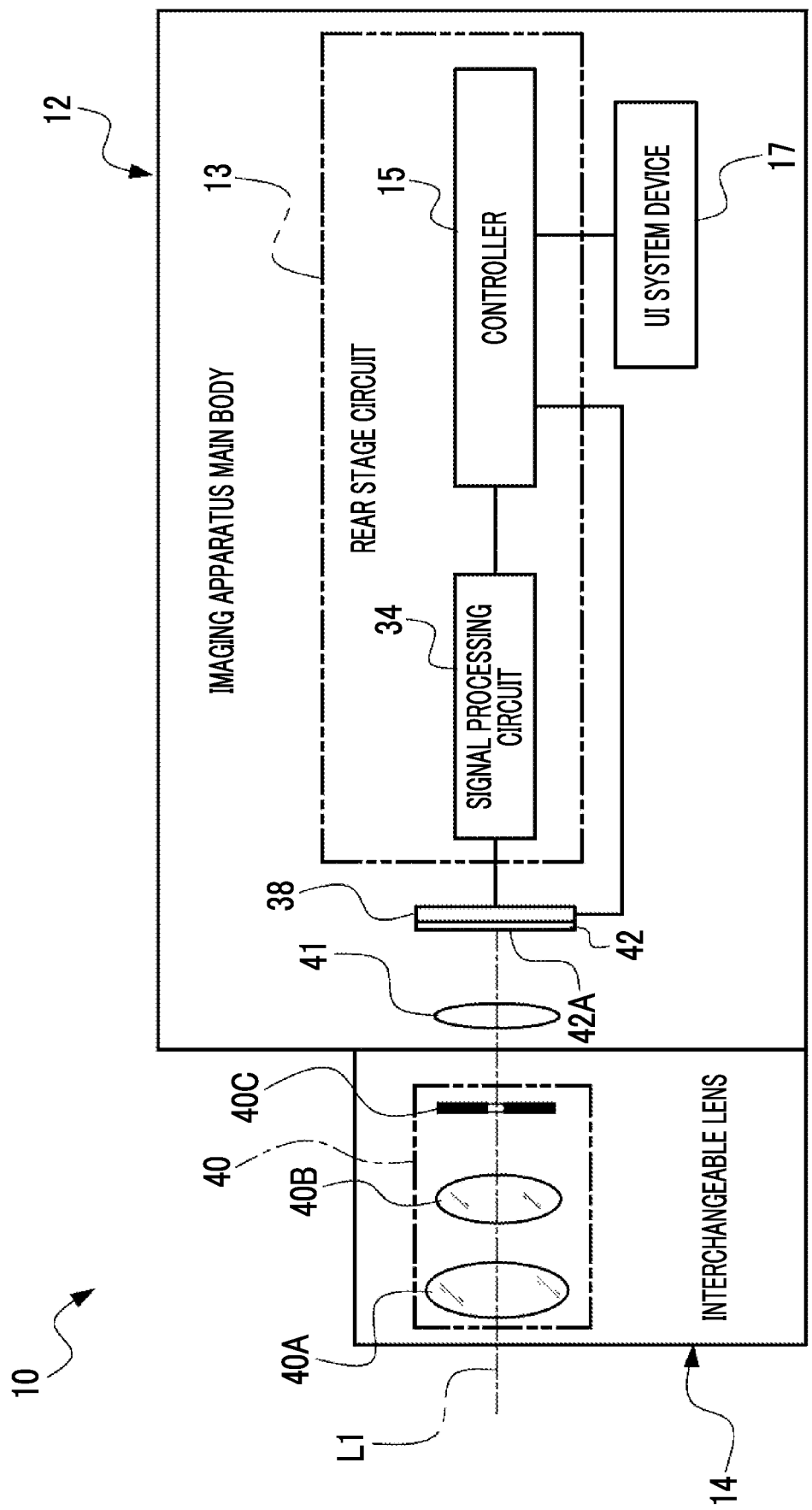
FIG. 3 is a block diagram illustrating an example of a configuration of the imaging apparatus according to the first to fourth embodiments.

As illustrated in FIG. 3 as an example, the interchangeable lens 14 includes an imaging lens 40. The imaging lens 40 comprises an objective lens 40A, a focus lens 40B, and a stop 40C. The objective lens 40A, the focus lens 40B, and the stop 40C are arranged in an order of the objective lens 40A, the focus lens 40B, and the stop 40C along an optical axis L1 from a subject side (object side) to an imaging apparatus main body 12 side (image side). The focus lens 40B and the stop 40C operate by receiving motive power from a driving source (not illustrated) such as a motor. That is, the focus lens 40B moves along the optical axis L1 in response to the provided motive power. In addition, the stop 40C adjusts exposure by operating in response to the provided motive power.

The imaging apparatus main body 12 comprises a rear stage circuit 13, a UI system device 17, a mechanical shutter 41, and the imaging element 38. The rear stage circuit 13 is a circuit positioned on a rear stage of the imaging element 38. The rear stage circuit 13 includes a controller 15 and a signal processing circuit 34. The controller 15 is connected to the UI system device 17, the signal processing circuit 34, and the imaging element 38 and controls the entire electric system of the imaging apparatus 10.

The imaging element 38 comprises a photoelectric conversion element 42 having a light receiving surface 42A. In the present embodiment, the imaging element 38 is a CMOS image sensor. In addition, while the CMOS image sensor is illustrated here as the imaging element 38, the technology of the present disclosure is not limited thereto. For example, the technology of the present disclosure is also established in a case where the imaging element 38 is an image sensor of other types such as a CCD image sensor.

The mechanical shutter 41 operates by receiving motive power from a driving source (not illustrated) such as a motor. In a case where the interchangeable lens 14 is mounted on the imaging apparatus main body 12, the subject light showing the subject is transmitted through the imaging lens 40, and the image of the subject light is formed on the light receiving surface 42A through the mechanical shutter 41.

The UI system device 17 is a device that presents information to the user or receives the instruction from the user. The controller 15 acquires various types of information from the UI system device 17 and controls the UI system device 17.

The imaging element 38 is connected to the controller 15 and generates the image data indicating the image of the subject by imaging the subject under control of the controller 15.

The imaging element 38 is connected to the signal processing circuit 34. The signal processing circuit 34 is an LSI, specifically, a device including an ASIC and an FPGA. The controller 15 acquires various types of information from the signal processing circuit 34 and controls the imaging element 38. The imaging element 38 outputs the image data generated by the photoelectric conversion element 42 to the signal processing circuit 34 under control of the controller 15.

The signal processing circuit 34 is a circuit that performs various types of signal processing on the image data input from the imaging element 38. The various types of signal processing performed by the signal processing circuit 34 include well-known signal processing such as white balance adjustment, sharpness adjustment, gamma correction, color space conversion processing, and color difference correction.

The various types of signal processing performed by the signal processing circuit 34 may be performed in a distributed manner by the signal processing circuit 34 and the imaging element 38. That is, at least a part of the various types of signal processing performed by the signal processing circuit 34 may be performed by a processing circuit 110 (refer to FIG. 7) of the imaging element 38.

In a first embodiment, while the device including the ASIC and the FPGA is illustrated as the signal processing circuit 34, the technology of the present disclosure is not limited thereto. For example, the signal processing circuit 34 may be a device including an ASIC, an FPGA, or a PLD, a device including an FPGA and a PLD, or a device including an ASIC and a PLD.

In addition, the signal processing circuit 34 may be a computer including a CPU, a storage, and a memory. Here, the storage refers to a non-volatile storage device. A flash memory is exemplified as an example of the non-volatile storage device. However, the technology of the present disclosure is not limited thereto. An EEPROM, an HDD, and/or an SSD or the like may be used. In addition, the memory temporarily stores various types of information and is used as a work memory. A RAM is exemplified as an example of the memory. However, the technology of the present disclosure is not limited thereto. A storage device of other types may be used. The number of CPUs included in the computer may be singular or plural. In addition, a GPU may be used instead of the CPU. In addition, the signal processing circuit 34 may be implemented by a combination of a hardware configuration and a software configuration.

As illustrated in FIG. 4 as an example, the controller 15 comprises a CPU 15A, a storage 15B, and a memory 15C. In addition, the controller 15 comprises communication I/Fs 15D and 15E. The CPU 15A is an example of a "control device" according to the embodiments of the technology of the present disclosure. The CPU 15A, the storage 15B, the memory 15C, the communication I/F 15D, and the communication I/F 15E are connected through a bus 100.

In the example illustrated in FIG. 4, while one bus is illustrated as the bus 100 for convenience of illustration, a plurality of buses may be used. The bus 100 may be a serial bus or may be a parallel bus including a data bus, an address bus, a control bus, and the like.

The storage 15B stores various parameters and various programs. The storage 15B is a non-volatile storage device. Here, a flash memory is employed as an example of the storage 15B. The flash memory is merely an example. Instead of the flash memory or together with the flash memory, an EEPROM, an HDD, and/or an SSD or the like may be applied as the storage 15B. In addition, the memory 15C temporarily stores various types of information and is used as a work memory. A RAM is exemplified as an example of the memory 15C. However, the technology of the present disclosure is not limited thereto. A storage device of other types may be used.

The storage 15B stores various programs. The CPU 15A reads out a necessary program from the storage 15B and executes the read program on the memory 15C. The CPU 15A controls the entire imaging apparatus 10 in accordance with the program executed on the memory 15C.

The communication I/F 15D is connected to the imaging element 38 and controls exchange of various types of information between the imaging element 38 and the CPU 15A. The CPU 15A controls the imaging element 38 through the communication I/F 15D. For example, the CPU 15A controls a timing of imaging performed by the imaging element 38 by supplying an imaging timing signal for defining the timing of imaging to the imaging element 38 through the communication I/F 15D.

The communication I/F 15E is connected to the signal processing circuit 34 and controls exchange of various types of information between the signal processing circuit 34 and the CPU 15A. The signal processing circuit 34 is controlled by the CPU 15A through the communication I/F 15E. The image data on which the various types of signal processing are performed by the signal processing circuit 34 under control of the CPU 15A is output to the communication I/F 15E by the signal processing circuit 34. The communication I/F 15E receives the image data output from the signal processing circuit 34 and transfers the received image data to the CPU 15A.

An external I/F 104 is connected to the bus 100. The external I/F 104 is a communication device configured with a circuit. Here, while the device configured with the circuit is illustrated as the external I/F 104, the device is merely an example. The external I/F 104 may be a device including an ASIC, an FPGA, and/or a PLD. In addition, the external I/F 104 may be implemented by a combination of a hardware configuration and a software configuration.

A USB interface is exemplified as an example of the external I/F 104. An external apparatus (not illustrated) such as a smart device, a personal computer, a server, a USB memory, a memory card, and/or a printer can be directly or indirectly connected to the USB interface. The external I/F 104 controls exchange of various types of information between the CPU 15A and the external apparatus.

The imaging apparatus main body 12 comprises a vibration sensor 102. The vibration sensor 102 is a device including an angular velocity sensor and detects a vibration exerted on the imaging apparatus 10. For example, a vibration exerted on the imaging apparatus 10 by the user holding the imaging apparatus 10, a vibration caused by a wind to the imaging apparatus 10 installed on a support table such as a tripod, and a vibration exerted from a vehicle are exemplified as the vibration exerted on the imaging apparatus 10. The vibration sensor 102 is connected to the bus 100. In a case where the vibration sensor 102 detects the vibration, the vibration sensor 102 outputs a vibration signal indicating the detected vibration to the CPU 15A through the bus 100. The CPU 15A transfers the vibration signal input from the vibration sensor 102 to the imaging element 38 through the communication I/F 15D. The vibration signal transferred to the imaging element 38 is acquired by a vibration signal acquisition portion 110C2 (refer to FIG. 10) described later.

The imaging apparatus 10 is an example of an "apparatus including an imaging element" according to the embodiments of the technology of the present disclosure. The vibration sensor 102 is an example of a "detection portion (sensor)" according to the embodiments of the technology of the present disclosure.

The UI system device 17 comprises the touch panel display 24 and a reception device 84. The display 26 and the touch panel 28 are connected to the bus 100. Accordingly, the CPU 15A displays various types of information on the display 26 and operates in accordance with various instructions received by the touch panel 28.

The reception device 84 comprises a hard key portion 25. The hard key portion 25 includes a plurality of hard keys and includes the release button 20 (refer to FIG. 1), the dial 23 (refer to FIG. 1 and FIG. 2), and the instruction key 22 (refer to FIG. 2). The hard key portion 25 is connected to the bus 100, and the CPU 15A acquires an instruction received by the hard key portion 25 and operates in accordance with the acquired instruction.

As illustrated in FIG. 5A as an example, the imaging timing signal is input into the imaging element 38 from the controller 15. The imaging timing signal includes a vertical synchronization signal and a horizontal synchronization signal. The vertical synchronization signal is a synchronization signal for defining a start timing of reading of the image data for each frame from the photoelectric conversion element 42. The horizontal synchronization signal is a synchronization signal for defining a start timing of reading of the image data for each horizontal line from the photoelectric conversion element 42.

In the imaging element 38, the image data is read out from the photoelectric conversion element 42 at an imaging frame rate decided in accordance with the vertical synchronization signal input from the controller 15. In addition, in the imaging element, the image data read out from the photoelectric conversion element 42 is processed, and the processed image data is output at an output frame rate. The imaging frame rate is an example of a "first frame rate" according to the embodiments of the technology of the present disclosure, and the output frame rate is an example of a "second frame rate" according to the embodiments of the technology of the present disclosure.

The imaging frame rate and the output frame rate have a relationship of "imaging frame rate>output frame rate". That is, the output frame rate is a frame rate lower than the imaging frame rate. For example, the imaging frame rate is a frame rate at which the image data of eight frames is read out from the photoelectric conversion element 42 within a period T as illustrated in FIG. 5A, and the output frame rate is a frame rate at which the image data of two frames is output within the period T as illustrated in FIG. 5B. Any of the imaging frame rate and the output frame rate is a variable frame rate.

In the first embodiment, 240 fps is employed as an example of the imaging frame rate, and 60 fps is employed as an example of the output frame rate. The imaging frame rate and the output frame rate illustrated here are merely an example. For example, the imaging frame rate may be a frame rate exceeding 240 fps or may be a frame rate less than 240 fps. In addition, the output frame rate may be a frame rate exceeding 60 fps within a range not exceeding the imaging frame rate or may be a frame rate less than 60 fps within the range not exceeding the imaging frame rate. That is, any of the imaging frame rate and the output frame rate may be a variable frame rate within a range satisfying the relationship "imaging frame rate>output frame rate".

Figure 6:
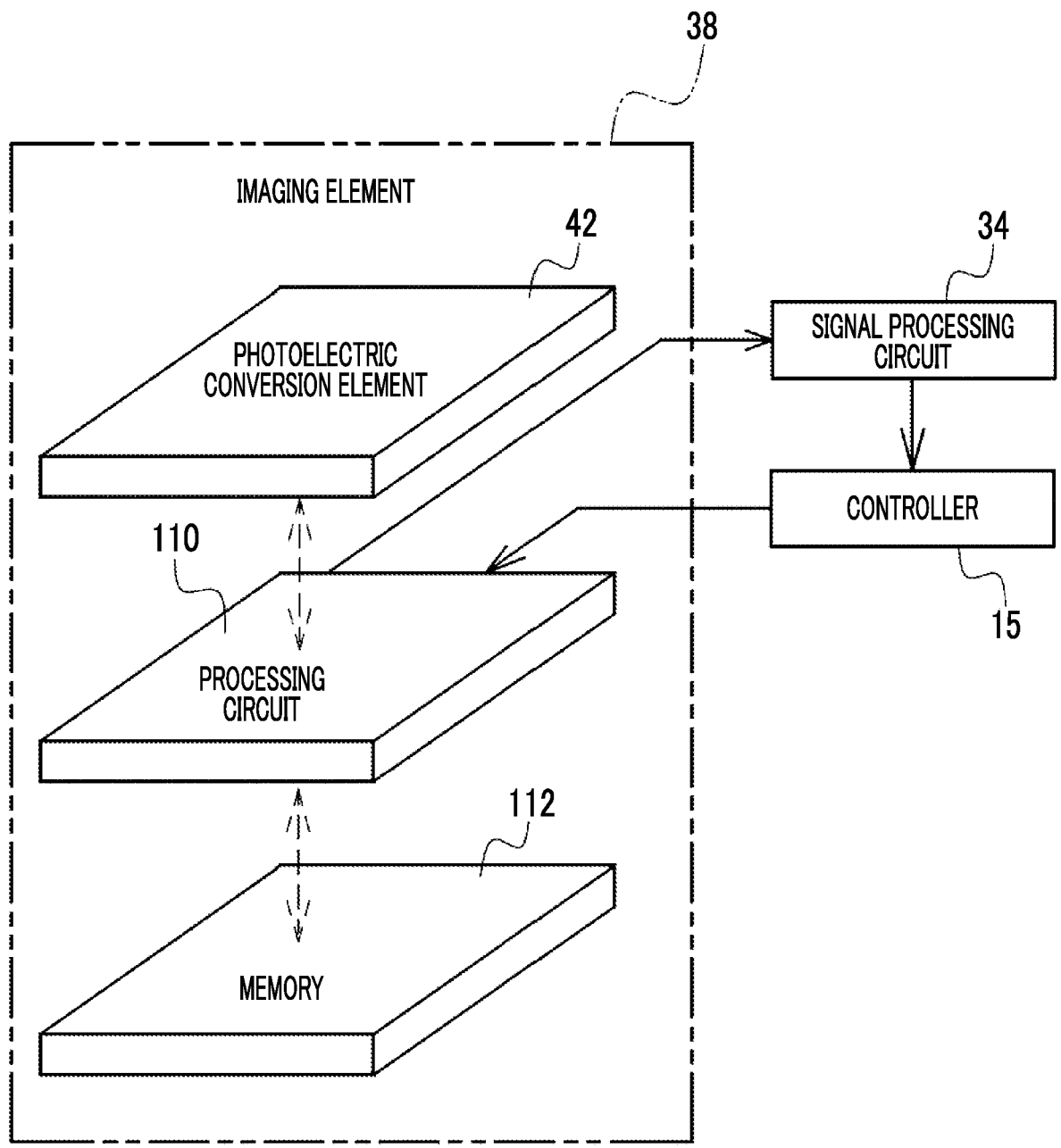
FIG. 6 is a conceptual diagram illustrating an example of a laminated structure of the imaging element included in the imaging apparatus according to the first to fourth embodiments.

As illustrated in FIG. 6 as an example, the imaging element 38 incorporates the photoelectric conversion element 42, the processing circuit 110, and a memory 112. The imaging element 38 is an imaging element in which the photoelectric conversion element 42, the processing circuit 110, and the memory 112 are formed in one chip. That is, the photoelectric conversion element 42, the processing circuit 110, and the memory 112 are formed in one package. In the imaging element 38, the photoelectric conversion element 42 is laminated with the processing circuit 110 and the memory 112. Specifically, the photoelectric conversion element 42 and the processing circuit 110 are electrically connected to each other by a bump (not illustrated) of copper or the like having conductivity. The processing circuit 110 and the memory 112 are also electrically connected to each other by a bump (not illustrated) of copper or the like having conductivity. While a three-layer structure of the photoelectric conversion element 42, the processing circuit 110, and the memory 112 is illustrated here, the technology of the present disclosure is not limited thereto. A two-layer structure of the photoelectric conversion element 42 and a memory layer in which the processing circuit 110 and the memory 112 are formed in one layer may be used. The imaging element 38 is an example of a "laminated imaging element" according to the embodiments of the technology of the present disclosure.

For example, the processing circuit 110 is an LSI. The memory 112 is a memory of which a writing timing and a reading timing are different. Here, a DRAM is employed as an example of the memory 112. The technology of the present disclosure is also established in a case where the memory 112 is a storage device of other types such as an SRAM.

The processing circuit 110 is a device including an ASIC and an FPGA and controls the entire imaging element 38 in accordance with an instruction of the controller 15. Here, while the device including the ASIC and the FPGA is illustrated as the processing circuit 110, the technology of the present disclosure is not limited thereto. For example, the processing circuit 110 may be a device including an ASIC, an FPGA, or a PLD, a device including an FPGA and a PLD, or a device including an ASIC and a PLD.

In addition, the processing circuit 110 may be a computer including a CPU, a storage, and a memory. The storage refers to a non-volatile storage device such as a flash memory. The memory temporarily stores various types of information and is used as a work memory. A RAM is exemplified as an example of the memory. However, the technology of the present disclosure is not limited thereto. A storage device of other types may be used. The number of CPUs included in the computer may be singular or plural. In addition, a GPU may be used instead of the CPU. In addition, the processing circuit 110 may be implemented by a combination of a hardware configuration and a software configuration.

The photoelectric conversion element 42 includes a plurality of photodiodes arranged in a matrix form. Photodiodes of "4896×3265" pixels are exemplified as an example of the plurality of photodiodes.

Color filters are arranged in each photodiode included in the photoelectric conversion element 42. The color filters include a G filter corresponding to green (G) that most contributes to obtaining a brightness signal, an R filter corresponding to red (R), and a B filter corresponding to blue (B).

The photoelectric conversion element 42 includes R pixels, G pixels, and B pixels. The R pixels are pixels corresponding to photodiodes in which the R filter is arranged. The G pixels are pixels corresponding to photodiodes in which the G filter is arranged. The B pixels are pixels corresponding to photodiodes in which the B filter is arranged. The R pixels, the G pixels, and the B pixels are arranged with predetermined periodicity in each of a row direction (horizontal direction) and a column direction (vertical direction). In the first embodiment, the R pixels, the G pixels, and the B pixels are arranged with periodicity corresponding to X-Trans (registered trademark) arrangement. While the X-Trans arrangement is illustrated here, the technology of the present disclosure is not limited thereto. Arrangement of the R pixels, the G pixels, and the B pixels may be Bayer arrangement or honeycomb arrangement.

The imaging element 38 has a so-called electronic shutter function and controls an electric charge accumulation time period of each photodiode in the photoelectric conversion element 42 by performing the electronic shutter function under control of the controller 15. The electric charge accumulation time period refers to a so-called shutter speed.

In the imaging element 38, imaging for the still picture image and imaging for the live view image are selectively performed. The imaging for the still picture image is implemented by performing the electronic shutter function and operating the mechanical shutter 41 (refer to FIG. 3). The imaging for the live view image is implemented by performing the electronic shutter function without operating the mechanical shutter 41. While imaging using the mechanical shutter 41 is illustrated here, the mechanical shutter 41 is not essential for implementing imaging. Even in a case where the mechanical shutter 41 is not present, the imaging for the live view image and the imaging for the still picture image are implemented by performing the electronic shutter function. In addition, while the rolling shutter method is illustrated here, the technology of the present disclosure is not limited thereto. A global shutter method may be applied instead of the rolling shutter method.

Figure 7:
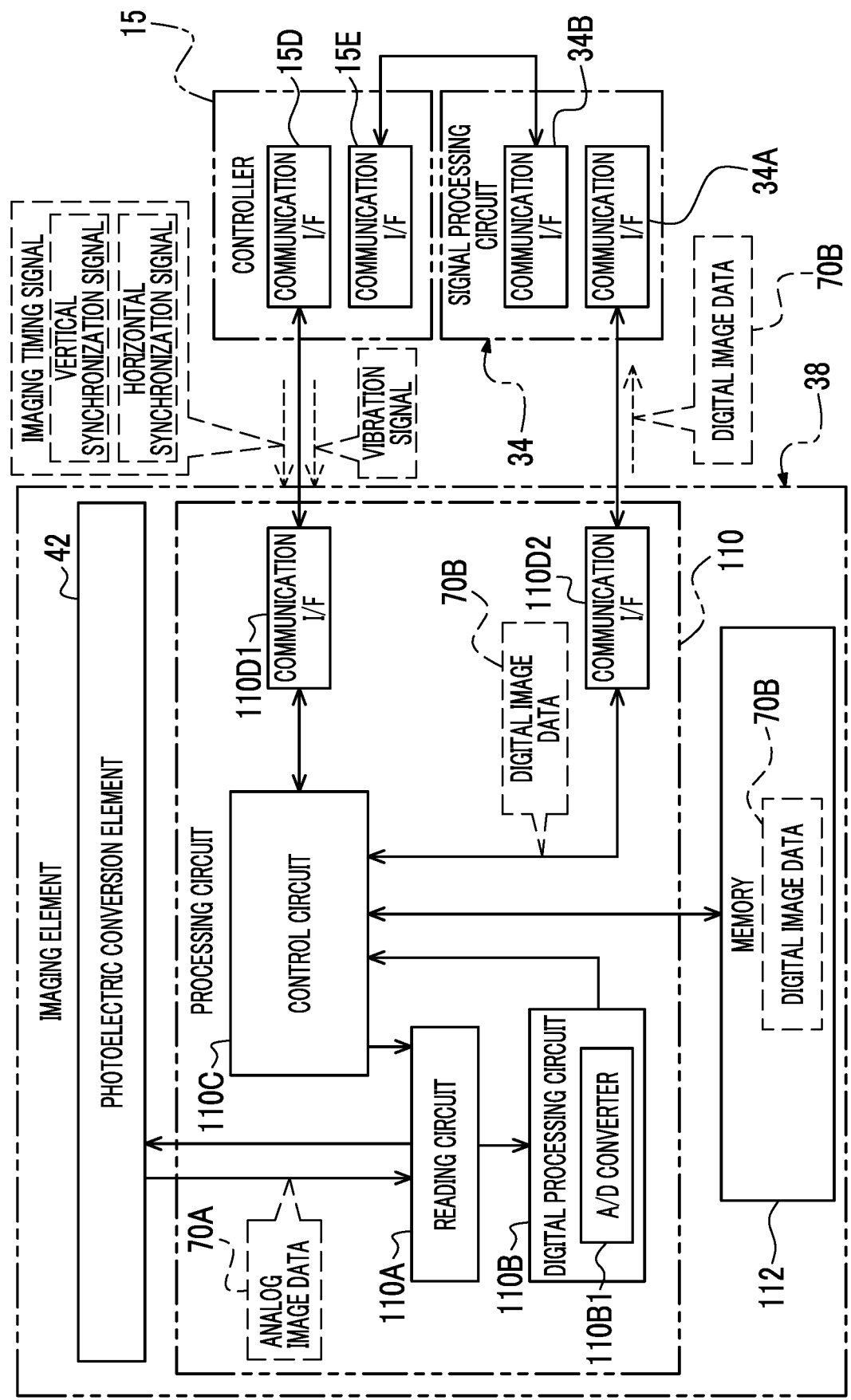
FIG. 7 is a block diagram illustrating an example of a hardware configuration of an electric system of the imaging element included in the imaging apparatus according to the first to fourth embodiments.

As illustrated in FIG. 7 as an example, the processing circuit 110 comprises communication I/Fs 110D1 and 110D2. The communication I/F 15D of the controller 15 is connected to the communication I/F 110D1 of the processing circuit 110 and outputs the imaging timing signal to the communication I/F 110D1. The communication I/F 110D1 receives the imaging timing signal output from the communication I/F 15D.

The signal processing circuit 34 comprises communication I/Fs 34A and 34B. The communication I/F 34A is connected to the communication I/F 110D2 of the imaging element 38. The communication I/F 110D2 of the processing circuit 110 outputs various types of information such as the image data (hereinafter, simply referred to as the "various types of information") to the communication I/F 34A of the signal processing circuit 34. The communication I/F 34A receives the various types of information output from the communication I/F 110D2. The signal processing circuit 34 performs signal processing as necessary on the various types of information received by the communication I/F 34A. The communication I/F 34B is connected to the communication I/F 15E of the controller 15 and outputs the various types of information to the communication I/F 15E of the controller 15. The communication I/F 15E receives the various types of information output from the communication I/F 34B.

In the imaging element 38, the processing circuit 110 comprises, in addition to the communication I/F 110D1 and the communication I/F 110D2, a reading circuit 110A, a digital processing circuit 110B, and a control circuit 110C. The reading circuit 110A is an example of a "reading portion (reading circuit)" according to the embodiments of the technology of the present disclosure.

The reading circuit 110A is connected to each of the photoelectric conversion element 42, the digital processing circuit 110B, and the control circuit 110C. The digital processing circuit 110B is connected to the control circuit 110C. The control circuit 110C is connected to each of the memory 112, the communication I/F 110D1, and the communication I/F 110D2.

As illustrated in FIG. 7 as an example, the image data is broadly divided into analog image data 70A and digital image data 70B. Hereinafter, for convenience of description, the analog image data 70A and the digital image data 70B will be referred to as the "image data" without the reference signs unless otherwise necessary to distinguish therebetween.

Each of the communication I/Fs 110D1 and 110D2 of the processing circuit 110 is a communication device configured with a circuit. In addition, each of the communication I/Fs 15D and 15E of the controller 15 is a communication device configured with a circuit. Furthermore, each of the communication I/Fs 34A and 34B of the signal processing circuit 34 is a communication device configured with a circuit.

The communication I/F 110D1 of the processing circuit 110 and the communication I/F 15D of the controller 15 are connected in accordance with a PCIe connection standard. In addition, the communication I/F 110D2 of the processing circuit 110 and the communication I/F 34A of the signal processing circuit 34 are connected in accordance with the PCIe connection standard. Furthermore, the communication I/F 34B of the signal processing circuit 34 and the communication I/F 15E of the controller 15 are connected in accordance with the PCIe connection standard. Hereinafter, the communication I/F 110D1, the communication I/F 110D2, the communication I/F 34A, the communication I/F 34B, the communication I/F 15E, and the communication I/F 15D will be referred to as a "communication I/F" without the reference signs unless otherwise necessary to distinguish therebetween.

Here, a communication device configured with a circuit is employed as a communication I/F. A device including an ASIC, an FPGA, and/or a PLD is exemplified as an example of the communication I/F. In addition, the communication I/F may be a computer including a CPU, a storage such as a flash memory, and a memory such as a RAM. In this case, the number of CPUs included in the computer may be singular or plural. A GPU may be used instead of the CPU. In addition, the communication I/F may be implemented by a combination of a hardware configuration and a software configuration.

The communication I/F 110D1 receives the imaging timing signal output from the communication I/F 15D of the controller 15 and transfers the received imaging timing signal to the control circuit 110C. In addition, the communication I/F 110D1 receives the vibration signal output from the communication I/F 15D of the controller 15 and transfers the received vibration signal to the control circuit 110C.

The reading circuit 110A controls the photoelectric conversion element 42 and reads out the analog image data 70A obtained by imaging using the photoelectric conversion element 42, at the imaging frame rate from the photoelectric conversion element 42 under control of the control circuit 110C. Reading of the analog image data 70A from the photoelectric conversion element 42 is performed in accordance with the imaging timing signal which is input into the processing circuit 110 from the controller 15.

Specifically, first, the communication I/F 110D1 receives the imaging timing signal from the controller 15 and transfers the received imaging timing signal to the control circuit 110C. Next, the control circuit 110C transfers the imaging timing signal transferred from the communication I/F 110D1 to the reading circuit 110A. That is, the vertical synchronization signal and the horizontal synchronization signal are transferred to the reading circuit 110A. The reading circuit 110A starts reading out the analog image data 70A in units of frames from the photoelectric conversion element 42 in accordance with the vertical synchronization signal transferred from the control circuit 110C. In addition, the reading circuit 110A starts reading out the analog image data 70A in units of horizontal lines in accordance with the horizontal synchronization signal transferred from the control circuit 110C.

The reading circuit 110A performs analog signal processing on the analog image data 70A read out from the photoelectric conversion element 42. The analog signal processing includes well-known processing such as noise cancelation processing and analog gain processing. The noise cancelation processing is processing of canceling a noise caused by variations in characteristics between pixels included in the photoelectric conversion element 42. The analog gain processing is processing of applying a gain to the analog image data 70A. The analog image data 70A on which the analog signal processing is performed in such a manner is output to the digital processing circuit 110B by the reading circuit 110A.

The digital processing circuit 110B comprises an A/D converter 110B1. The A/D converter 110B1 performs A/D conversion on the analog image data 70A.

The digital processing circuit 110B performs digital signal processing on the analog image data 70A input from the reading circuit 110A. For example, the digital signal processing includes the A/D conversion performed by the A/D converter 110B1, and digital gain processing.

The A/D converter 110B1 performs the A/D conversion on the analog image data 70A. Accordingly, the analog image data 70A is digitized, and the digital image data 70B is obtained as RAW data. The digital gain processing is performed on the digital image data 70B by the digital processing circuit 110B. The digital gain processing refers to processing of applying a gain to the digital image data 70B. The digital image data 70B obtained by performing the digital signal processing in such a manner is output to the control circuit 110C by the digital processing circuit 110B.

The memory 112 is a memory that can store the digital image data 70B of a plurality of frames in units of frames. The control circuit 110C stores the digital image data 70B input from the digital processing circuit 110B in the memory 112. The memory 112 has a storage region in units of pixels. The digital image data 70B is stored in a corresponding storage region of the memory 112 in units of pixels by the control circuit 110C. The control circuit 110C can randomly access the memory 112 and acquires the digital image data 70B from the memory 112.

In the signal processing circuit 34, the digital image data 70B input from the communication I/F 110D2 is received by the communication I/F 34A, and the various types of signal processing are performed on the received digital image data 70B.

Figure 8:
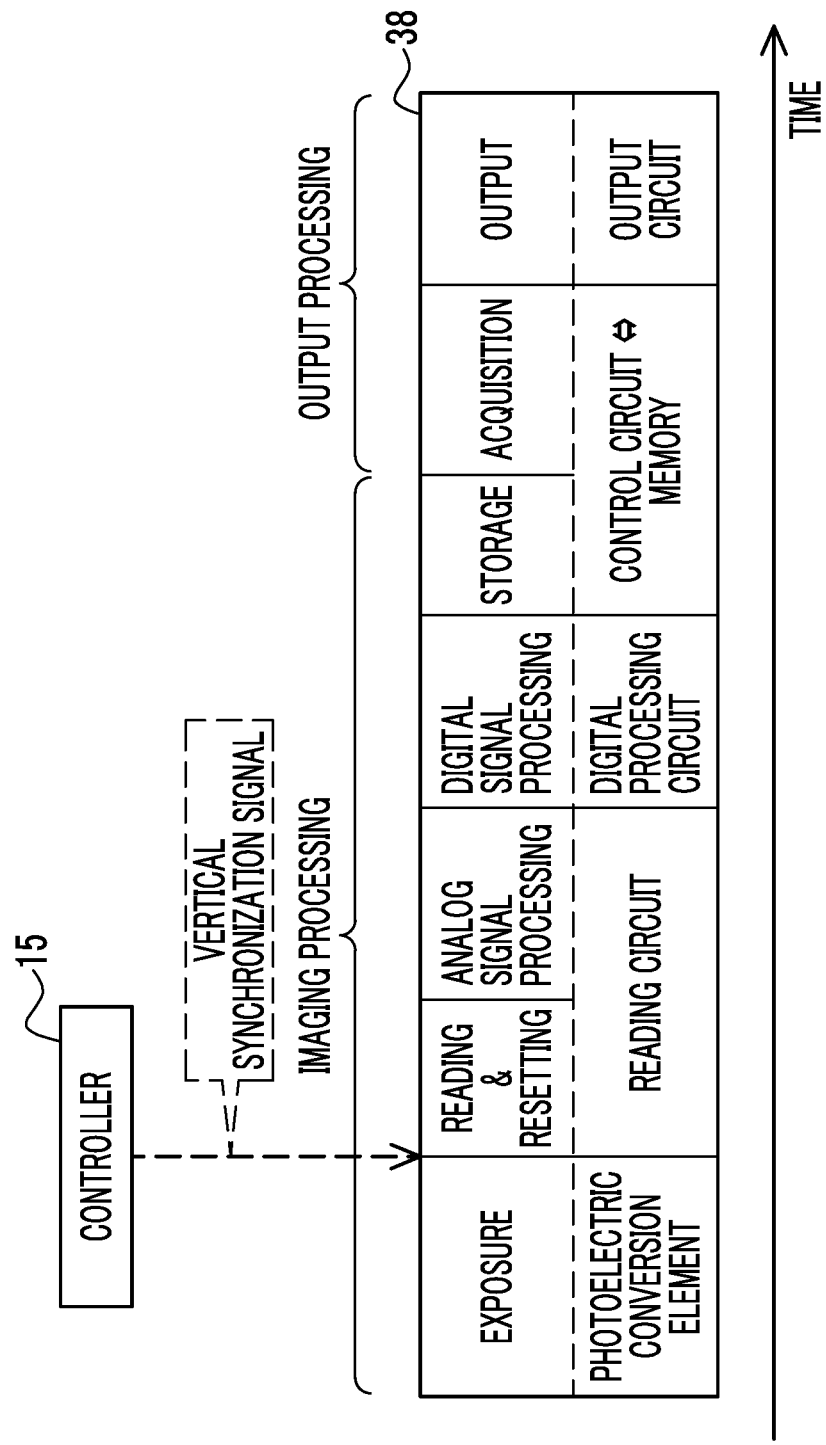
FIG. 8 is a conceptual diagram illustrating an example of contents of imaging processing and output processing performed by the imaging element according to the first to fourth embodiments.

As illustrated in FIG. 8 as an example, in the imaging element 38, processing including imaging processing and output processing is performed.

In the imaging processing, exposure, reading of the analog image data 70A, resetting of the photoelectric conversion element 42, the analog signal processing, the digital signal processing, and storage of the digital image data 70B are performed in this order.

In the imaging processing, first, the exposure is performed by the photoelectric conversion element 42. Reading of the analog image data 70A, resetting of the photoelectric conversion element 42, and the analog signal processing are performed by the reading circuit 110A. A period in which the exposure is performed by the photoelectric conversion element 42 is a period in which reading of the analog image data 70A and resetting of the photoelectric conversion element 42 are not performed. The digital signal processing is performed by the digital processing circuit 110B. The digital image data 70B obtained by performing the digital signal processing is stored in the memory 112 by the control circuit 110C.

In the output processing, acquisition of the digital image data 70B and output of the digital image data 70B are performed. That is, in the output processing, first, the control circuit 110C acquires the digital image data 70B from the memory 112. The control circuit 110C outputs the digital image data 70B acquired from the memory 112 or image data (for example, combined image data 70C (refer to FIG. 12) described later) based on the digital image data 70B to the signal processing circuit 34 through the communication I/F 110D2.

Figure 9:
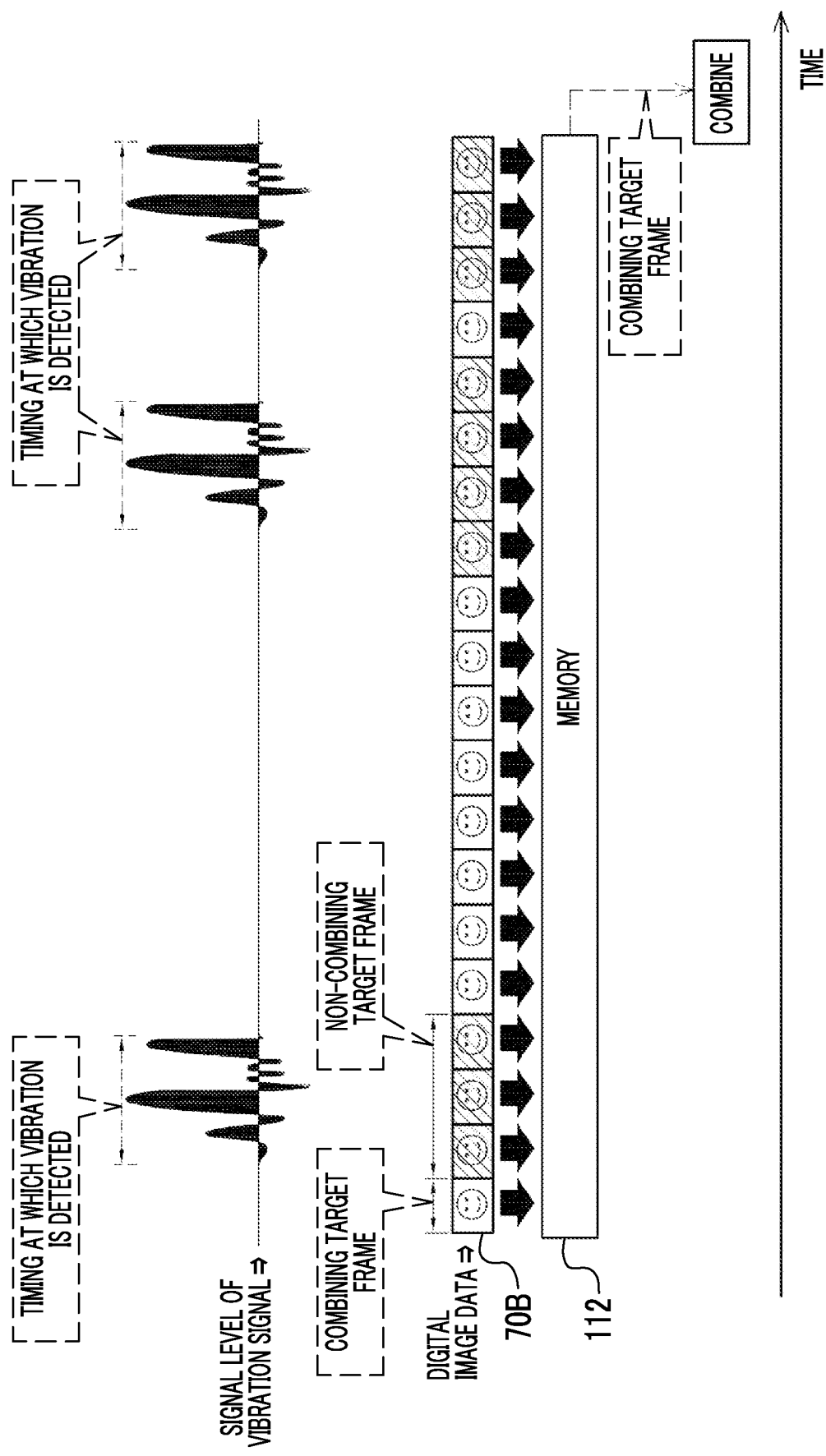
FIG. 9 is a time chart illustrating an example of a process of storing digital image data obtained by imaging using the imaging element according to the first embodiment in a memory and combining the digital image data.

As illustrated in FIG. 9 as an example, the digital image data 70B obtained by imaging using the imaging element 38 is stored in the memory 112 for each frame in accordance with the imaging frame rate by the control circuit 110C using a FIFO method. The digital image data 70B of the plurality of frames stored in the memory 112 is selectively combined by the control circuit 110C. In the memory 112, the digital image data 70B of a frame set as a combining target (hereinafter, referred to as "combining target frame") and the digital image data 70B of a frame not set as the combining target (hereinafter, referred to as a "non-combining target frame") are stored. In the digital image data 70B of the plurality of frames stored in the memory 112, the digital image data 70B of the combining target frame is combined by the control circuit 110C.

The digital image data 70B of the non-combining target frame is image data obtained by imaging using the imaging element 38 at a timing (hereinafter, referred to as a "vibration detection timing") at which the vibration is detected by the vibration sensor 102 (refer to FIG. 4). That is, an image indicated by the digital image data 70B of the non-combining target frame includes a specific image. Here, for example, the specific image refers to an image that is affected by the vibration exerted on the imaging apparatus 10. That is, in other words, the image indicated by the digital image data 70B of the non-combining target frame includes an effect of the vibration exerted on the imaging apparatus 10 as a noise component. Meanwhile, the digital image data 70B of the combining target frame is image data obtained by imaging using the imaging element 38 at a timing different from the vibration detection timing.

The digital image data 70B of the non-combining target frame is an example of "first image data" according to the embodiments of the technology of the present disclosure. The digital image data 70B of the combining target frame is an example of "second image data" according to the embodiments of the technology of the present disclosure.

Here, a specific configuration for storing the digital image data 70B of the combining target frame and the digital image data 70B of the non-combining target frame in the memory 112 and combining the digital image data 70B of the combining target frames of a plurality of frames will be described with reference to FIG. 10 to FIG. 12.

Figure 10:
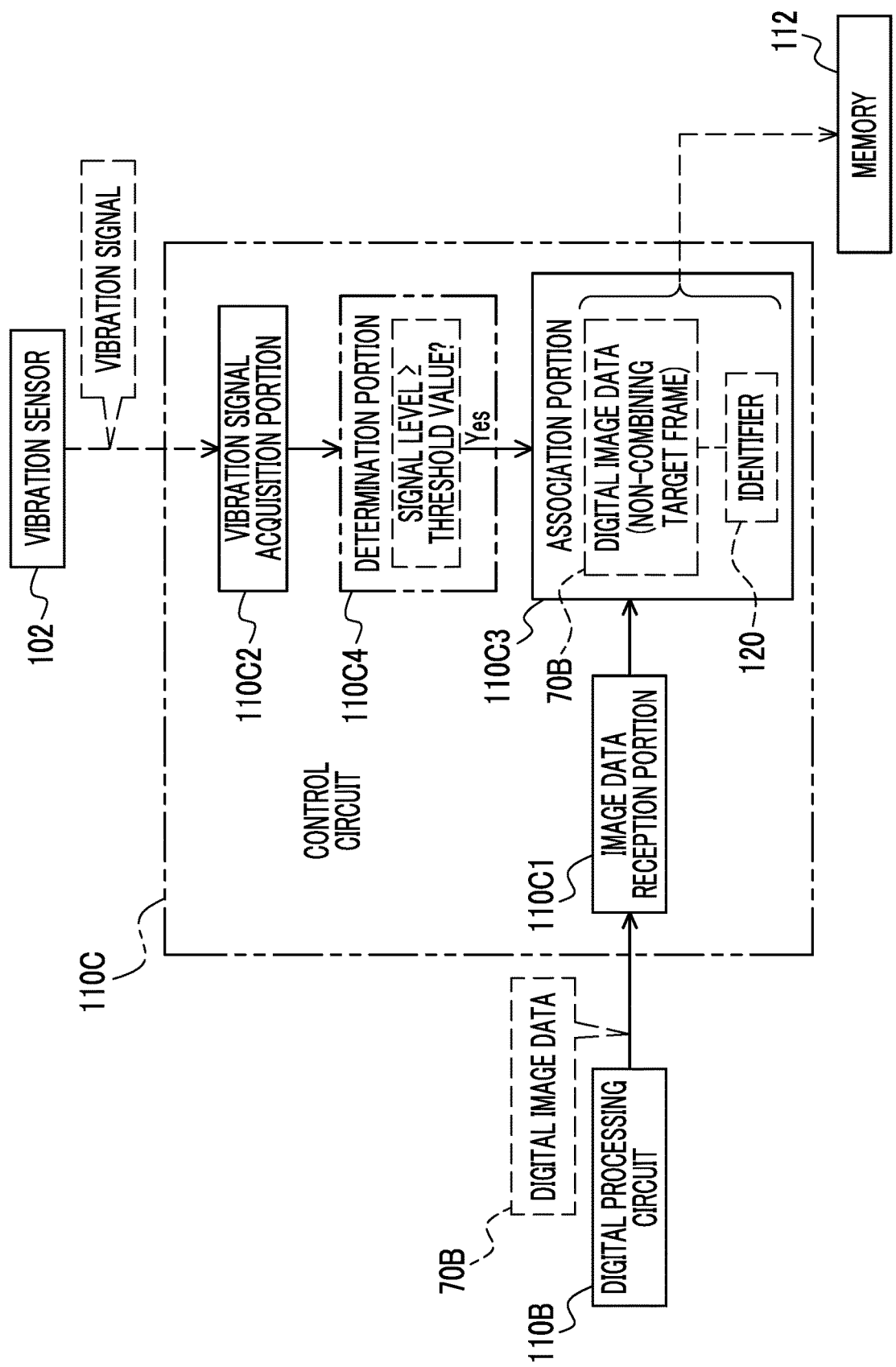
FIG. 10 is a block diagram illustrating an example of a configuration of a control circuit included in the imaging element according to the first embodiment.

As illustrated in FIG. 10 as an example, in the imaging element 38, the control circuit 110C comprises an image data reception portion 110C1, the vibration signal acquisition portion 110C2, an association portion 110C3, and a determination portion 110C4.

The image data reception portion 110C1 receives the digital image data 70B output from the digital processing circuit 110B. The vibration signal acquisition portion 110C2 acquires the vibration signal from the vibration sensor 102.

The association portion 110C3 associates the digital image data 70B obtained by imaging using the imaging element 38 at a timing at which the vibration signal having a signal level greater than or equal to a threshold value is input from the vibration sensor 102, with an identifier (hereinafter, simply referred to as the "identifier") 120 for specifying the fact that the signal level is greater than or equal to the threshold value. Accordingly, the digital image data 70B of the non-combining target frame is generated. The threshold value is a value that is obtained in advance by sensory test and/or computer simulation or the like as a lower limit value of the signal level of the vibration signal with which a region affected by the vibration can be visually recognized from the image indicated by the digital image data 70B. In addition, the threshold value may be a fixed value or a variable value that is changed in accordance with various conditions (for example, specifications of the interchangeable lens 14, the shutter speed, and/or an instruction received by the reception device 84).

In order to implement association of the digital image data 70B with the identifier 120 by the association portion 110C3, the determination portion 110C4 determines whether or not the signal level of the vibration signal acquired by the vibration signal acquisition portion 110C2 is greater than or equal to the threshold value. In a case where the determination portion 110C4 determines that the signal level of the vibration signal acquired by the vibration signal acquisition portion 110C2 is greater than or equal to the threshold value, the association portion 110C3 associates the most recent digital image data 70B received by the image data reception portion 110C1 with the identifier 120 and stores the digital image data 70B associated with the identifier 120 in the memory 112 as the digital image data 70B of the non-combining target frame. That is, in a case where it is determined that the signal level of the vibration signal acquired by the vibration signal acquisition portion 110C2 is greater than or equal to the threshold value, the digital image data 70B is stored in the memory 112 in an associated state with the identifier 120. Accordingly, the digital image data 70B obtained by imaging at a timing of detection of the vibration can be specified from the digital image data 70B stored in the memory 112.

Figure 11:
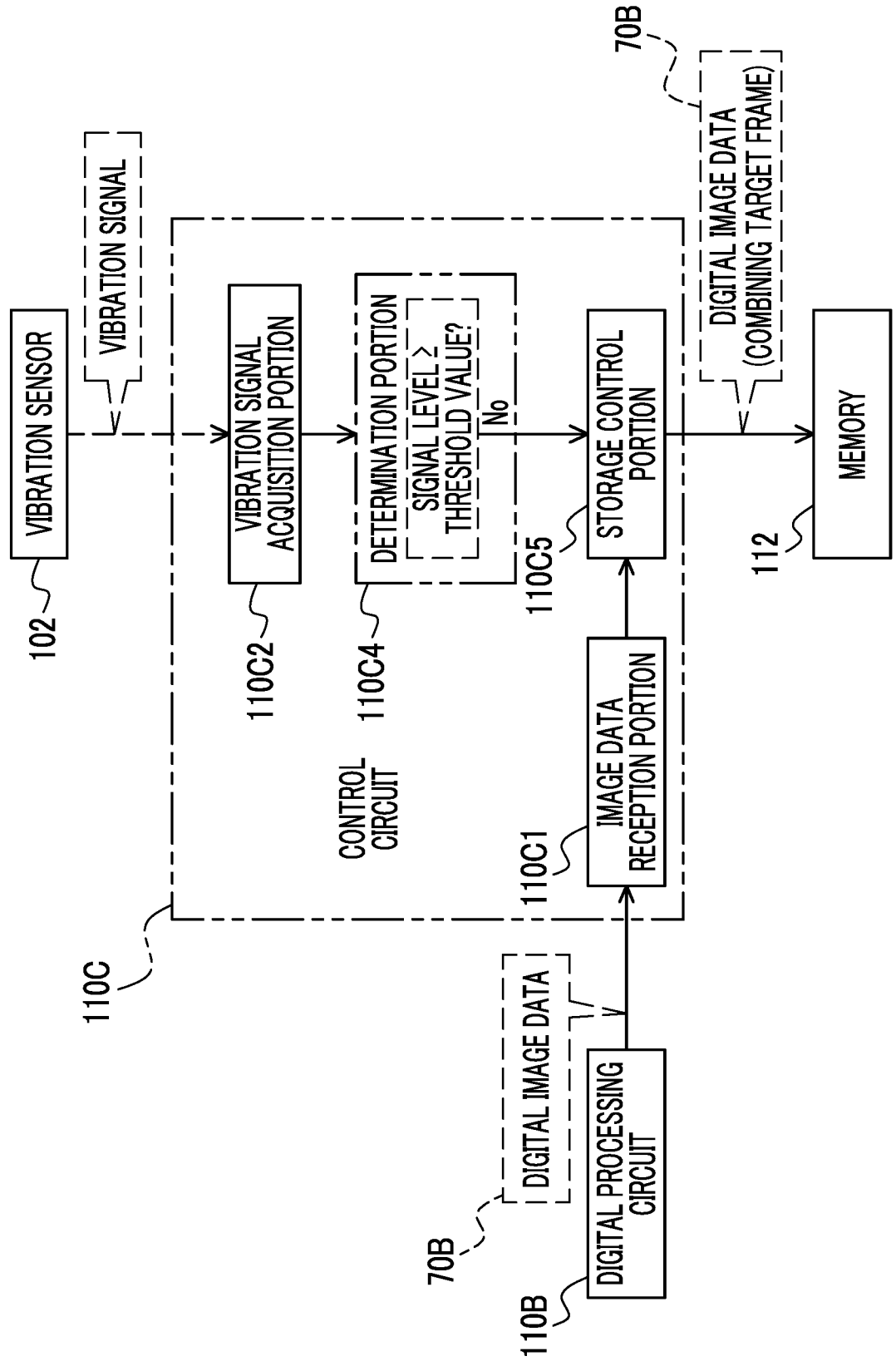
FIG. 11 is a block diagram illustrating an example of the configuration of the control circuit included in the imaging element according to the first embodiment.

As illustrated in FIG. 11 as an example, in the imaging element 38, the control circuit 110C comprises a storage control portion 110C5. In a case where the determination portion 110C4 determines that the signal level of the vibration signal acquired by the vibration signal acquisition portion 110C2 is less than the threshold value, the storage control portion 110C5 stores the most recent digital image data 70B received by the image data reception portion 110C1 in the memory 112 as the digital image data 70B of the combining target frame.

Figure 12:
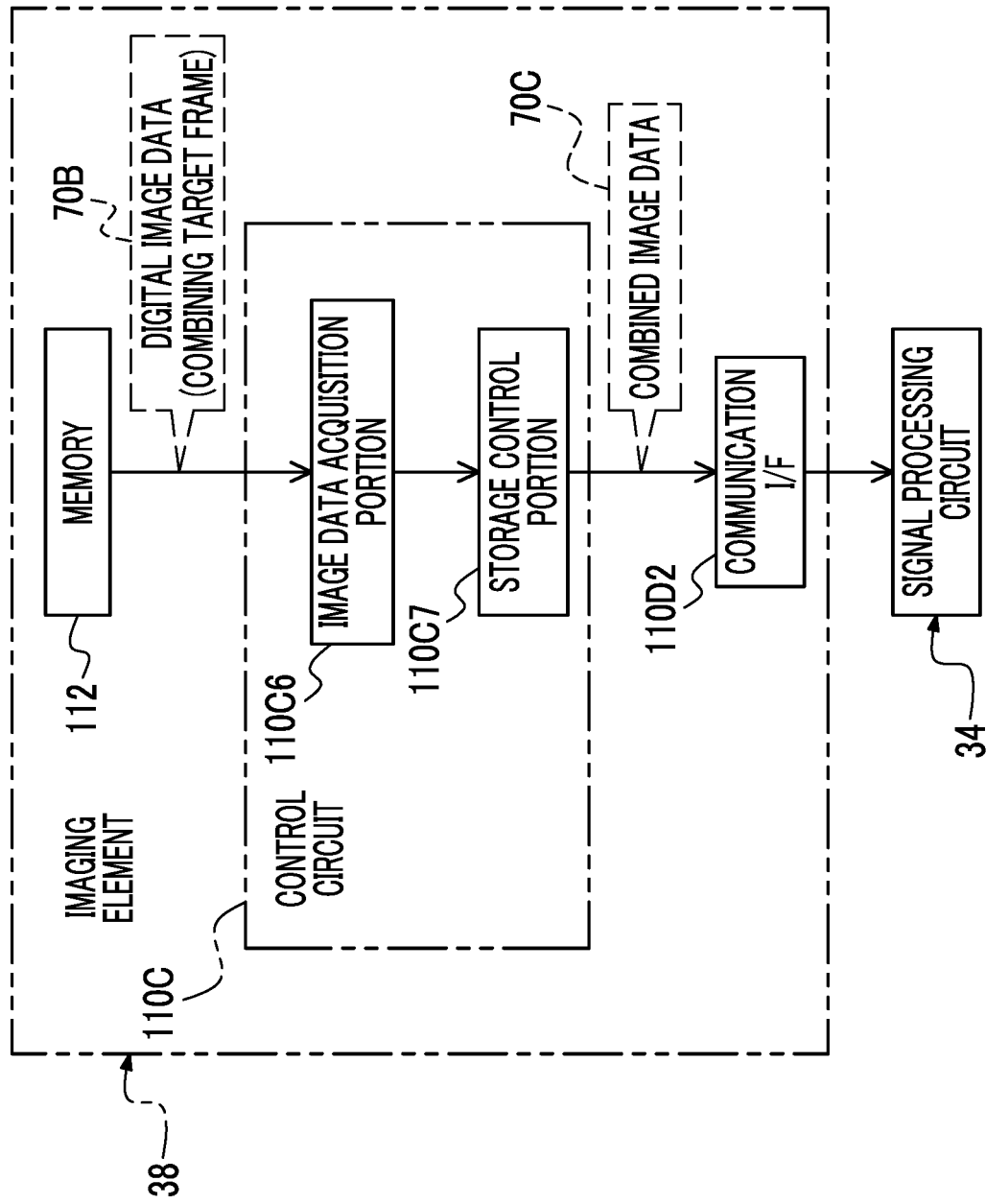
FIG. 12 is a block diagram illustrating an example of the configuration of the control circuit included in the imaging element according to the first embodiment.

As illustrated in FIG. 12 as an example, in the imaging element 38, the control circuit 110C comprises an image data acquisition portion 110C6 and a combining portion 110C7. The image data acquisition portion 110C6 detects the digital image data 70B of the non-combining target frame from the digital image data 70B of the plurality of frames stored in the memory 112. The image data acquisition portion 110C6 acquires the digital image data 70B (digital image data 70B of the combining target frame) different from the digital image data 70B of the non-combining target frame from the memory 112. That is, in the digital image data 70B of the plurality of frames stored in the memory 112, the digital image data 70B not associated with the identifier 120 is acquired by the image data acquisition portion 110C6.

The combining portion 110C7 generates the combined image data 70C by combining the digital image data 70B of the combining target frame acquired by the image data acquisition portion 110C6. For example, the combined image data 70C is generated by adding the digital image data 70B of the plurality of frames in units of pixels. In addition, the combined image data 70C is generated by combining (adding) the digital image data 70B corresponding to a number of frames of which an added exposure amount is greater than or equal to a predetermined exposure amount. The predetermined exposure amount may be a fixed value or a variable value. In a case of the variable value, for example, the predetermined exposure amount may be changed in accordance with the instruction received by the reception device 84 or may be changed in accordance with the specifications (for example, an opening degree of the stop 40C) of the interchangeable lens 14, the shutter speed, and/or the mechanical shutter 41. The predetermined exposure amount is an example of a "first predetermined exposure amount and a "second predetermined exposure amount" according to the embodiments of the technology of the present disclosure.

In a case where an area (hereinafter, referred to as a "saturated area") such as a washed-out area and/or a blocked-up shadow area in which pixel values are saturated occurs by adding the digital image data 70B of the plurality of frames, the combining portion 110C7 may adjust the number of combining target frames for each saturated area. Accordingly, a high dynamic range is implemented, compared to a case of not adjusting the number of combining target frames for each saturated area.

In such a manner, in the control circuit 110C, the digital image data 70B is processed by the image data reception portion 110C1, the vibration signal acquisition portion 110C2, the association portion 110C3, the determination portion 110C4, the storage control portion 110C5, the image data acquisition portion 110C6, and the combining portion 110C7. The control circuit 110C is an example of a "processing portion (control circuit)" according to the embodiments of the technology of the present disclosure.

The combined image data 70C obtained by processing the digital image data 70B by the control circuit 110C, that is, the combined image data 70C generated by the combining portion 110C7, is output to the signal processing circuit 34 at the output frame rate by the communication I/F 110D2. The communication I/F 110D2 is an example of an "output portion (communication interface)" according to the embodiments of the technology of the present disclosure. The combined image data 70C is subjected to the various types of signal processing by the signal processing circuit 34 and then, is output to the controller 15. The CPU 15A displays an image (for example, a live view image) indicated by the combined image data 70C on the display 26 or stores the combined image data 70C in at least one storage device. Here, for example, the storage 15B and/or a storage included in the external apparatus (for example, a smart device, a personal computer, and/or a server) connected to the external I/F 104 is exemplified as the storage device.

Figure 13B:
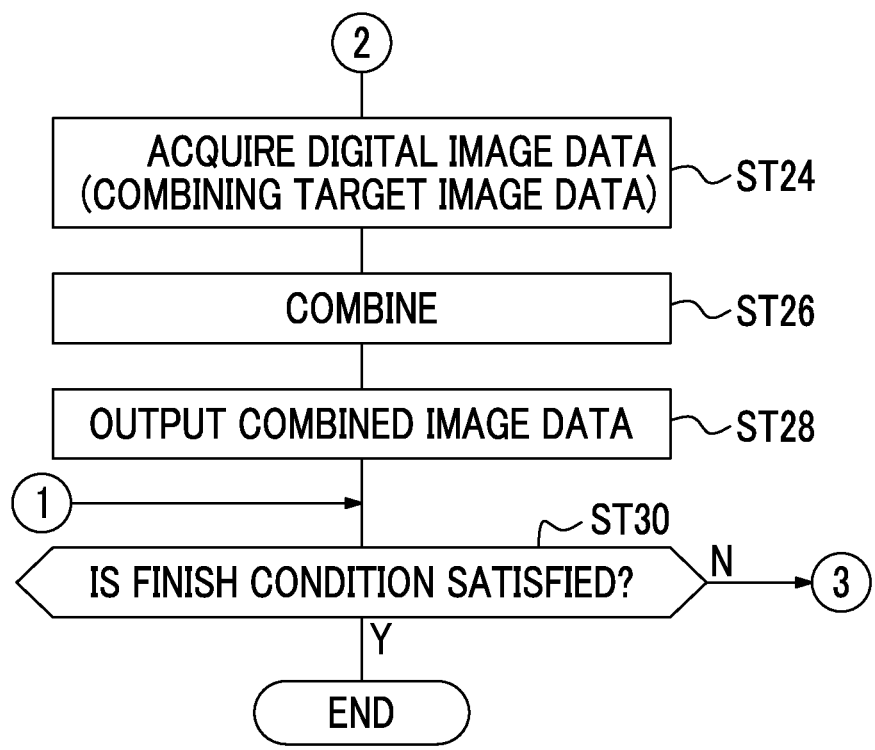
FIG. 13B is a continuation of the flowchart illustrated in FIG. 13A.

Next, an action of the imaging apparatus 10 according to the first embodiment will be described with reference to FIG. 13A and FIG. 13B. FIG. 13A and FIG. 13B illustrate an example of a flow of image data processing executed by the processing circuit 110. Here, for convenience of description, it is assumed that the digital image data 70B of a plurality of combining target frames is stored in the memory 112.

In the image data processing illustrated in FIG. 13A, first, in step ST10, the control circuit 110C determines whether or not the digital image data 70B is received by the image data reception portion 110C1. In step ST10, in a case where the digital image data 70B is not received by the image data reception portion 110C1, a negative determination is made, and the image data processing transitions to step ST30 illustrated in FIG. 13B. In step ST10, in a case where the digital image data 70B is received by the image data reception portion 110C1, a positive determination is made, and the image data processing transitions to step ST12.

In step ST12, the vibration signal acquisition portion 110C2 acquires the vibration signal from the vibration sensor 102. Then, the image data processing transitions to step ST14.

In step ST14, the determination portion 110C4 determines whether or not the signal level of the vibration signal acquired in step ST12 is greater than or equal to the threshold value. In step ST14, in a case where the signal level of the vibration signal is less than the threshold value, a negative determination is made, and the image data processing transitions to step ST20. In step ST14, in a case where the signal level of the vibration signal is greater than or equal to the threshold value, a positive determination is made, and the image data processing transitions to step ST16.

In step ST16, the association portion 110C3 associates the digital image data 70B received by the image data reception portion 110C1 in step ST10 with the identifier 120. Then, the image data processing transitions to step ST18.

In step ST18, the association portion 110C3 stores the digital image data 70B in an associated state with the identifier 120 in the memory 112. Then, the image data processing transitions to step ST22.

In step ST20, the storage control portion 110C5 stores the digital image data 70B received by the image data reception portion 110C1 in step ST10 in the memory 112. Then, the image data processing transitions to step ST22.

In step ST22, the control circuit 110C determines whether or not the number of frames of the digital image data 70B stored in the memory 112 reaches a predetermined number of frames. Here, for example, the predetermined number of frames refers to the number of frames that is restricted in advance as an upper limit number of frames in which the memory 112 can store the digital image data 70B. The predetermined number of frames may be a fixed value. In addition, for example, the predetermined number of frames may be a variable value changed by the instruction received by the reception device 84 (refer to FIG. 4), a variable value changed in accordance with a used capacity of the memory 112, or a variable value changed in accordance with a processing load of the rear stage circuit 13.

In step ST22, in a case where the number of frames of the digital image data 70B stored in the memory 112 does not reach the predetermined number of frames, a negative determination is made, and the image data processing transitions to step ST30 illustrated in FIG. 13B. In step ST22, in a case where the number of frames of the digital image data 70B stored in the memory 112 reaches the predetermined number of frames, a positive determination is made, and the image data processing transitions to step ST24 illustrated in FIG. 13B.

In step ST24 illustrated in FIG. 13B, the image data acquisition portion 110C6 acquires the digital image data 70B of the plurality of combining target frames from the memory 112. Then, the image data processing transitions to step ST26.

In step ST26, the combining portion 110C7 generates the combined image data 70C by combining the digital image data 70B of the plurality of combining target frames acquired in step ST24. Then, the image data processing transitions to step ST28.

In step ST28, the combining portion 110C7 outputs the combined image data 70C generated in step ST26 to the signal processing circuit 34 through the communication I/F 110D2. Then, the image data processing transitions to step ST30. Here, for convenience of description, it is assumed that the digital image data 70B of the plurality of combining target frames is stored in the memory 112. However, in a case where only the digital image data 70B of a single combining target frame is stored in the memory 112, the combining portion 110C7 outputs the digital image data 70B of the single combining target frame to the signal processing circuit 34 through the communication I/F 110D2. In addition, in a case where the digital image data 70B of the combining target frame is not stored in the memory 112, the image data is not output from the communication I/F 110D2. Alternatively, in a case where the digital image data 70B of the combining target frame is not stored in the memory 112, the control circuit 110C, as exception processing, may output the digital image data 70B of the non-combining target frame or image data (for example, image data obtained by performing any processing on the digital image data 70B of the non-combining target frame) based on the digital image data 70B of the non-combining target frame to the signal processing circuit 34 through the communication I/F 110D2.

In step ST30, the control circuit 110C determines whether or not a condition (hereinafter, referred to as an "image data processing finish condition") under which the image data processing is finished is satisfied. A condition that an instruction to finish the image data processing is received by the reception device 84 (refer to FIG. 4) is exemplified as the image data processing finish condition. In step ST30, in a case where the image data processing finish condition is not satisfied, a negative determination is made, and the image data processing transitions to step ST10 illustrated in FIG. 13A. In step ST30, in a case where the image data processing finish condition is satisfied, a positive determination is made, and the image data processing is finished.

As described above, in the imaging apparatus 10 according to the first embodiment, the digital image data 70B indicating the specific image is detected from the digital image data 70B stored in the memory 112 by the control circuit 110C. In the digital image data 70B of the plurality of frames, image data (in the example illustrated in FIG. 12, the combined image data 70C) based on the digital image data 70B different from the digital image data 70B indicating the specific image is output to the signal processing circuit 34 by the communication I/F 110D2.

Here, for example, the specific image is an image that is affected by the vibration exerted on the imaging apparatus 10. Thus, an image indicated by the digital image data 70B different from the digital image data 70B indicating the specific image in the digital image data 70B of the plurality of frames has more favorable image quality than the specific image by being not affected by the vibration exerted on the imaging apparatus 10. Thus, according to the present configuration, output of the digital image data 70B having low image quality can be suppressed, compared to a case where the entire digital image data 70B obtained by imaging is output.

In addition, in the imaging apparatus 10 according to the first embodiment, the combined image data 70C obtained by combining the digital image data 70B (digital image data 70B of the combining target frame) of the plurality of frames different from the digital image data 70B indicating the specific image using the combining portion 110C7 is output to the signal processing circuit 34 by the communication I/F 110D2. Thus, according to the present configuration, an output amount of the digital image data 70B can be suppressed, compared to a case of outputting the digital image data 70B of the plurality of frames without combining.

In addition, in the imaging apparatus 10 according to the first embodiment, the combined image data 70C obtained by combining, using the combining portion 110C7, the digital image data 70B of the combining target frames corresponding to the number of frames of which the added exposure amount is greater than or equal to the predetermined exposure amount is output to the signal processing circuit 34 by the communication I/F 110D2. Thus, according to the present configuration, the combined image data 70C of the predetermined exposure amount or greater can be output.

In addition, in the imaging apparatus 10 according to the first embodiment, an image including a noise component is employed as the digital image data 70B of the non-combining target frame. For example, the image including the noise component is an image (for example, an image to which the effect of the vibration is added as the noise component) affected by the vibration exerted on the imaging apparatus 10. Thus, according to the present configuration, output of the digital image data 70B indicating the image including the noise component can be suppressed, compared to a case where the entire digital image data 70B obtained by imaging is output.

In addition, in the imaging apparatus 10 according to the first embodiment, the digital image data 70B of the plurality of frames different from the digital image data 70B obtained by imaging using the imaging element 38 at a timing at which the vibration exerted on the imaging apparatus 10 is detected by the vibration sensor 102 is combined by the combining portion 110C7. Thus, according to the present configuration, output of the digital image data 70B affected by the vibration exerted on the imaging apparatus 10 can be suppressed, compared to a case where the entire image data obtained by imaging is output.

In addition, in the imaging apparatus 10 according to the first embodiment, the most recent digital image data 70B received by the image data reception portion 110C1 at a timing at which the vibration signal having a signal level greater than or equal to the threshold value is input into the control circuit 110C from the vibration sensor 102 is associated with the identifier 120 by the association portion 110C3. Thus, according to the present configuration, the digital image data 70B affected by the vibration exerted on the imaging apparatus 10 can be easily specified, compared to a case where the digital image data 70B is not associated with any information for specifying the digital image data 70B affected by the vibration exerted on the imaging apparatus 10.

In addition, in the imaging apparatus 10 according to the first embodiment, the imaging element in which the photoelectric conversion element 42, the processing circuit 110, and the memory 112 are formed in one chip is employed as the imaging element 38. Accordingly, portability of the imaging element 38 is increased, compared to an imaging element in which the photoelectric conversion element 42, the processing circuit 110, and the memory 112 are not formed in one chip. In addition, a degree of design freedom can be increased, compared to a case of the imaging element in which the photoelectric conversion element 42, the processing circuit 110, and the memory 112 are not formed in one chip. Furthermore, it is possible to contribute to size reduction of the imaging apparatus 10, compared to a case of the imaging element in which the photoelectric conversion element 42, the processing circuit 110, and the memory 112 are not formed in one chip.

In addition, in the imaging apparatus 10 according to the first embodiment, the laminated imaging element in which the photoelectric conversion element 42 is laminated with the memory 112 is employed as the imaging element 38. Accordingly, since a wire that connects the photoelectric conversion element 42 to the memory 112 can be shortened, a wire delay can be reduced. Consequently, a transfer speed of the image data from the photoelectric conversion element 42 to the memory 112 can be increased, compared to a case where the photoelectric conversion element 42 and the memory 112 are not laminated. Improving the transfer speed contributes to high-speed processing in the entire processing circuit 110. In addition, the degree of design freedom can be increased, compared to a case of not laminating the photoelectric conversion element 42 and the memory 112.

Furthermore, it is possible to contribute to size reduction of the imaging apparatus 10, compared to a case of not laminating the photoelectric conversion element 42 and the memory 112.

In addition, in the imaging apparatus 10 according to the first embodiment, while the imaging element in which the photoelectric conversion element 42, the processing circuit 110, and the memory 112 are formed in one chip is illustrated as the imaging element 38, the technology of the present disclosure is not limited thereto. For example, at least the photoelectric conversion element 42 and the memory 112 among the photoelectric conversion element 42, the processing circuit 110, and the memory 112 may be formed in one chip.

In the first embodiment, an example of a form of outputting the combined image data 70C to the signal processing circuit 34 using the communication I/F 110D2 as an example of the "second image data" according to the embodiments of the technology of the present disclosure is illustratively described. However, the technology of the present disclosure is not limited thereto. For example, the control circuit 110C may output the digital image data 70B of the combining target frame to the signal processing circuit 34 through the communication I/F 110D2 without combining. In addition, image data (for example, image data obtained by adjusting a gain of the digital image data 70B of the combining target frame) obtained by performing any processing on the digital image data 70B of the combining target frame may be output to the signal processing circuit 34 by the communication OF 110D2.

In addition, in the first embodiment, the digital image data 70B is associated with the identifier 120 in a case where the signal level of the vibration signal is greater than or equal to the threshold value. However, the technology of the present disclosure is not limited thereto. For example, in a case where the signal level of the vibration signal is less than the threshold value, the digital image data 70B may be associated with an identifier (hereinafter, referred to as a "shake non-existence specifying identifier") 120A for specifying the fact that the signal level of the vibration signal is less than the threshold value.

Figure 14B:
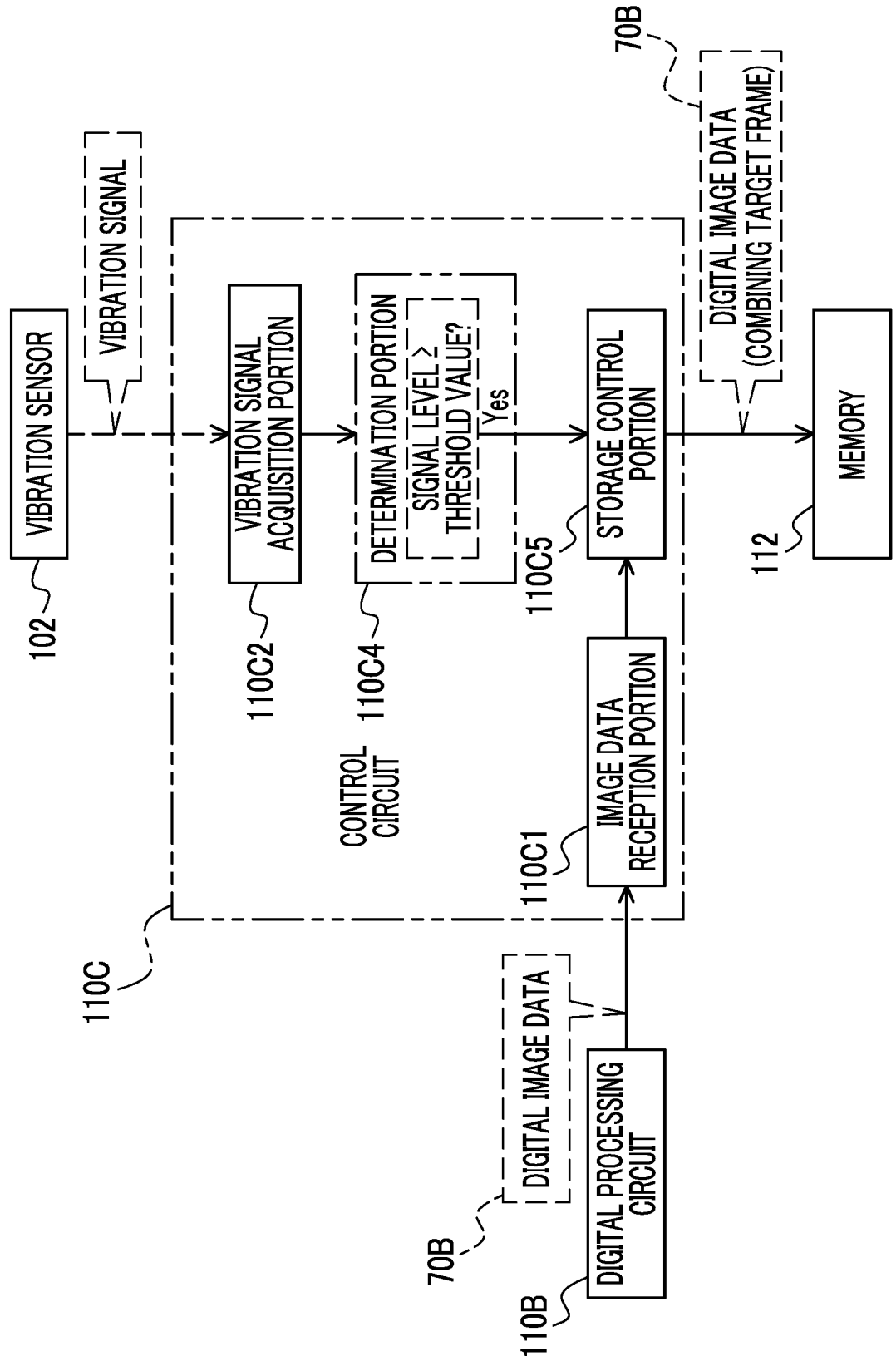
FIG. 14B is a block diagram illustrating a modification example of the configuration of the control circuit included in the imaging element according to the first embodiment.

Specifically, as illustrated in FIG. 14A as an example, in a case where the determination portion 110C4 determines that the signal level of the vibration signal acquired by the vibration signal acquisition portion 110C2 is less than the threshold value, the most recent digital image data 70B received by the image data reception portion 110C1 is associated with the shake non-existence specifying identifier 120A by the association portion 110C3. In addition, as illustrated in FIG. 14B as an example, in a case where the determination portion 110C4 determines that the signal level of the vibration signal acquired by the vibration signal acquisition portion 110C2 is greater than or equal to the threshold value, the most recent digital image data 70B received by the image data reception portion 110C1 is stored in the memory 112 by the storage control portion 110C5 as the digital image data 70B of the combining target frame. The digital image data 70B of the plurality of combining target frames stored in the memory 112 is combined by the combining portion 110C7 and output to the signal processing circuit 34 through the communication OF 110D2 in the same manner as in the first embodiment.

According to the present configuration, the digital image data 70B affected by the vibration exerted on the imaging apparatus 10 can be easily specified, compared to a case where the digital image data 70B of the combining target frame is not associated with information for specifying the combining target frame, and a case where the digital image data 70B of the non-combining target frame is not associated with information for specifying the non-combining target frame.

Second Embodiment

In the first embodiment, an example of a form in which the image including the effect of the vibration exerted on the imaging apparatus 10 as the noise component is excluded from a combining target is illustratively described. In a second embodiment, an example of a form in which an image including other than the effect of the vibration exerted on the imaging apparatus 10 as the noise component is also excluded from the combining target will be described. In the second embodiment, constituents described in the first embodiment will be designated by the same reference signs and will not be described.

Figure 15:
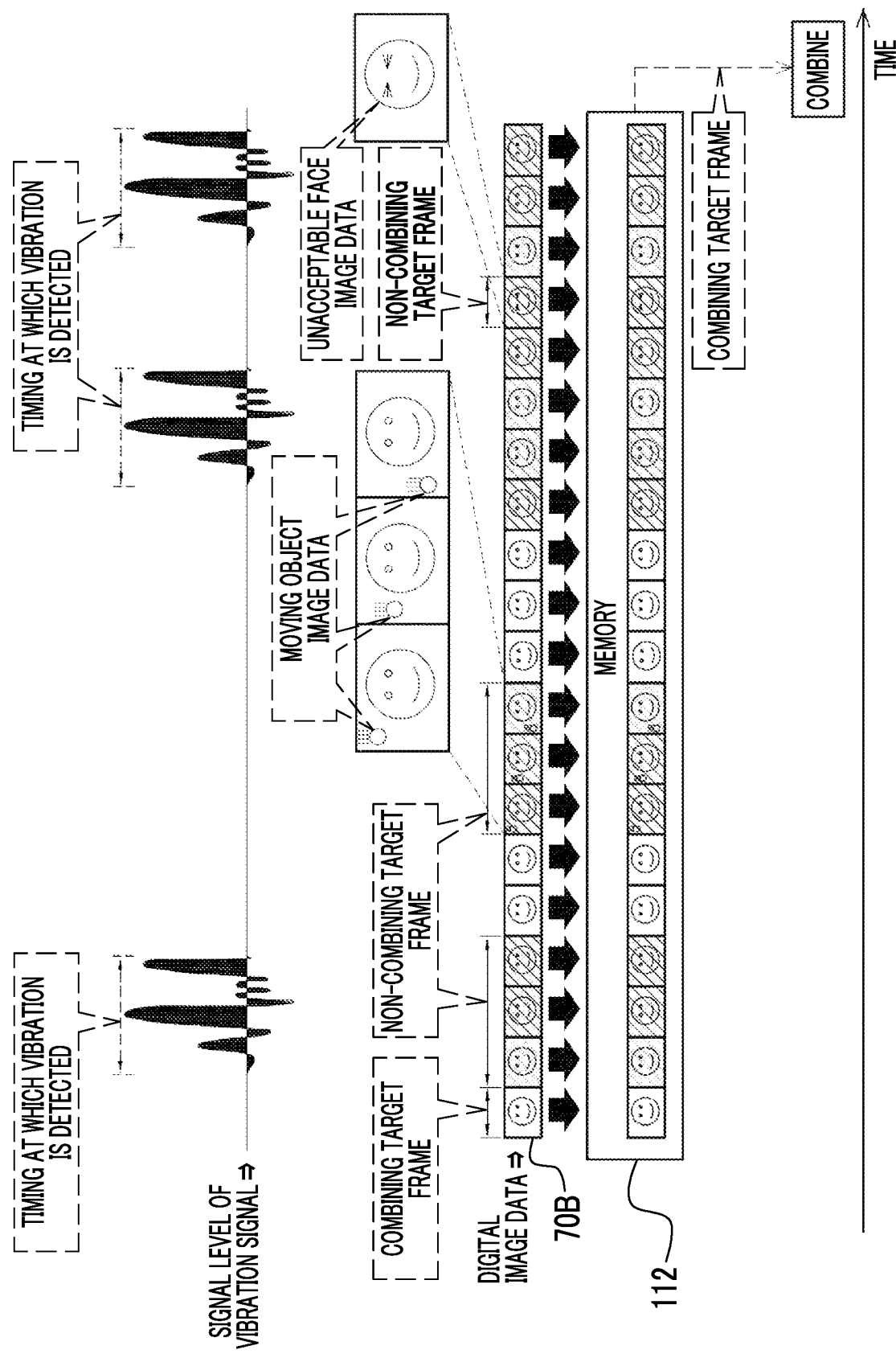
FIG. 15 is a time chart illustrating an example of a process of storing the digital image data obtained by imaging using the imaging element according to the second embodiment in the memory and combining the digital image data.

As illustrated in FIG. 15 as an example, the digital image data 70B including moving object image data indicating an image of a moving object is stored in the memory 112 as the digital image data 70B of the non-combining target frame by the control circuit 110C. In the example illustrated in FIG. 15, the digital image data 70B including face image data indicating an image of a face and the moving object image data (in the example illustrated in FIG. 15, image data indicating an image of a falling object having a spherical shape) is illustrated as the digital image data 70B of the non-combining target frame. Here, the "moving object" is an example of a "subject" according to the embodiments of the technology of the present disclosure. In addition, here, the "image of the moving object" is an example of a "specific image", an "image including a noise", and an "image of a subject including an object of which a movement amount per unit time period is greater than or equal to a predetermined movement amount" according to the embodiments of the technology of the present disclosure. In addition, here, the "moving object image data" is an example of "subject image data" according to the embodiments of the technology of the present disclosure.

Here, the "image of the moving object" refers to an image indicating an object of which a movement amount per unit time period is greater than or equal to a predetermined movement amount. For example, the movement amount per unit time period refers to a few pixels/frame (as an example, 5 pixels/frame). The movement amount per unit time period may be a fixed value. In addition, for example, the movement amount per unit time period may be a variable value changed in accordance with the specifications of the interchangeable lens 14, a variable value changed in accordance with a focal length, a variable value changed in accordance with the shutter speed, a variable value changed by the instruction received by the reception device 84 (refer to FIG. 4), a variable value changed by the used capacity of the memory 112, and/or a variable value changed in accordance with the processing load of the rear stage circuit 13.

In addition, the digital image data 70B including acceptable face image data and the digital image data 70B including unacceptable face image data are stored in the memory 112. Here, the "acceptable face image data" refers to image data indicating a face of a facial expression desired by the user. Image data indicating an image of a face of a facial expression with both eyes open is exemplified as an example of the acceptable face image data. In addition, the "unacceptable face image data" refers to image data indicating a face of a facial expression not desired by the user. Image data indicating an image of a face of a facial expression with at least one of a left eye or a right eye closed is exemplified as an example of the unacceptable face image data. In the example illustrated in FIG. 15, the digital image data 70B including the unacceptable face image data is illustrated as the digital image data 70B of the non-combining target frame. The "image of the face of the facial expression not desired by the user" and the "image of the face of the facial expression with at least one of the left eye or the right eye closed" are an example of the "specific image" according to the embodiments of the technology of the present disclosure.

Figure 16:
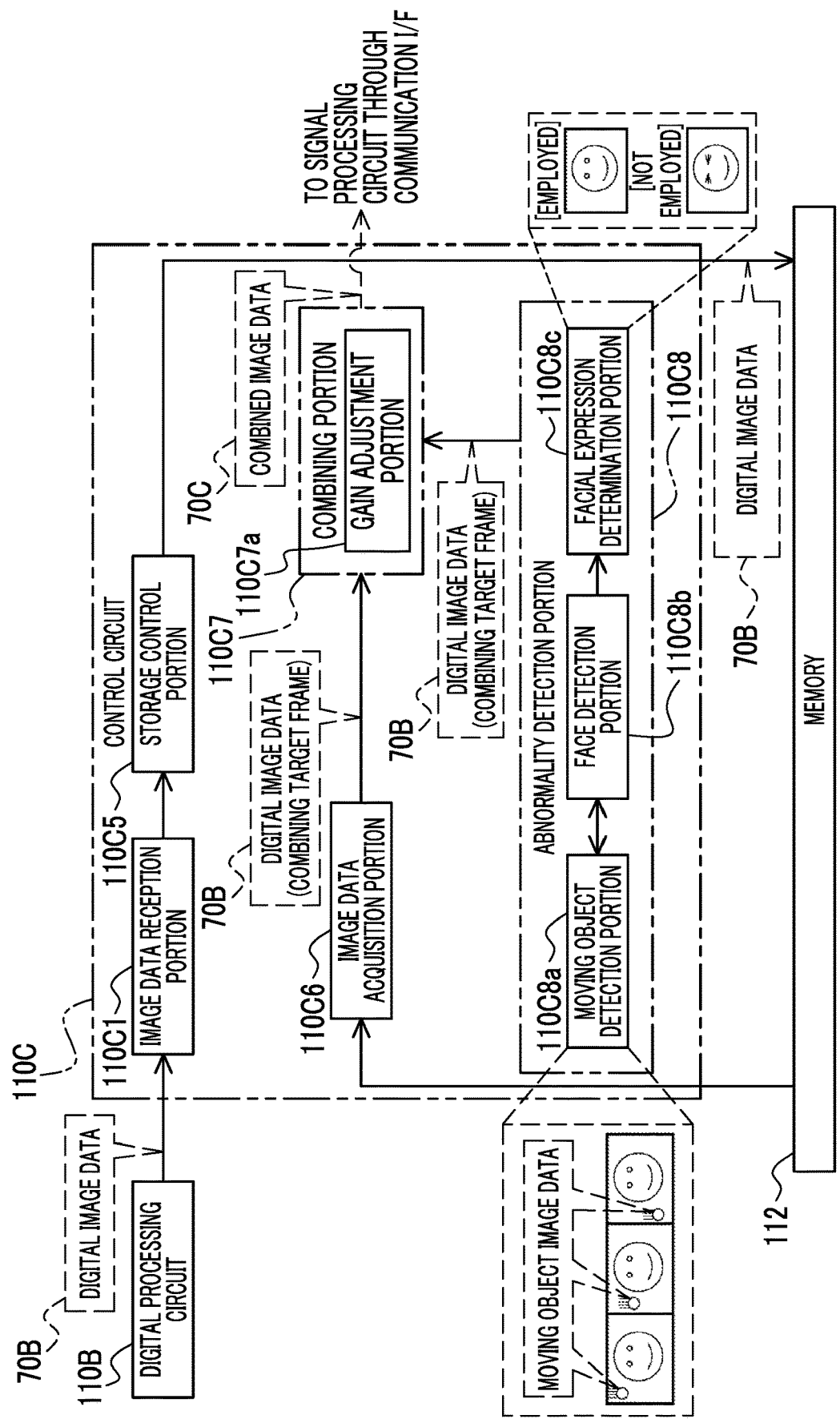
FIG. 16 is a block diagram illustrating an example of a configuration of a control circuit included in the imaging element according to the second and fourth embodiments.

As illustrated in FIG. 16 as an example, the control circuit 110C included in the imaging element 38 of the imaging apparatus 10 according to the second embodiment is different from the control circuit 110C (refer to FIG. 10 to FIG. 12) described in the first embodiment, in that an abnormality detection portion 110C8 is included, and the combining portion 110C7 includes a gain adjustment portion 110C7a.

The abnormality detection portion 110C8 comprises a moving object detection portion 110C8a, a face detection portion 110C8b, and a facial expression determination portion 110C8c. In a case where the number of frames of the digital image data 70B stored in the memory 112 reaches the predetermined number of frames described in the first embodiment, the abnormality detection portion 110C8 detects abnormal image data from the memory 112. That is, the abnormality detection portion 110C8 detects the abnormal image data from the digital image data 70B (hereinafter, referred to as "abnormality detection target image data") other than the digital image data 70B associated with the identifier 120 in the digital image data 70B of the predetermined number of frames stored in the memory 112. The abnormality detection portion 110C8 outputs the digital image data 70B that is different from the digital image data 70B associated with the identifier 120 and is different from the abnormal image data to the combining portion 110C7 from the memory 112 as the digital image data 70B of the combining target frame.

The digital image data 70B including the moving object image data and the digital image data 70B including the unacceptable face image data are exemplified as an example of the abnormal image data.

The moving object detection portion 110C8a detects the digital image data 70B including the moving object image data by detecting the moving object image data from the abnormality detection target image data stored in the memory 112. That is, the moving object detection portion 110C8a detects the digital image data 70B including the moving object image data by detecting whether or not the moving object image data moved by a few pixels (for example, 5 pixels) in one frame is present by comparing the digital image data 70B of adjacent frames acquired by the image data acquisition portion 110C6.

Here, while the movement amount of a few pixels in one frame is illustrated, the technology of the present disclosure is not limited thereto. The movement amount in one frame may be a movement amount of a few pixels determined in accordance with a size of an imaging range imaged by the imaging apparatus 10, that is, an angle of view (focal length).

The moving object detection portion 110C8a specifies the digital image data 70B not including the moving object image data from the digital image data 70B different from the digital image data 70B associated with the identifier 120 in the digital image data 70B stored in the memory 112.

The face detection portion 110C8b performs face detection processing of detecting the face image data from the digital image data 70B specified by the moving object detection portion 110C8a. As a result of performing the face detection processing using the face detection portion 110C8b, in a case where the face image data is not detected from the digital image data 70B specified by the moving object detection portion 110C8a, the moving object detection portion 110C8a outputs the digital image data 70B not including the moving object image data and the face image data to the combining portion 110C7 as the digital image data 70B of the combining target frame.

Meanwhile, as a result of performing the face detection processing using the face detection portion 110C8b, in a case where the face image data is detected from the digital image data 70B specified by the moving object detection portion 110C8a as the digital image data 70B not including the moving object image data, the facial expression determination portion 110C8c determines whether or not the image of the face indicated by the face image data detected by the face detection portion 110C8b is an image showing a face of a specific facial expression. The specific facial expression refers to a predetermined facial expression as the facial expression desired by the user. Here, the facial expression with both eyes open is employed as an example of the specific facial expression. The specific facial expression may be a fixed facial expression or may be a facial expression changed in accordance with the instruction received by the reception device 84 (refer to FIG. 4), an imaging scene, or the like.

The facial expression determination portion 110C8c determines whether or not the image of the face indicated by the face image data is the image showing the face of the specific facial expression. In a case where the image of the face indicated by the face image data detected by the face detection portion 110C8b is the image showing the face of the specific facial expression, the facial expression determination portion 110C8c outputs the digital image data 70B including the face image data indicating the image showing the face of the specific facial expression to the combining portion 110C7 as the digital image data of the combining target frame.

The combining portion 110C7 generates the combined image data 70C by combining the digital image data 70B of the combining target frames of the plurality of frames. Here, the "digital image data 70B of the combining target frames of the plurality of frames" refers to the digital image data 70B of the combining target frame acquired by the image data acquisition portion 110C6, the digital image data 70B of the combining target frame input into the combining portion 110C7 from the moving object detection portion 110C8a, and the digital image data 70B of the combining target frame input into the combining portion 110C7 from the facial expression determination portion 110C8c.

The moving object detection portion 110C8a and the facial expression determination portion 110C8c do not output the digital image data 70B of the non-combining target frame to the combining portion 110C7. Thus, the exposure of the combined image data 70C is decreased by an amount corresponding to the number of frames of the digital image data 70B not output to the combining portion 110C7. Therefore, the gain adjustment portion 110C7a adjusts a gain of the combined image data 70C. Specifically, the gain adjustment portion 110C7a generates the combined image data 70C of which the exposure amount is greater than or equal to the predetermined exposure amount, by adjusting the gain to compensate for the exposure that is decreased by an amount corresponding to the number of frames (hereinafter, referred to as the "number of missing frames") of the digital image data 70B not output to the combining portion 110C7.

Here, for example, adjusting the gain means gaining up. The gain is derived in accordance with the number of missing frames by the gain adjustment portion 110C7a. For example, the gain adjustment portion 110C7a derives the gain using a gain derivation table in which the gain and the number of missing frames are associated. The gain derivation table is merely an example. For example, the gain adjustment portion 110C7a may derive the gain using a gain derivation calculation expression that takes the number of missing frames as an independent variable and takes the gain as a dependent variable.

The combined image data 70C of which the gain is adjusted by the gain adjustment portion 110C7a is output to the signal processing circuit 34 through the communication I/F 110D2 by the combining portion 110C7.

Figure 17:
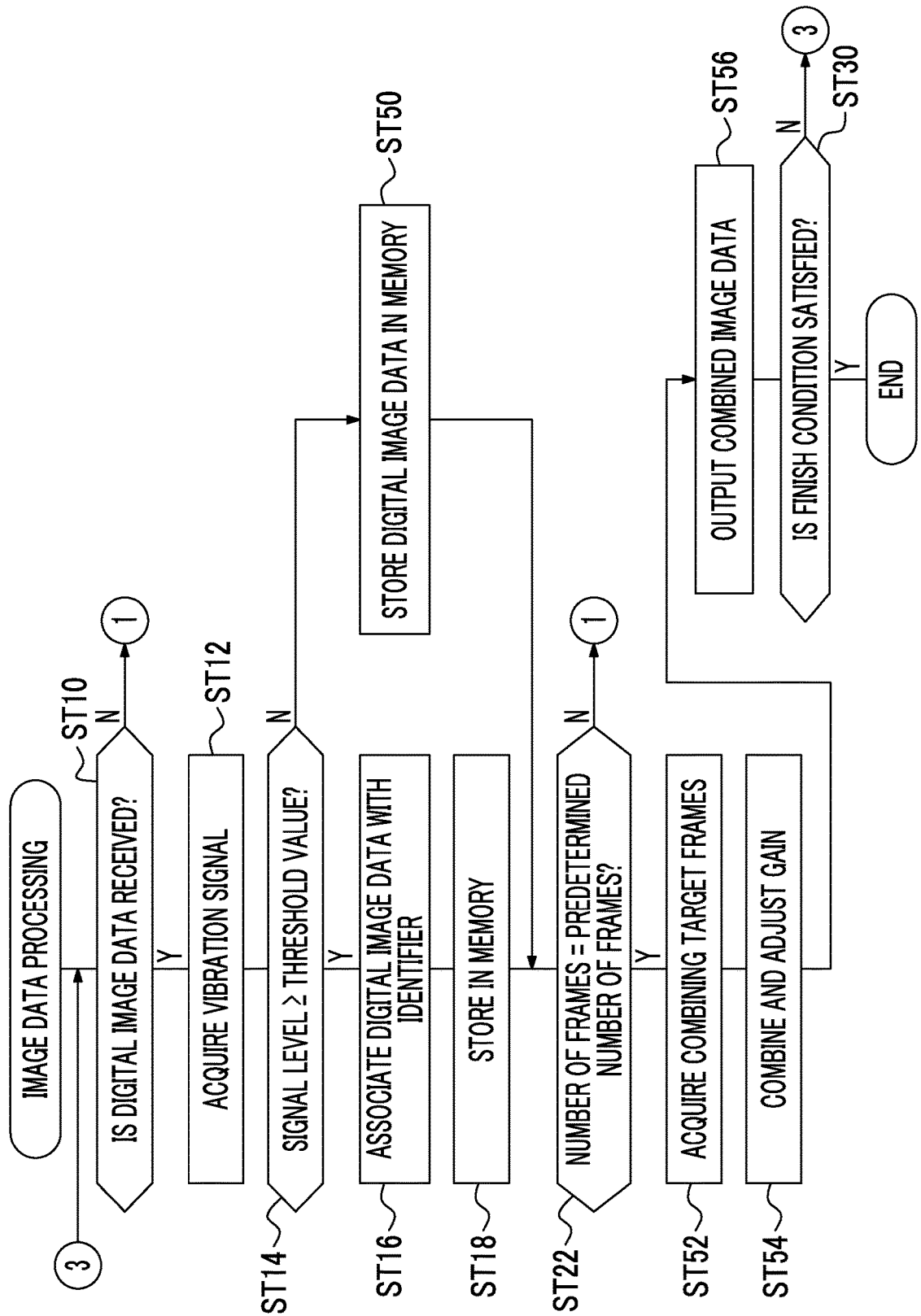
FIG. 17 is a flowchart illustrating an example of a flow of image data processing according to the second embodiment.

Next, an action of the imaging apparatus 10 according to the second embodiment will be described with reference to FIG. 17. FIG. 17 illustrates an example of a flow of image data processing executed by the processing circuit 110 according to the second embodiment. Here, the same steps as the steps included in the image data processing illustrated in FIG. 13A and FIG. 13B will be designated by the same step numbers and will not be described.

In the image data processing illustrated in FIG. 17, in step ST50, the storage control portion 110C5 stores the digital image data 70B received by the image data reception portion 110C1 in step ST10 in the memory 112. Then, the image data processing transitions to step ST22.

In step ST22, in a case where a positive determination is made, the image data processing transitions to step ST52. In step ST52, the abnormality detection portion 110C8 detects the abnormal image data in the digital image data 70B stored in the memory 112. The abnormality detection portion 110C8 acquires the digital image data 70B that is different from the digital image data 70B associated with the identifier 120 and is different from the abnormal image data, from the memory 112 as the digital image data 70B of the combining target frame. Then, the image data processing transitions to step ST54.

In step ST54, the combining portion 110C7 generates the combined image data 70C by combining the digital image data 70B acquired by the image data acquisition portion 110C6 with the digital image data 70B input from the abnormality detection portion 110C8. The gain adjustment portion 110C7a adjusts the gain of the generated combined image data 70C. Then, the image data processing transitions to step ST56.

In step ST56, the combining portion 110C7 outputs the combined image data 70C of which the gain is adjusted in step ST54 to the signal processing circuit 34 through the communication I/F 110D2. Then, the image data processing transitions to step ST30.

As described above, in the imaging apparatus 10 according to the second embodiment, the digital image data 70B including the moving object image data is employed as the digital image data 70B of the non-combining target frame. Thus, according to the present configuration, output of the digital image data 70B indicating the image of the moving object as the image including the noise component can be suppressed, compared to a case where the entire digital image data 70B obtained by imaging is output.

In addition, in the imaging apparatus 10 according to the second embodiment, the combined image data 70C of which the exposure amount is greater than or equal to the predetermined exposure amount is generated by adjusting the gain of the combined image data 70C using the gain adjustment portion 110C7a. Thus, according to the present configuration, the combined image data 70C indicating an image of which an exposure amount is greater than or equal to the predetermined exposure amount can be output.

In the second embodiment, while an example of a form of adjusting the gain of the combined image data 70C is illustratively described, the technology of the present disclosure is not limited thereto. For example, the gain adjustment portion 110C7a may adjust exposure of the image indicated by the combined image data 70C by adjusting the gain of the digital image data 70B of the combining target frame of at least one frame in the digital image data 70B of the combining target frames of the plurality of frames.

In addition, in the second embodiment, while an example of a form in which the digital image data 70B specified as the abnormal image data is not associated with the identifier 120 is illustratively described, the technology of the present disclosure is not limited thereto. For example, the digital image data 70B specified as the abnormal image data may be associated with the identifier 120.

Figure 18:
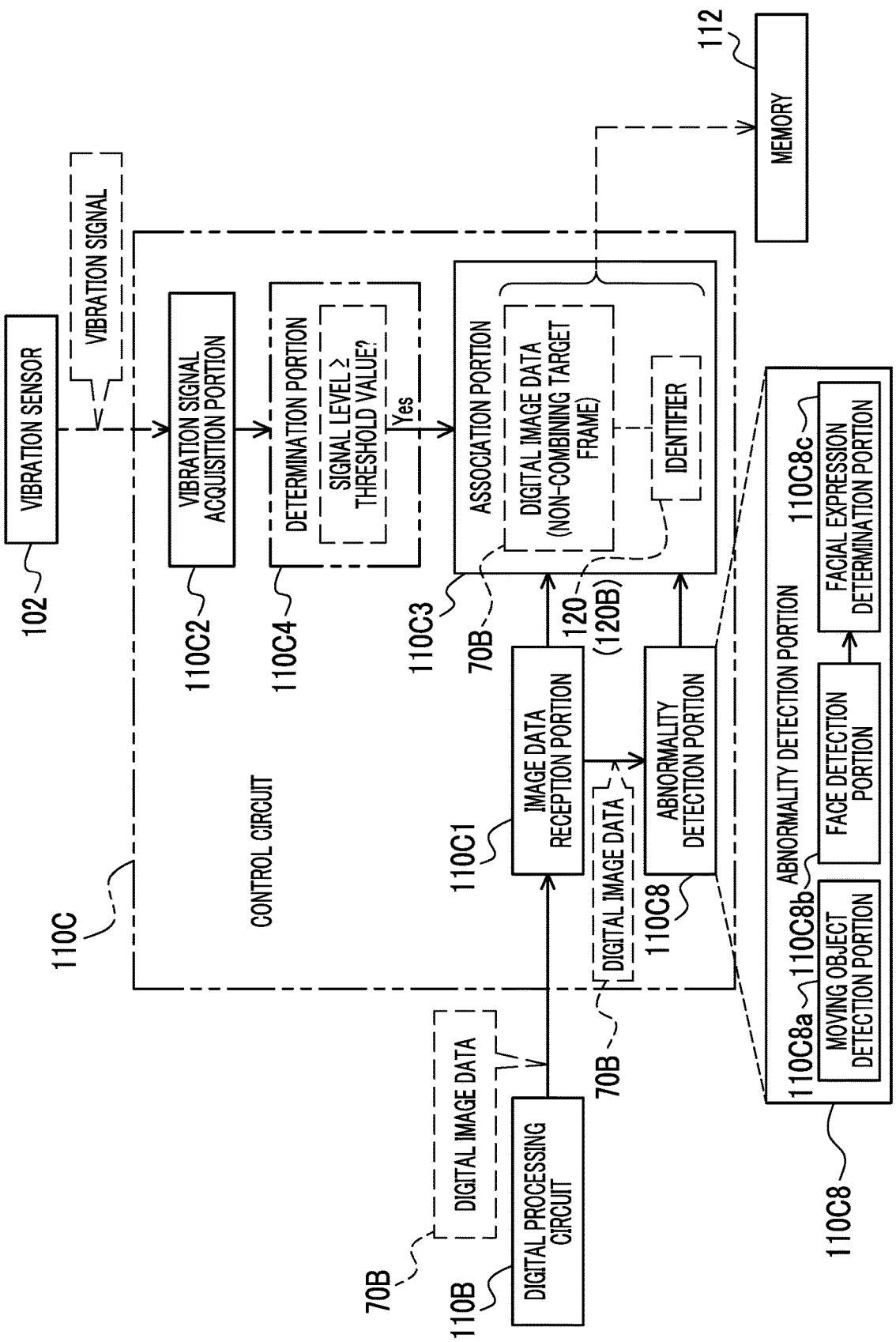
FIG. 18 is a block diagram illustrating a modification example of the configuration of the control circuit included in the imaging element according to the second embodiment.

In this case, as illustrated in FIG. 18 as an example, the abnormality detection portion 110C8 detects the abnormal image data from the digital image data 70B received by the image data reception portion 110C1. That is, the abnormality detection portion 110C8 detects the abnormal image data by determining whether or not the digital image data 70B received by the image data reception portion 110C1 is the digital image data 70B including the moving object image data. In addition, the abnormality detection portion 110C8 detects the abnormal image data by determining whether or not the digital image data 70B received by the image data reception portion 110C1 is the digital image data 70B including the unacceptable face image data. Accordingly, the digital image data 70B detected as the abnormal image data by the abnormality detection portion 110C8 is output to the association portion 110C3.

In the same manner as in the first embodiment, the association portion 110C3 associates the most recent digital image data 70B received by the image data reception portion 110C1 with the identifier 120 in a case where the signal level of the vibration signal is greater than or equal to the threshold value. In addition, the association portion 110C3 associates the digital image data 70B input from the abnormality detection portion 110C8 with an identifier 120B for specifying the digital image data 70B of the non-combining target frame. The digital image data 70B associated with the identifier 120 and the digital image data 70B associated with the identifier 120B are stored in the memory 112 by the association portion 110C3. Accordingly, the image data acquisition portion 110C6 (refer to FIG. 12) acquires the digital image data 70B other than the digital image data 70B associated with the identifier 120 and the digital image data 70B associated with the identifier 120B from the memory 112 as the digital image data 70B of the combining target frame.

Figure 19:
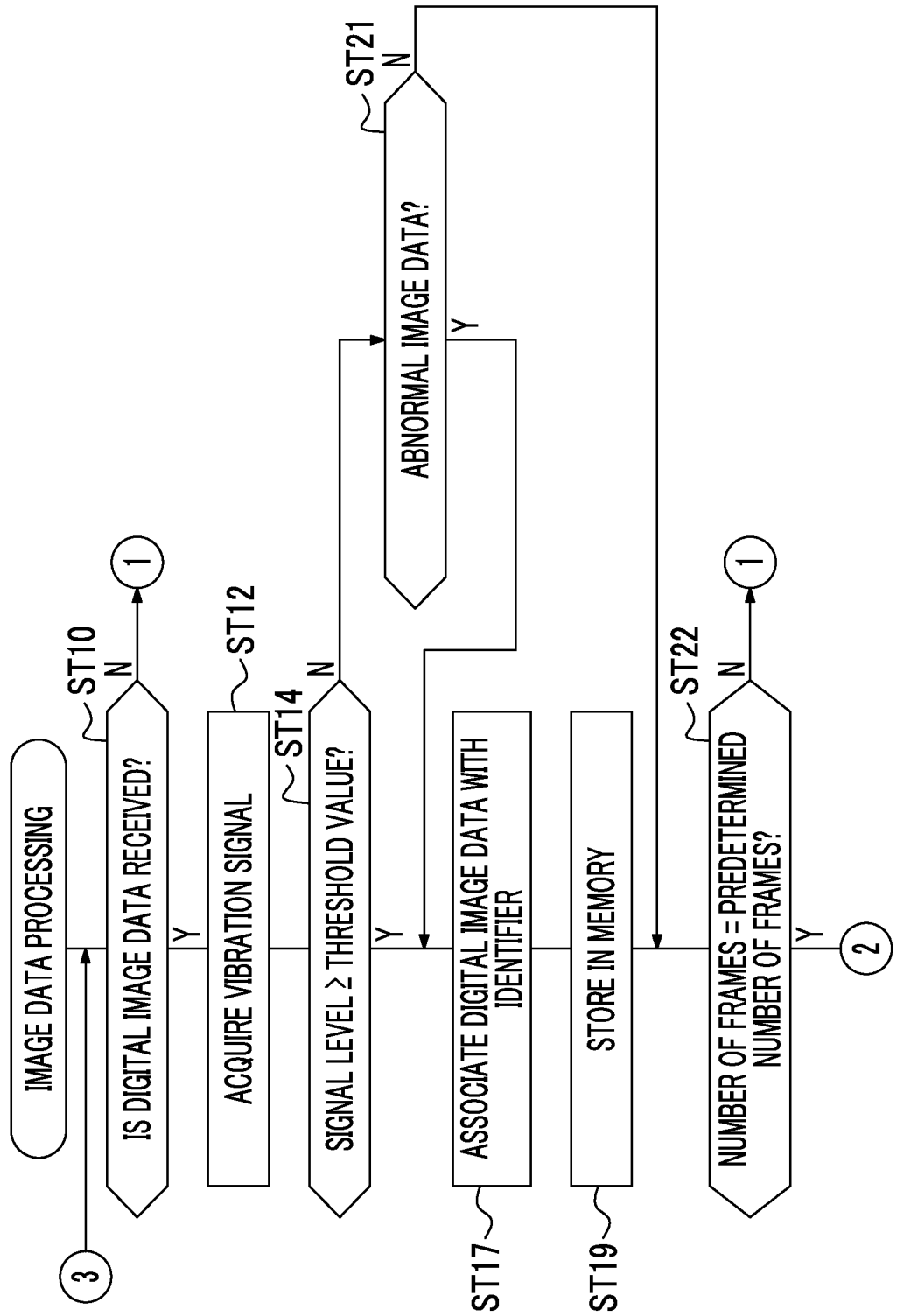
FIG. 19 is a flowchart illustrating an example of a flow of image data processing executed by a processing circuit including the control circuit illustrated in FIG. 18.

FIG. 19 illustrates an example of a flow of image data processing in a case where the digital image data 70B detected as the abnormal image data is associated with the identifier 120B by the association portion 110C3. The flowchart illustrated in FIG. 19 is different from the flowcharts (refer to FIG. 13A and FIG. 13B) of the image data processing described in the first embodiment, in that step ST17 is included instead of step ST16, step ST19 is included instead of step ST18, and step ST21 is included instead of step ST20.

In step ST21, the abnormality detection portion 110C8 determines whether or not the digital image data 70B received by the image data reception portion 110C1 in step ST10 is the abnormal image data. In step ST21, in a case where the digital image data 70B received by the image data reception portion 110C1 is not the abnormal image data, a negative determination is made, and the image data processing transitions to step ST22. In step ST21, in a case where the digital image data 70B received by the image data reception portion 110C1 is the abnormal image data, a positive determination is made, and the image data processing transitions to step ST17.

In step ST17, the association portion 110C3 associates the digital image data 70B for which the signal level of the vibration signal is greater than or equal to the threshold value with the identifier 120, and associates the digital image data 70B determined as the abnormal image data in step ST21 with the identifier 120B.

In step ST19, the association portion 110C3 stores the digital image data 70B in an associated state with the identifier 120 and the digital image data 70B in an associated state with the identifier 120B in the memory 112. Then, the image data processing transitions to step ST22.

In such a manner, even in a case where the digital image data 70B determined as the abnormal image data is associated with the identifier 120B by the association portion 110C3, the same effects as the imaging apparatus 10 according to the first and second embodiments are obtained. In addition, according to the present configuration, whether or not the digital image data 70B is the abnormal image data can be easily specified, compared to a case where the digital image data 70B is not associated with any information for specifying the abnormal image data.

Third Embodiment

In the second embodiment, an example of a form in which the digital image data 70B including the moving object image data is not combined by the combining portion 110C7 is illustratively described. In a third embodiment, an example of a form in which the digital image data 70B is partially combined even in a case where the digital image data 70B includes the moving object image data will be described. In the third embodiment, the same constituents as the constituents described in the second embodiment will be designated by the same reference signs and will not be described.

Figure 20:
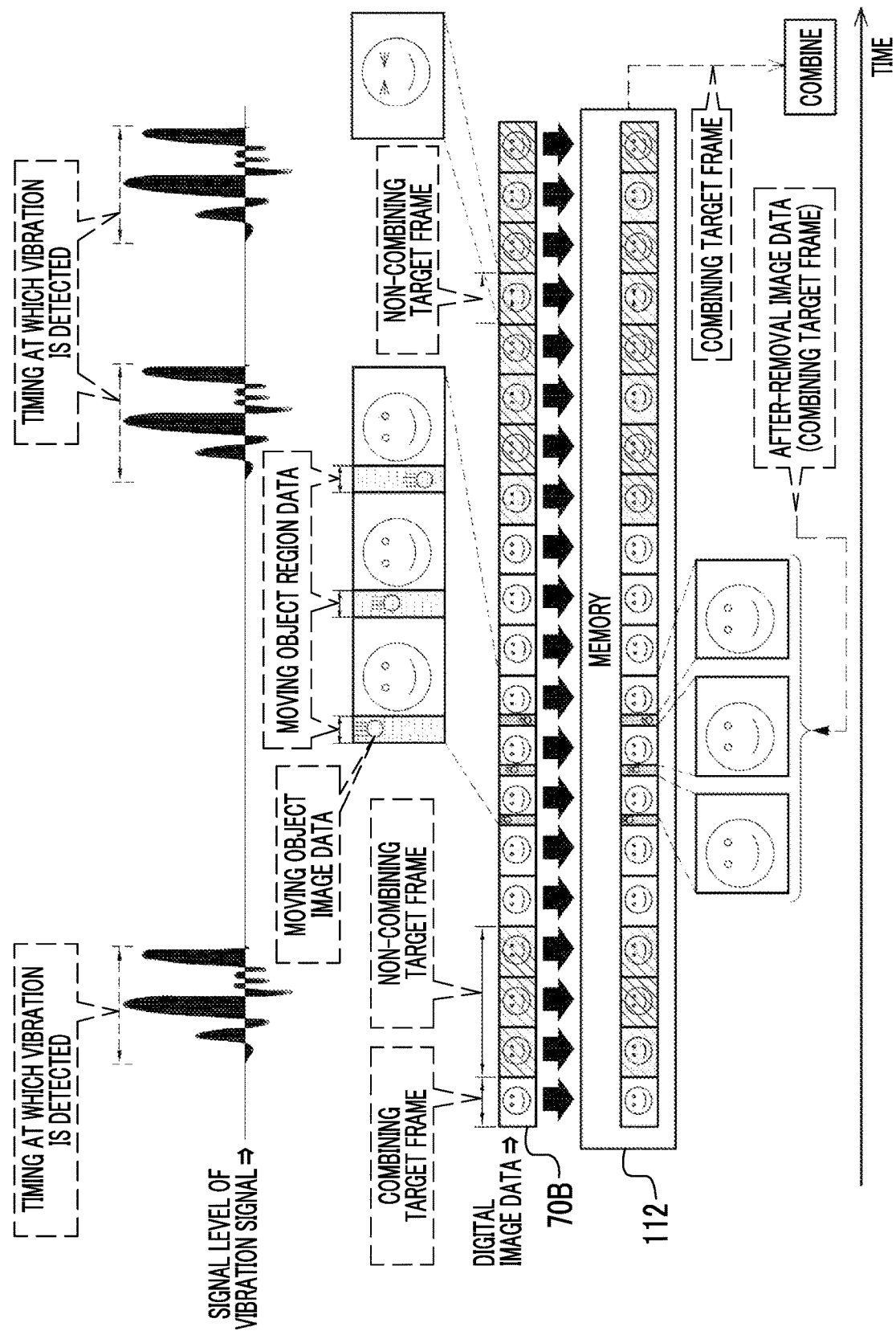
FIG. 20 is a time chart illustrating an example of a process of storing the digital image data obtained by imaging using the imaging element according to the third embodiment in the memory and combining the digital image data.

As illustrated in FIG. 20 as an example, in the same manner as in the second embodiment, the digital image data 70B including the moving object image data is stored in the memory 112 in units of frames. After-removal image data obtained by removing moving object region data from the digital image data 70B including the moving object image data is combined by the combining portion 110C7 as image data of the combining target frame.

The moving object region data is image data indicating a partial region including a movement trajectory (hereinafter, simply referred to as the "movement trajectory") of the image of the moving object indicated by the moving object image data in the image indicated by the digital image data 70B of one frame. In the example illustrated in FIG. 15, a movement trajectory in a vertical direction is illustrated as the movement trajectory. In addition, in the example illustrated in FIG. 15, image data indicating a part of a region outside the image of the face in the image indicated by the digital image data 70B of one frame is illustrated as an example of the moving object region data. In the example illustrated in FIG. 15, a region having a vertically long rectangular shape is illustrated as the "part of the region outside the image of the face".

Figure 21:
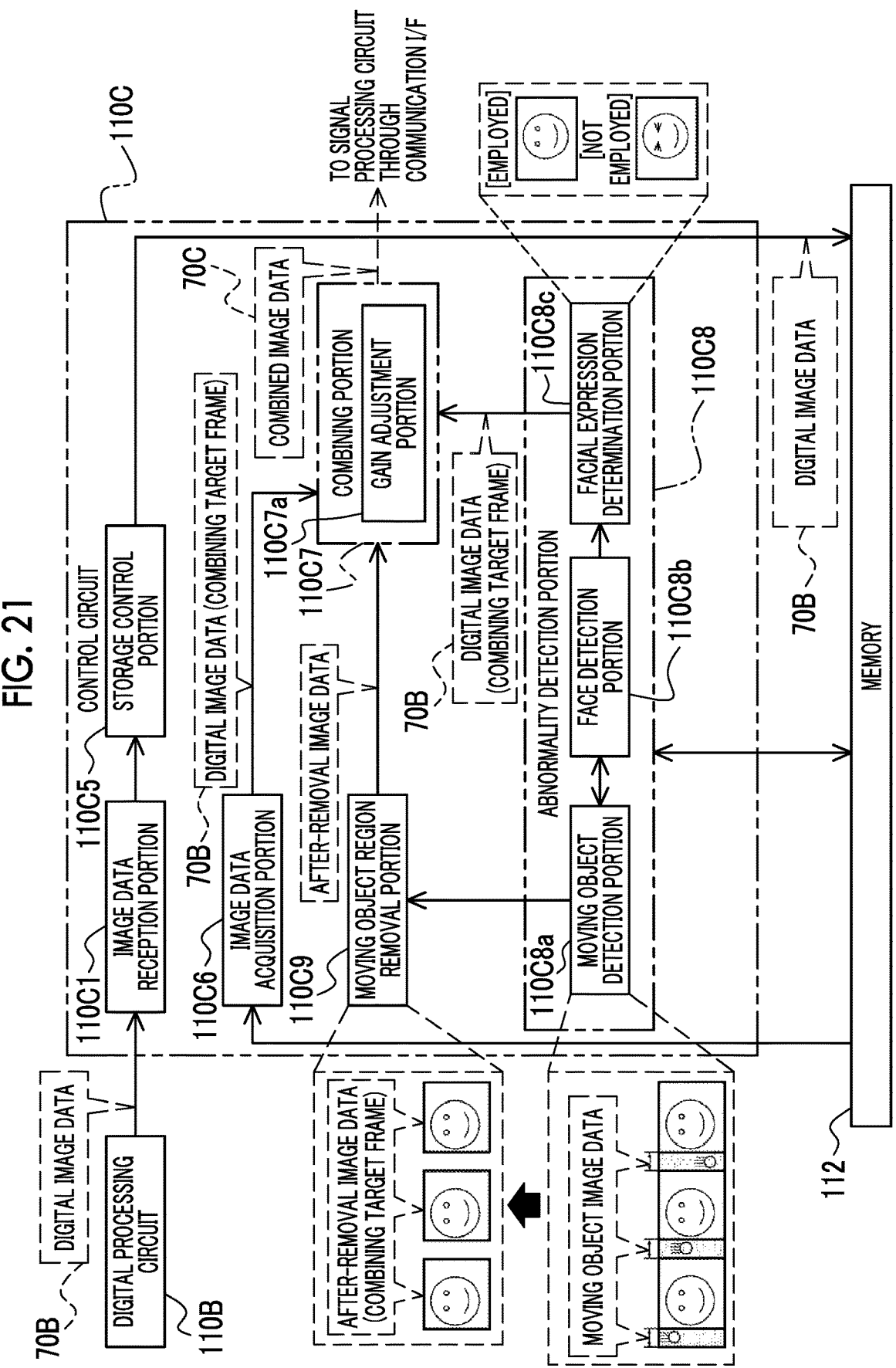
FIG. 21 is a block diagram illustrating an example of a configuration of a control circuit included in the imaging element according to the third embodiment.

As illustrated in FIG. 21 as an example, the control circuit 110C according to the third embodiment is different from the control circuit 110C (refer to FIG. 16) described in the second embodiment, in that a moving object region removal portion 110C9 is included.

The moving object detection portion 110C8a detects the digital image data 70B including the moving object region data from the abnormality detection target image data stored in the memory 112. The moving object region removal portion 110C9 removes the moving object region data from the digital image data 70B including the moving object region data. The after-removal image data obtained by removing the moving object region data from the digital image data 70B including the moving object region data is output to the combining portion 110C7 by the moving object region removal portion 110C9 as image data of the combining target frame. The combining portion 110C7 generates the combined image data 70C by combining the after-removal image data with the digital image data 70B of another combining target frame. The "combined image data 70C" according to the third embodiment is an example of "image data based on after-removal image data" according to the embodiments of the technology of the present disclosure.

The gain adjustment portion 110C7a adjusts the gain in accordance with the number of frames of the digital image data 70B in which the moving object region data is removed, and the removed moving object region data. The gain adjustment portion 110C7a adjusts the gain to compensate for the exposure that is insufficient by an amount corresponding to removal of the moving object region data. The gain is derived from the gain derivation table or the gain derivation calculation expression as described in the second embodiment.

The combined image data 70C of which the gain is adjusted by the gain adjustment portion 110C7a is output to the signal processing circuit 34 through the communication I/F 110D2 by the combining portion 110C7.

Figure 22A:
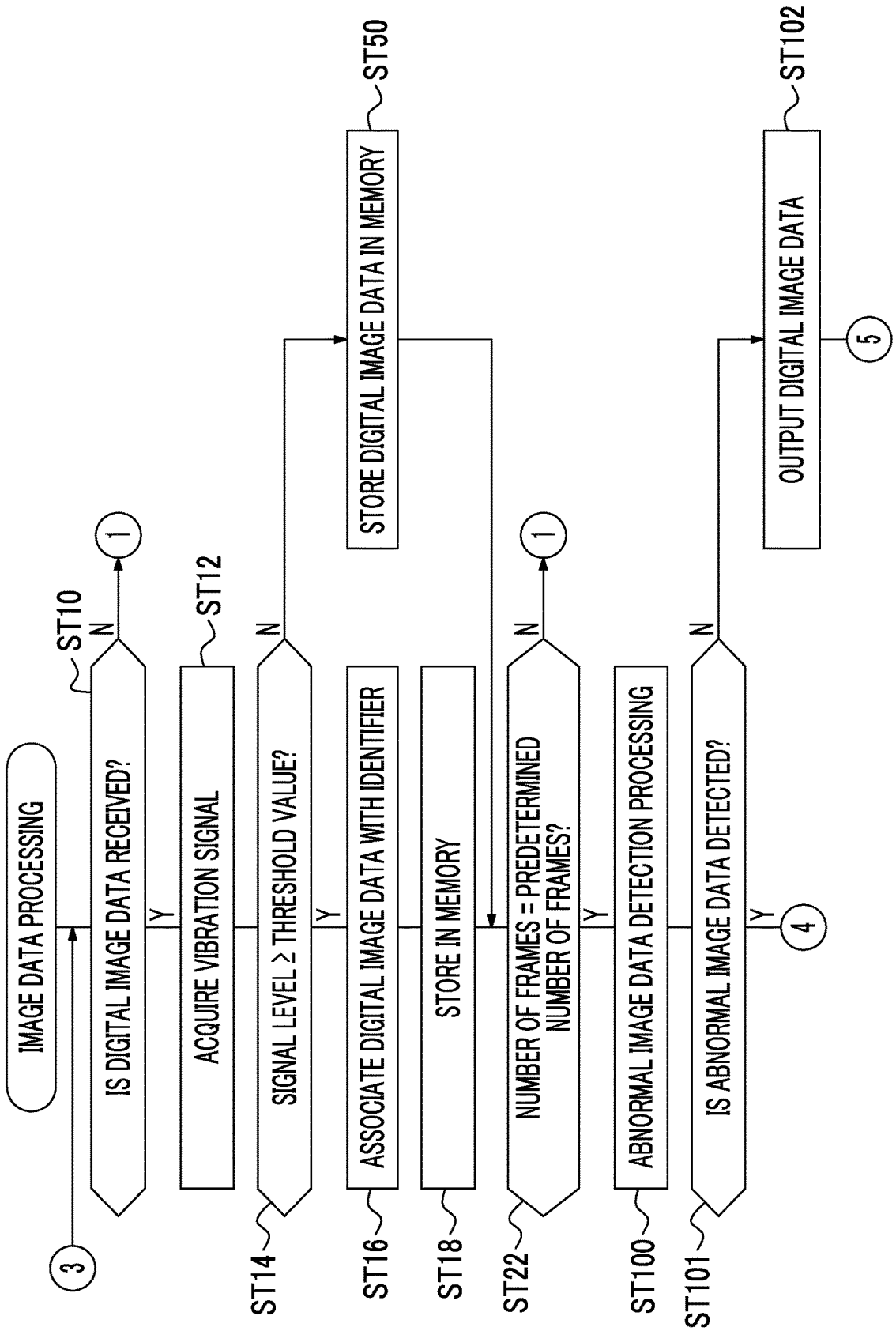
FIG. 22A is a flowchart illustrating an example of a flow of image data processing according to the third embodiment.
Figure 22B:
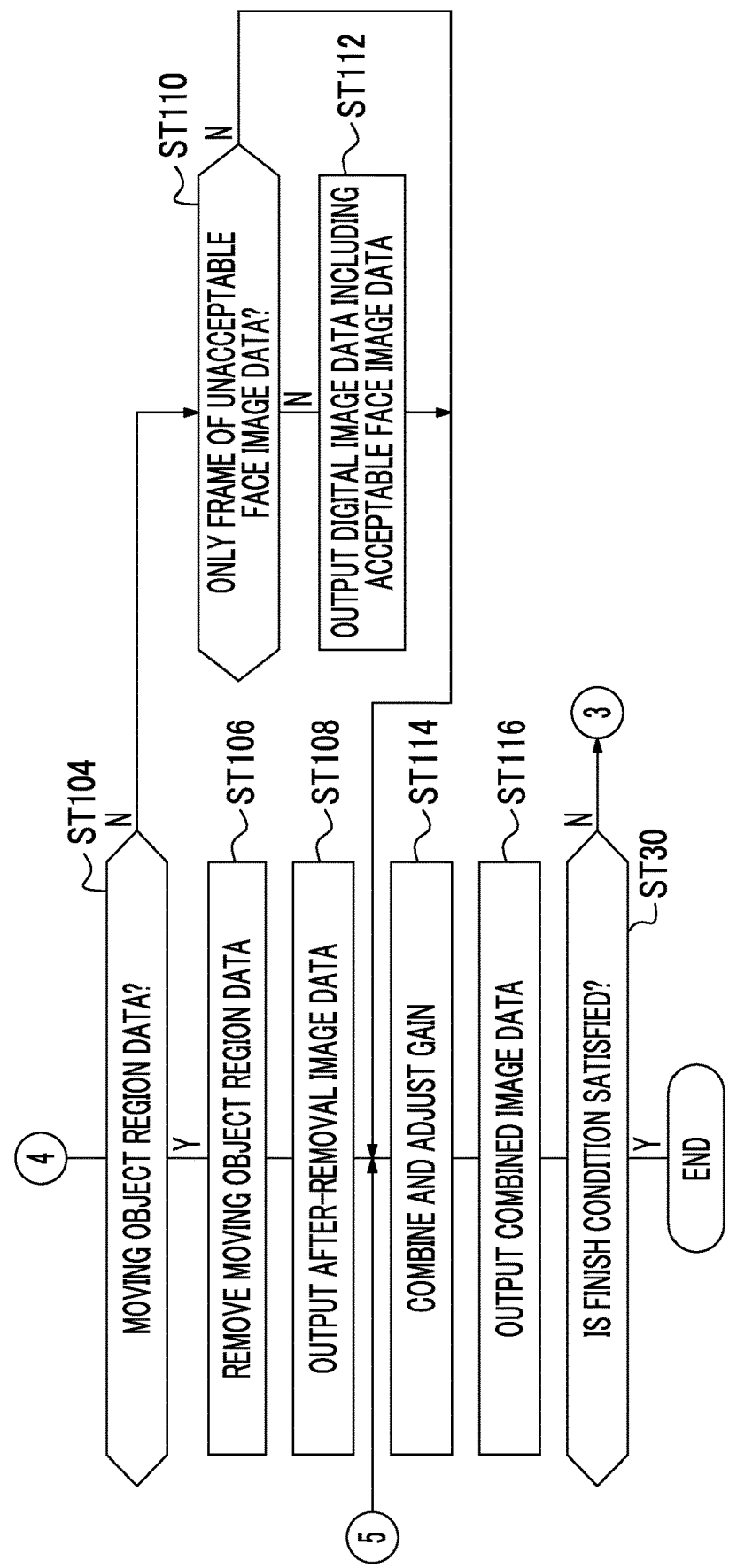
FIG. 22B is a continuation of the flowchart illustrated in FIG. 22A.

Next, an action of the imaging apparatus 10 according to the third embodiment will be described with reference to FIG. 22A and FIG. 22B. FIG. 22A and FIG. 22B illustrate an example of a flow of image data processing executed by the processing circuit 110 according to the third embodiment. The flowcharts illustrated in FIG. 22A and FIG. 22B are different from the flowchart illustrated in FIG. 17, in that step ST100 to step ST116 are included instead of step ST52 to step ST56. Here, the same steps as the steps included in the image data processing (FIG. 17) described in the second embodiment will be designated by the same step numbers and will not be described. In addition, here, for convenience of description, it is assumed that the abnormality detection target image data is stored in the memory 112.

In step ST100, the abnormality detection portion 110C8 performs abnormal image data detection processing of detecting the abnormal image data from the abnormality detection target image data stored in the memory 112. Then, the image data processing transitions to step ST101.

In step ST101, the control circuit 110C determines whether or not the abnormal image data is detected by performing the abnormal image data detection processing. In step ST101, in a case where the abnormal image data is not detected, a negative determination is made, and the image data processing transitions to step ST102. In step ST101, in a case where the abnormal image data is detected, a positive determination is made, and the image data processing transitions to step ST104 illustrated in FIG. 22B.

In step ST104, the abnormality detection portion 110C8 determines whether or not the abnormal image data is the digital image data 70B including the moving object region data. In step ST104, in a case where the abnormal image data is not the digital image data 70B including the moving object region data, a negative determination is made, and the image data processing transitions to step ST110. In step ST104, in a case where the abnormal image data is the digital image data 70B including the moving object region data, a positive determination is made, and the image data processing transitions to step ST106.

In step ST106, the moving object region removal portion 110C9 generates the after-removal image data by removing the moving object region data from the digital image data 70B including the moving object region data. Then, the image data processing transitions to step ST108.

In step ST108, the moving object region removal portion 110C9 outputs the after-removal image data to the combining portion 110C7. Then, the image data processing transitions to step ST114.

In step ST110, the abnormality detection portion 110C8 determines whether or not the entire abnormal image data detected in step ST100 is only the digital image data 70B including the unacceptable face image data. In step ST110, in a case where the entire abnormal image data detected in step ST100 is not only the digital image data 70B including the unacceptable face image data, a negative determination is made, and the image data processing transitions to step ST112. In step ST110, in a case where the entire abnormal image data detected in step ST100 is only the digital image data 70B including the unacceptable face image data, a positive determination is made, and the image data processing transitions to step ST114.

In step ST112, the abnormality detection portion 110C8 outputs the digital image data 70B including the acceptable face image data to the combining portion 110C7 as the digital image data 70B of the combining target frame. Then, the image data processing transitions to step ST114.

In step ST114, the combining portion 110C7 generates the combined image data 70C by combining the digital image data output in step ST102, the after-removal image data output in step ST108, and the digital image data 70B output in step ST112. The gain adjustment portion 110C7a adjusts the gain of the generated combined image data 70C. Then, the image data processing transitions to step ST116.

In step ST116, the combining portion 110C7 outputs the combined image data 70C of which the gain is adjusted in step ST114 to the signal processing circuit 34 through the communication I/F 110D2. Then, the image data processing transitions to step ST30.

As described above, in the imaging apparatus 10 according to the third embodiment, in a case where the moving object image data is included in the digital image data 70B, the moving object region data including the moving object image data is removed from the digital image data 70B by the moving object region removal portion 110C9. The combined image data 70C based on the after-removal image data obtained by removing the moving object region data from the digital image data 70B is generated by the combining portion 110C7 and is output to the signal processing circuit 34 through the communication I/F 110D2. Thus, according to the present configuration, output of the digital image data 70B including the moving object image data can be suppressed, compared to a case where the entire digital image data 70B obtained by imaging is output.

In the third embodiment, while an example of a form of removing the moving object region data from the digital image data 70B is illustratively described, the technology of the present disclosure is not limited thereto. The moving object image data indicating the image of the moving object having a narrower range than a range of an image indicated by the moving object region data may be removed from the digital image data 70B.

Fourth Embodiment

In the second and third embodiments, an example of a form in which the digital image data 70B including the moving object image data is not combined is illustratively described. In a fourth embodiment, an example of a form in which the digital image data 70B including the moving object image data is combined will be described. In the fourth embodiment, the same constituents as the constituents described in the second embodiment will be designated by the same reference signs and will not be described.

In the example illustrated in FIG. 23, the digital image data 70B of the combining target frames of a series of a plurality of frames obtained by consecutively imaging a subject including a still object (in the example illustrated in FIG. 23, a ship and a sea surface) and a moving object (in the example illustrated in FIG. 23, a dolphin) is illustrated. The still object is an example of a "specific subject" according to the embodiments of the technology of the present disclosure.

In the example illustrated in FIG. 23, the digital image data 70B of the combining target frames of the series of the plurality of frames includes moving object existing image data that is the digital image data 70B including the moving object image data, and moving object non-existing image data that is the digital image data 70B not including the moving object image data. In the example illustrated in FIG. 23, a first frame and a sixth frame are the moving object non-existing image data, and second to fifth frames are the moving object existing image data.

The moving object non-existing image data includes still object image data indicating an image of the still object. The image of the still object refers to an image showing a subject of which a misregistration amount between frames is less than or equal to a predetermined value (for example, 0.5 pixels). For example, the "predetermined value" employed here is a misregistration amount that is derived in advance from sensory test and/or computer simulation or the like as a misregistration amount with which the user or the like cannot visually recognize that the image is shifted between frames.

In the example illustrated in FIG. 23, aspects of the images of the moving object indicated by the moving object image data included in the moving object existing image data of the second to fifth frames are different. The images indicated by the moving object existing image data of the second to fifth frames include the images of the dolphin having different postures between frames. Thus, in a case where the digital image data 70B of the combining target frames of the series of the plurality of frames illustrated in FIG. 23 is combined, there is a concern that an image (combined image) based on the moving object image data of the second to fifth frames is not clear depending on the misregistration amount of the images of the dolphin between frames. That is, there is a concern that an image obtained by combining the images of the dolphin having different postures among the second to fifth frames is an image that cannot be visually recognized as the image of the dolphin.

Therefore, in the imaging apparatus 10 according to the fourth embodiment, the moving object detection portion 110C8a detects the moving object existing image data from the abnormality detection target image data stored in the memory 112. The moving object detection portion 110C8a detects the movement amount of the image of the moving object indicated by the moving object image data between adjacent frames and determines whether or not the detected movement amount is less than or equal to an allowable movement amount.

For example, the allowable movement amount refers to a movement amount that is derived in advance from sensory test and/or computer simulation or the like as a movement amount with which the user or the like cannot visually recognize that the image of the moving object is shifted between frames. A few pixels (for example, 1 pixel) is exemplified as an example of the allowable movement amount. In addition, the allowable movement amount may be changed in accordance with the specifications of the interchangeable lens 14, may be changed in accordance with the angle of view of imaging, or may be changed in accordance with the instruction received by the reception device 84.

The moving object detection portion 110C8a outputs the moving object existing image data of a plurality of frames of which the detected movement amount is determined as being less than or equal to the allowable movement amount, to the combining portion 110C7 as the digital image data 70B of the combining target frames. The moving object existing image data of a plurality of adjacent frames is exemplified as an example of the moving object existing image data of the plurality of frames. The moving object existing image data of the plurality of adjacent frames is merely an example. For example, the moving object existing image data of a plurality of frames obtained at intervals of a few frames to a few tens of frames may be employed as the digital image data 70B of the combining target frames.

The combining portion 110C7 generates the combined image data 70C by combining the moving object existing image data of the plurality of frames. The gain adjustment portion 110C7a adjusts the gain of the combined image data 70C. Specifically, the gain adjustment portion 110C7a adjusts the gain to compensate for the exposure that is decreased by an amount corresponding to the number of frames of the moving object existing image data not output to the combining portion 110C7.

In addition, the moving object detection portion 110C8a detects the moving object non-existing image data from the abnormality detection target image data stored in the memory 112. The moving object detection portion 110C8a outputs the moving object non-existing image data of a plurality of frames to the combining portion 110C7 as the digital image data 70B of the combining target frames. The combining portion 110C7 generates the combined image data 70C by combining the moving object non-existing image data of the plurality of frames. In the same manner as adjustment of the gain of the combined image data 70C obtained by combining the moving object existing image data of the plurality of frames using the combining portion 110C7, the gain of the combined image data 70C obtained by combining the moving object non-existing image data of the plurality of frames using the combining portion 110C7 is adjusted by the gain adjustment portion 110C7a.

As described above, for the digital image data 70B including the moving object image data, even in a case where the moving object existing image data of the plurality of frames is combined by the combining portion 110C7, the same effects as the first to fourth embodiments can be obtained in a case where the movement amount of the image of the moving object indicated by the moving object image data is less than or equal to the allowable movement amount.

In the fourth embodiment, while an example of compensating for the insufficient exposure due to gaining up of the combined image data 70C by the gain adjustment portion 110C7a is illustrated, this is merely an example. For example, the combining portion 110C7 may solve the insufficient exposure by increasing the number of frames used for combining the moving object non-existing image data.

Figure 25:
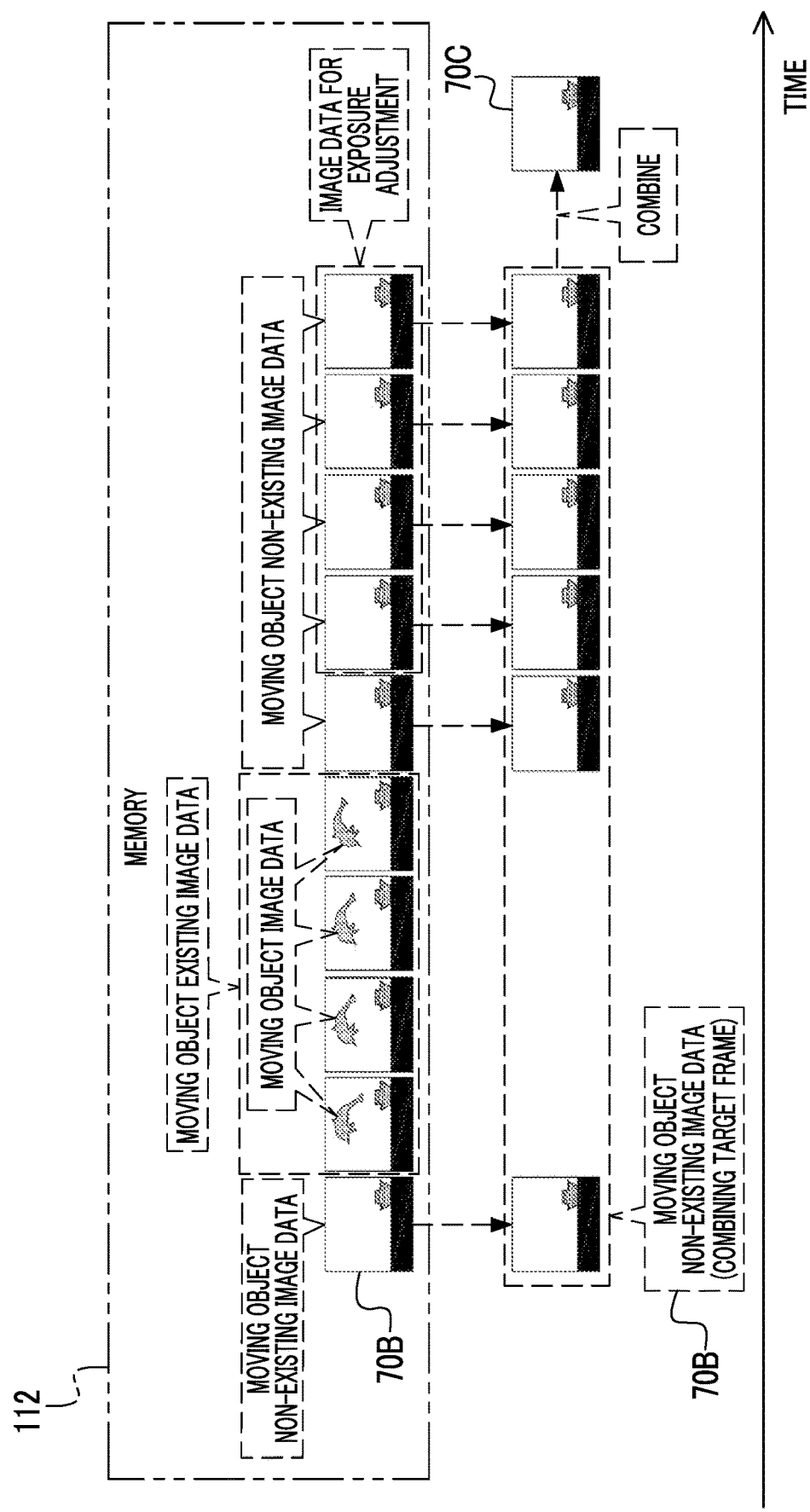
FIG. 25 is a time chart illustrating an example of a process of combining the moving object non-existing image data of the first frame and the sixth frame set as the combining target frame with image data for exposure adjustment (non-moving image data of four frames) in the digital image data of the first to sixth frames obtained by imaging using the imaging element according to the fourth embodiment.

In this case, as illustrated in FIG. 25 as an example, the combining portion 110C7 may solve the insufficient exposure of the combined image data 70C using image data for exposure adjustment. In the example illustrated in FIG. 25, the image data for exposure adjustment refers to the moving object non-existing image data of a plurality of frames (in the example illustrated in FIG. 25, four frames) from a seventh frame. In the fourth embodiment, the imaging frame rate, the shutter speed, the opening degree of the stop 40C, and the like are set such that the exposure amount of the combined image data 70C obtained by combining (adding) the digital image data 70B of six frames is greater than or equal to the predetermined exposure amount. Thus, as illustrated in FIG. 25 as an example, insufficient exposure of four frames occurs in a situation in which the moving object existing image data of the second to fifth frames is not used for combining with the moving object non-existing image data.

Therefore, the combining portion 110C7 uses the moving object non-existing image data of four frames from the seventh frame stored in the memory 112 as the digital image data 70B for exposure adjustment. That is, the combining portion 110C7 extracts the moving object non-existing image data of four frames from the seventh frame from the memory 112. The combining portion 110C7 generates the combined image data 70C by combining the extracted moving object non-existing image data of four frames, the moving object non-existing image data of the first frame, and the moving object non-existing image data of the sixth frame. The exposure amount of the image indicated by the combined image data generated in such a manner is an exposure amount greater than or equal to the predetermined exposure amount.

According to the present configuration, it is possible to suppress a decrease in image quality caused by misregistration between frames and output the combined image data 70C of the predetermined exposure amount or greater, compared to a case where the digital image data 70B of the plurality of frames is combined and output regardless of the misregistration amount between frames.

Here, an example of a form in which the insufficient exposure of the combined image data 70C obtained by combining the moving object non-existing image data of the plurality of frames is solved using the image data for exposure adjustment is exemplified. However, the technology of the present disclosure is not limited thereto. For example, the combining portion 110C7 may solve the insufficient exposure of the combined image data 70C obtained by combining the moving object existing image data of the plurality of frames, using the moving object existing image data of another plurality of frames. In this case, for example, the combining portion 110C7 may combine the moving object existing image data of six frames for which the misregistration amount of the image of the moving object indicated by the moving object image data is less than or equal to the allowable movement amount.

In addition, while the imaging apparatus 10 of the interchangeable lens type is illustrated in each of the embodiments, the technology of the present disclosure is not limited thereto. For example, as illustrated in FIG. 26, an imaging apparatus main body 414 having configurations and functions corresponding to the imaging apparatus main body 12 described in each of the embodiments may be mounted in a smart device 400.

Figure 26:
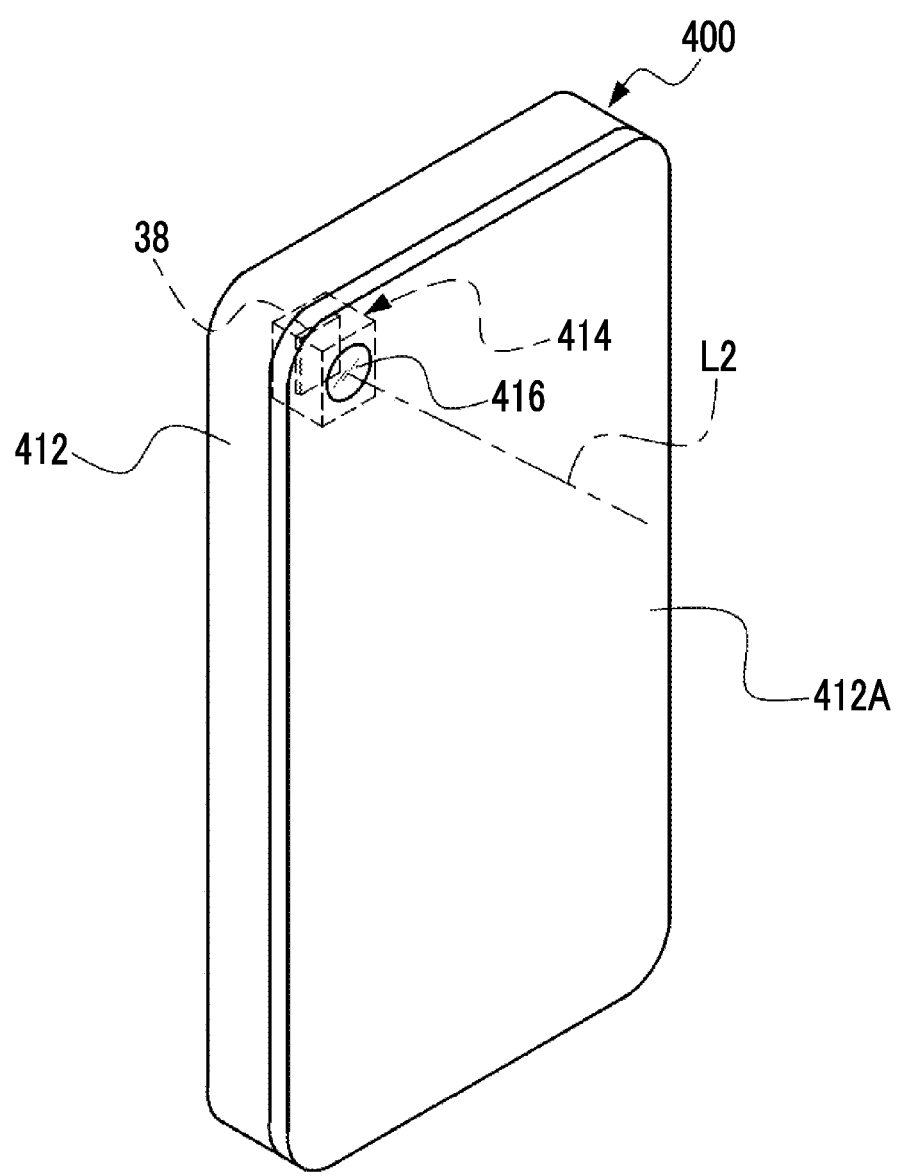
FIG. 26 is a perspective rear view illustrating an example of an exterior on a rear surface side of a smart device.

As illustrated in FIG. 26 as an example, the smart device 400 comprises a housing 412, and the imaging apparatus main body 414 is accommodated in the housing 412. For example, a smartphone or a tablet terminal that is an electronic apparatus having an imaging function is exemplified as an example of the smart device 400.

An imaging lens 416 is attached to the housing 412. In the example illustrated in FIG. 26, the imaging lens 416 is exposed from a rear surface 412A in an upper left portion of the rear surface 412A of the housing 412 in a case where the smart device 400 is in a vertically placed state. A center of the imaging lens 416 is positioned on an optical axis L2. The imaging apparatus main body 414 incorporates the imaging element 38. The imaging apparatus main body 414 acquires the subject light from the imaging lens 416. The image of the subject light acquired in the imaging apparatus main body 414 is formed on the imaging element 38.

While an example of a form of incorporating only the imaging apparatus main body 414 in the smart device 400 is illustrated in the example illustrated in FIG. 26, the technology of the present disclosure is not limited thereto. A plurality of digital cameras may be incorporated in the smart device 400. In this case, the imaging apparatus main body 414 may be mounted in at least one digital camera.

In addition, in each of the embodiments, while the communication I/Fs are connected in accordance with the PCIe connection standard, the technology of the present disclosure is not limited thereto. Instead of the PCIe connection standard, other connection standards such as LVDS, SATA, SLVS-EC, or MIPI may be employed as a high-speed communication standard.

In addition, in each of the embodiments, all of communication between the imaging element 38 and the signal processing circuit 34, communication between the controller 15 and the imaging element 38, and communication between the signal processing circuit 34 and the controller 15 are wired communication. However, the technology of the present disclosure is not limited thereto. Communication between the imaging element 38 and the signal processing circuit 34, communication between the controller 15 and the imaging element 38, and/or communication between the signal processing circuit 34 and the controller 15 may be wireless communication.

In addition, in each of the embodiments, while an example of a form of incorporating the UI system device 17 in the imaging apparatus main body 12 is illustratively described, at least a part of a plurality of constituents included in the UI system device 17 may be externally attached to the imaging apparatus main body 12. In addition, at least a part of the plurality of constituents included in the UI system device 17 may be used as being connected to the external I/F 104 as a separate body.

In addition, while an example of a form of implementing the processing circuit 110 by the device including the ASIC and the FPGA is illustratively described in each of the embodiments, the technology of the present disclosure is not limited thereto. For example, at least the control circuit 110C of a plurality of devices included in the processing circuit 110 may be implemented by a software configuration using a computer.

Figure 27:
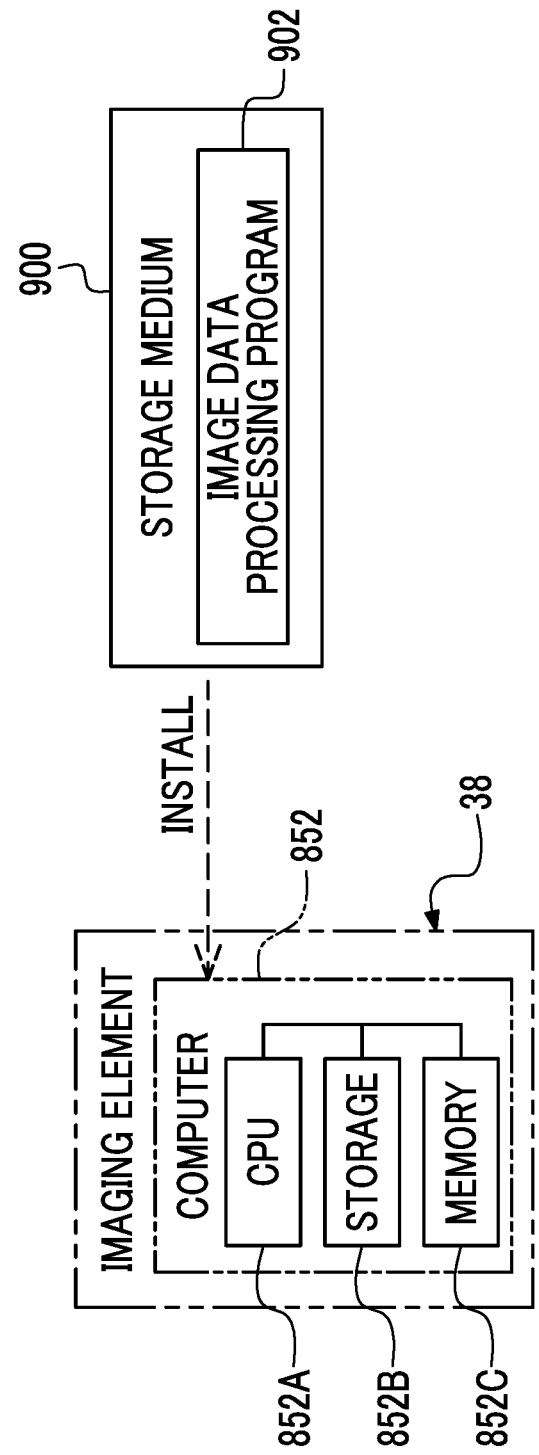
FIG. 27 is a conceptual diagram illustrating an example of an aspect in which an image data processing program is installed on a computer in the imaging element from a storage medium storing the image data processing program.

In this case, for example, as illustrated in FIG. 27, a computer 852 is incorporated in the imaging element 38, and an image data processing program 902 causing the computer 852 to execute the image data processing according to each of the embodiments is stored in a storage medium 900 such as an SSD or a USB memory that is a non-temporary storage medium. The image data processing program 902 stored in the storage medium 900 is installed on the computer 852. In addition, the image data processing program 902 may be stored in a storage (for example, a non-volatile storage device) of another computer, a server apparatus, or the like connected to the computer 852 through a communication network (not illustrated), and the image data processing program 902 may be downloaded to the computer 852 in response to a request from the imaging element 38 and be installed on the computer 852.

In the example illustrated in FIG. 27, while an example of a form of incorporating the computer 852 in the imaging element 38 is illustrated, the technology of the present disclosure is not limited thereto. For example, the computer 852 may be disposed on an outside of the imaging element 38. In addition, in the example illustrated in FIG. 27, a CPU 852A may be a single CPU or include a plurality of CPUs. In addition, a GPU may be applied instead of the CPU 852A. In addition, in the example illustrated in FIG. 27, while the computer 852 is illustrated, the technology of the present disclosure is not limited thereto. A device including an ASIC, an FPGA, and/or a PLD may be applied instead of the computer 852. In addition, a combination of a hardware configuration and a software configuration may be used instead of the computer 852.

Various processors illustrated below can be used as a hardware resource for executing the image data processing described in each of the embodiments. For example, as described above, a CPU that is a general-purpose processor functioning as the hardware resource for executing the image data processing by executing software, that is, the program, is exemplified as a processor. In addition, a dedicated electric circuit such as an FPGA, a PLD, or an ASIC that is a processor having a circuit configuration dedicatedly designed to execute a specific type of processing is exemplified as a processor. A memory is incorporated in or connected to any of the processors, and any of the processors executes the image data processing using the memory.

The hardware resource for executing the image data processing may be configured with one of those various processors or may be configured with a combination of two or more processors of the same type or different types (for example, a combination of a plurality of FPGAs or a combination of a CPU and an FPGA). In addition, the hardware resource for executing the image data processing may be one processor.

As an example of a configuration with one processor, first, as represented by a computer such as a client and a server, a form in which one processor is configured with a combination of one or more CPUs and software, and in which this processor functions as a hardware resource for executing the image data processing is available. Second, as represented by an SoC or the like, a form of using a processor that implements, by one IC chip, a function of the entire system including a plurality of hardware resources for executing the image data processing is available. In such a manner, the image data processing is implemented using one or more of the various processors as the hardware resource.

Furthermore, as a hardware structure of those various processors, more specifically, an electric circuit in which circuit elements such as semiconductor elements are combined can be used.

In addition, the various types of processing are merely an example. Accordingly, unnecessary steps may be deleted, new steps may be added, or a processing order may be rearranged without departing from a gist of the technology of the present disclosure.

In addition, while the imaging apparatus 10 is illustrated in the example illustrated in FIG. 1, and the smart device 400 is illustrated in the example illustrated in FIG. 26, the technology of the present disclosure is not limited thereto. That is, the technology of the present disclosure can be applied to various electronic apparatuses (for example, a fixed lens camera, a personal computer, a wearable terminal apparatus, or the like) incorporating the imaging apparatus having configurations and functions corresponding to the imaging apparatus main body 12 described in each of the embodiments. Even with these electronic apparatuses, the same actions and effects as the imaging apparatus 10 and the smart device 400 are obtained.

In addition, while the display 26 is illustrated in each of the embodiments, the technology of the present disclosure is not limited thereto. For example, a separate display that is connected to the imaging apparatus may be used as the "display device" according to the embodiments of the technology of the present disclosure.

The above described contents and illustrated contents are detailed description for parts according to the embodiment of the technology of the present disclosure and are merely an example of the technology of the present disclosure. For example, description related to the above configurations, functions, actions, and effects is description related to an example of configurations, functions, actions, and effects of the parts according to the embodiments of the technology of the present disclosure. Thus, unnecessary parts may be removed, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiment of the technology of the present disclosure.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards are specifically and individually indicated to be incorporated by reference.

The following appendices are further disclosed with respect to the embodiments.

APPENDIX

An imaging element incorporating a memory and a processor, in which the processor is configured to read out image data obtained by imaging using a photoelectric conversion element from the photoelectric conversion element at a first frame rate, store the image data read out from the photoelectric conversion element in a memory, process the image data, output the processed image data at a second frame rate, detect first image data indicating a specific image from the image data stored in the memory, and output second image data based on image data different from the detected first image data in the image data of a plurality of frames, and the second frame rate is a frame rate lower than the first frame rate.

What is claimed is:

1. An imaging element comprising:
a reading circuit that is incorporated in the imaging element and reads out image data obtained by imaging using a photoelectric conversion element from the photoelectric conversion element at a first frame rate;
a memory that is incorporated in the imaging element and stores the image data read out from the photoelectric conversion element by the reading circuit;
a control circuit that is incorporated in the imaging element and processes the image data; and
a communication interface that is incorporated in the imaging element and outputs the image data processed by the control circuit at a second frame rate,
wherein the control circuit
detects first image data indicating a specific image from the image data stored in the memory, and
generates second image data that is image data different from the detected first image data in the image data of a plurality of frames,
wherein the communication interface outputs the second image data generated by the control circuit,
wherein the second frame rate is a frame rate lower than the first frame rate, and
wherein the control circuit generates the second image data of which an exposure amount is greater than or equal to a predetermined exposure amount, by adjusting a gain of the image data different from the first image data in the image data of the plurality of frames.

2. The imaging element according to claim 1,
wherein the control circuit combines image data of a plurality of frames different from the first image data in the image data of the plurality of frames, and
wherein the communication interface outputs combined image data obtained by combining using the control circuit as the second image data.

3. The imaging element according to claim 1,
wherein the specific image is an image including a noise component.

4. The imaging element according to claim 3,
wherein the image including the noise component is an image indicated by image data obtained by imaging using the imaging element at a timing at which a vibration exerted on an apparatus including the imaging element is detected by a sensor capable of detecting the vibration, in the image data stored in the memory.

5. The imaging element according to claim 4,
wherein the sensor outputs a signal indicating the detected vibration to the control circuit, and
wherein the control circuit generates the first image data by associating image data obtained by imaging using the imaging element at a timing at which the signal of which a signal level is greater than or equal to a threshold value is input from the sensor, with an identifier for specifying the signal level greater than or equal to the threshold value.

6. The imaging element according to claim 3,
wherein the image including the noise component is an image of a subject including an object of which a movement amount per unit time period is greater than or equal to a predetermined movement amount.

7. The imaging element according to claim 1,
wherein in a case in which subject image data indicating an image of a subject including an object of which a movement amount per unit time period is greater than or equal to a predetermined movement amount is included in the image data, the control circuit removes the subject image data from the image data, and
wherein the communication interface outputs, as the second image data, image data that is based on after-removal image data obtained by removing the subject image data from the image data using the control circuit.

8. The imaging element according to claim 1,
wherein at least the photoelectric conversion element and the memory are formed in one chip.

9. The imaging element according to claim 8,
wherein the imaging element is a laminated imaging element in which the photoelectric conversion element is laminated with the memory.

10. An imaging apparatus comprising:
the imaging element according to claim 1; and
a control device that performs at least one of control for displaying an image based on the second image data output by the communication interface on a display device or control for storing the second image data output by the communication interface in a storage device.

11. An imaging element comprising:
a reading circuit that is incorporated in the imaging element and reads out image data obtained by imaging using a photoelectric conversion element from the photoelectric conversion element at a first frame rate;
a memory that is incorporated in the imaging element and stores the image data read out from the photoelectric conversion element by the reading circuit;
a control circuit that is incorporated in the imaging element and processes the image data; and
a communication interface that is incorporated in the imaging element and outputs the image data processed by the control circuit at a second frame rate,
wherein the control circuit detects first image data indicating a specific image from the image data stored in the memory, and generates second image data that is based on the image data different from the detected first image data in the image data of a plurality of frames, and that is combined image data obtained by combining image data of a number of frames and of which an added exposure amount is greater than or equal to a first predetermined exposure amount, wherein the communication interface outputs the second image data generated by the control circuit, wherein the second frame rate is a frame rate lower than the first frame rate, wherein each image indicated by the image data of the plurality of frames set as a combining target includes a specific subject image indicating a specific subject of which a misregistration amount is less than or equal to a predetermined value between frames, and wherein the control circuit
extracts specific subject image data of a plurality of frames of the first predetermined exposure amount or greater indicating an image including the specific subject image from the image data of the plurality of frames set as the combining target, and
generates the combined image data as the second image data by combining the extracted specific subject image data of the plurality of frames.

12. An operation method of an imaging element incorporating a memory, the operation method comprising:
reading out image data obtained by imaging using a photoelectric conversion element from the photoelectric conversion element at a first frame rate;
storing the image data read out from the photoelectric conversion element in the memory;
processing the image data;
outputting the processed image data at a second frame rate;
detecting first image data indicating a specific image from the image data stored in the memory;
generating second image data that is image data different from the detected first image data in the image data of a plurality of frames; and
outputting the generated second image data,
wherein the second frame rate is a frame rate lower than the first frame rate, and
wherein the second image data is generated by adjusting a gain of the image data different from the first image data such that the second image data has an exposure amount that is greater than or equal to a predetermined exposure amount.

13. An operation method of an imaging element incorporating a memory, the operation method comprising:
reading out image data obtained by imaging using a photoelectric conversion element from the photoelectric conversion element at a first frame rate;
storing the image data read out from the photoelectric conversion element in the memory;
processing the image data;
outputting the processed image data at a second frame rate;
detecting first image data indicating a specific image from the image data stored in the memory;
generating second image data based on image data different from the detected first image data in the image data of a plurality of frames, and that is combined image data obtained by combining image data of a number of frames and of which an added exposure amount is greater than or equal to a first predetermined exposure amount; and
outputting the generated second image data,
wherein the second frame rate is a frame rate lower than the first frame rate,
wherein each image indicated by the image data of the plurality of frames set as a combining target includes a specific subject image indicating a specific subject of which a misregistration amount is less than or equal to a predetermined value between frames, and
wherein the second image data is generated by
extracting specific subject image data of a plurality of frames of the first predetermined exposure amount or greater indicating an image including the specific subject image from the image data of the plurality of frames set as the combining target, and
generating the combined image data as the second image data by combining the extracted specific subject image data of the plurality of frames.

14. A non-transitory computer-readable storage medium storing a program executable by a computer applied to an imaging element incorporating a memory to perform a process comprising:
reading out image data obtained by imaging using a photoelectric conversion element from the photoelectric conversion element at a first frame rate;
storing the image data read out from the photoelectric conversion element in the memory;
processing the image data;
outputting the processed image data at a second frame rate;
detecting first image data indicating a specific image from the image data stored in the memory;
generating second image data that is image data different from the detected first image data in the image data of a plurality of frames; and
outputting the generated second image data,
wherein the second frame rate is a frame rate lower than the first frame rate, and
wherein the second image data is generated by adjusting a gain of the image data different from the first image data such that the second image data has an exposure amount that is greater than or equal to a predetermined exposure amount.

15. A non-transitory computer-readable storage medium storing a program executable by a computer applied to an imaging element incorporating a memory to perform a process comprising:
reading out image data obtained by imaging using a photoelectric conversion element from the photoelectric conversion element at a first frame rate;
storing the image data read out from the photoelectric conversion element in the memory;
processing the image data;
outputting the processed image data at a second frame rate;
detecting first image data indicating a specific image from the image data stored in the memory;
generating second image data based on image data different from the detected first image data in the image data of a plurality of frames, and that is combined image data obtained by combining image data of a number of frames and of which an added exposure amount is greater than or equal to a first predetermined exposure amount; and
outputting the generated second image data,
wherein the second frame rate is a frame rate lower than the first frame rate,
wherein each image indicated by the image data of the plurality of frames set as a combining target includes a specific subject image indicating a specific subject of which a misregistration amount is less than or equal to a predetermined value between frames, and wherein the second image data is generated by
extracting specific subject image data of a plurality of frames of the first predetermined exposure amount or greater indicating an image including the specific subject image from the image data of the plurality of frames set as the combining target, and generating the combined image data as the second image data by combining the extracted specific subject image data of the plurality of frames.

* * * * *